US011837100B2

(12) United States Patent
Jensen

(10) Patent No.: US 11,837,100 B2
(45) Date of Patent: Dec. 5, 2023

(54) METHOD AND SYSTEM FOR PRE-FLIGHT PROGRAMMING OF A REMOTE IDENTIFICATION (REMOTE ID) SYSTEM FOR MONITORING THE FLIGHT OF AN UNMANNED AIRCRAFT SYSTEM (UAS) IN THE NATIONAL AIRSPACE SYSTEM (NAS)

(71) Applicant: RUMFERT, LLC, Omaha, NE (US)

(72) Inventor: David Dale Jensen, Omaha, NE (US)

(73) Assignee: RUMFERT, LLC, Omaha, NE (US)

(*) Notice: Subject to any disclaimer, the term of this patent is extended or adjusted under 35 U.S.C. 154(b) by 543 days.

(21) Appl. No.: 16/914,315

(22) Filed: Jun. 27, 2020

(65) Prior Publication Data
US 2020/0410874 A1 Dec. 31, 2020

Related U.S. Application Data

(60) Provisional application No. 62/990,660, filed on Mar. 17, 2020, provisional application No. 62/868,905, filed on Jun. 29, 2019.

(51) Int. Cl.
*G06G 7/70* (2006.01)
*G06G 7/76* (2006.01)
*G08G 5/00* (2006.01)
*H04L 67/00* (2022.01)

(52) U.S. Cl.
CPC ......... *G08G 5/0069* (2013.01); *G08G 5/0013* (2013.01); *G08G 5/0026* (2013.01); *G08G 5/0034* (2013.01); *G08G 5/0082* (2013.01); *G08G 5/0095* (2013.01); *H04L 67/34* (2013.01)

(58) Field of Classification Search
CPC .. G08G 5/0069; G08G 5/0013; G08G 5/0026; G08G 5/0034; G08G 5/0082; G08G 5/0095; H04L 67/34
See application file for complete search history.

(56) References Cited

U.S. PATENT DOCUMENTS

| | | | |
|---|---|---|---|
| 10,054,941 B1 | 8/2018 | Beard | |
| 10,156,627 B2 | 12/2018 | Beard | |
| 10,663,597 B1 | 5/2020 | Dormiani | |
| 10,733,894 B1 | 8/2020 | Beard et al. | |

(Continued)

OTHER PUBLICATIONS

U.S. Appl. No. 15/905,340, "Direct-Broadcast Remote Identification (RID) Device for Unmanned Aircraft Systems (UAS)"; applicant: Uavionix Corporation; filed Feb. 26, 2018.

(Continued)

*Primary Examiner* — Abby Y Lin
*Assistant Examiner* — Sohana Tanju Khayer

(57) ABSTRACT

The invention relates to operation of unmanned aircraft systems (UAS) in the National Airspace System (NAS) using Remote Identification (Remote ID) and tracking. Specifically the invention relates to pre-flight initialization and programming of UAS with personality data needed to implement Remote ID functionality. The personality data includes UAS identity and configuration data. The pre-flight programming process promotes mission flexibility and efficient pre-flight preparation by reusing mission to mission common configuration and identity data elements, reprogramming only delta data. Operating modes may be used to easily reconfigure programming data to common mission specific requirements.

20 Claims, 29 Drawing Sheets

(56) References Cited

U.S. PATENT DOCUMENTS

| | | | | |
|---|---|---|---|---|
| 10,825,345 | B2 | 11/2020 | Sugahara | |
| 2008/0099602 | A1* | 5/2008 | Zyss | B64C 25/00 244/102 R |
| 2011/0029679 | A1* | 2/2011 | Handa | H04L 69/04 709/228 |
| 2014/0208390 | A1* | 7/2014 | Brown | G06F 21/335 726/4 |
| 2016/0036766 | A1* | 2/2016 | Himmelsbach | H04L 67/025 709/203 |
| 2016/0180715 | A1* | 6/2016 | Burke | G08G 5/0091 701/467 |
| 2016/0292696 | A1* | 10/2016 | Gong | H04L 67/34 |
| 2017/0183095 | A1* | 6/2017 | Liu | H02S 20/30 |
| 2017/0233071 | A1* | 8/2017 | Pilskalns | G08G 5/0021 701/2 |
| 2018/0157255 | A1* | 6/2018 | Halverson | G07C 5/0808 |
| 2019/0114925 | A1* | 4/2019 | Schulman | G08G 5/0082 |
| 2019/0172357 | A1 | 6/2019 | Meuleman et al. | |
| 2022/0092989 | A1* | 3/2022 | Li | H04W 12/35 |

OTHER PUBLICATIONS

Federal Aviation Administration, Notice of Proposed Rule, Remote Identification of Unmanned Aircraft Systems, RIN 2120-AL31; Posted Dec. 31, 2019; https://www.regulations.gov/document?D=FAA-2019-1100-0001.

Experimental Aircraft Association comments to FAA proposed rule on Remote Identification of Unmanned Aircraft Systems, Dated Mar. 2, 2020; https://eaa.org/-/media/Files/EAA/Advocacy/03-03-2020-RemoteIDcomments.

Small UAV Coalition comment on FAA proposed rule on Remote Identification of Unmanned Aircraft Systems, Dated Mar. 2, 2020; https://secureservercdn.net/198.71.233.179/4z7.785.myftpupload.com/wp-content/uploads/2020/03/Comments-of-Small-UAV-Coalition-on-remote-ID-NPRM-030220-final.pdf.

Uavionix Corporation, Concepts for Remote Identification, Mar. 22, 2017; https://uavionix.com/downloads/whitepapers/uavionix-remote-identification-white-paper.pdf.

Uavionix Corporation, tailBeaconTM TSO User and Installation Guide; UAV-1002185-001 1 Rev C; Dec. 2, 2019; sctn 10 pp. 30-35; https://uavionix.com/downloads/tailbeacon/tailBeacon-TSO-User-and-Installation-Guide-UAV-1002185-001.pdf.

UAS Identification and Tracking (UAS ID) Avation Rukemaking Committee (ARC); ARC Recommendations Final Report; Sep. 30, 2017; https://www.faa.gov/regulations_policies/rulemaking/committees/documents/media/UAS%20ID%20ARC%20Final%20Report%20with%20Appendices.pdf.

YouTube Video, NUAIR; https://www.youtube.com/watch?v=1hxqWVXaEaM&feature=youtu.be.

Kittyhawk.IO, Remote ID & Commercial Drones, White Paper, https://kittyhawk.io/resources/Remote-ID-White-Paper.pdf?dl=1.

DJI, "What's in a Name?" A Call for a Balanced Remote Identification Approach, DJI White Paper, Mar. 2017, https://www.dropbox.com/s/v4lkyr2kdp8ukvx/DJI%20Remote%20Identification%20Whitepaper%203-22-17.pdf?dl=0.

Uavionix, "Why Bluetooth is a Bad Idea for Drone Remote Identification", Oct. 7, 2019, https://uavionix.com/drone-remote-identification/.

Uavionix, Remote Identification—The Next Big Hurdle for Drone Regulations; Mar. 7, 2017, https://uavionix.com/remote-identification-the-next-big-hurdle-for-drone-regulations/.

Unmanned Aircraft Systems (UAS) Registration Task Force (RTF) Aviation Rulemaking Committee (ARC) Task Force Recommendations Final Report Nov. 21, 2015; https://www.faa.gov/regulations_policies/rulemaking/committees/documents/media/UASRTFARC-102015.pdf.

Micro Inmanned Aircraft Systems Aviation Rulemaking Committee (ARC) ARC Recommendations Final Report Apr. 1, 2016; https://www.faa.gov/uas/resources/policy_library/media/Micro-UAS-ARC-FINAL-Report.pdf.

BlueMark db201, db 121pcb, db121, and db120 Remote ID broadcast modules, FAA Declaration of Compliance RID000000016 and RID000000058; https://dronescout.co/#products; https://dronescout.co/product/dronebeacon-mavlink-db201-transponder/ (db201 product page); https://dronescout.co/product/dronebeacon-db121pcb/ (db121pcb product page); https://dronescout.co/product/dronebeacon-db121/ (db121 product page); https://dronescout.co/product/dronebeacon-db120/ (db 120 product page), Dec. 10, 2022.

Dronetag Mini, Beacon, and DRI Remote ID broadcast modules, FAA declaration of Compliance RID000000025and RID000000045; https://dronetag.cz/; https://dronetag.cz/products/mini/ (mini product page); https://dronetag.cz/products/beacon/ (Beacon product page); https://dronetag.cz/products/dri/ (DRI product page), Feb. 24, 2023.

Zephyr Systems Module 100 Beacon Remote ID broadcast modules, FAA declaration of Compliance RID000000032; https://zephyrsys.com/product/remote-id-module/, Oct. 5, 2022.

AgEagle (sense Fly) Remote ID broadcast modules, FAA declaration of Compliance RID000000056; https://ageagle.com/drones/ebee-x/, Oct. 6, 2022.

Drone Defence AeroPing Remote ID broadcast modules, FAA declaration of Compliance RID000000063; https://www.dronedefence.co.uk/aeroping/, Apr. 23, 2021.

* cited by examiner

METHOD AND SYSTEM FOR PRE-FLIGHT PROGRAMMING OF A REMOTE IDENTIFICATION (REMOTE ID) SYSTEM FOR MONITORING THE FLIGHT OF AN UNMANNED AIRCRAFT SYSTEM (UAS) IN THE NATIONAL AIRSPACE SYSTEM (NAS)

CROSS REFERENCE TO RELATED APPLICATIONS

This application claims priority to U.S. Provisional Application No. 62/868,905 filed Jun. 29, 2019, and U.S. Provisional Application No. 62/990,660 filed Mar. 17, 2020, both of which are herein incorporated by reference, in their entirety.

TECHNICAL FIELD

The subject matter of the invention relates generally to Unmanned Aerial Vehicles (UAVs)/Unmanned Aircraft Systems (UAS) and to Remote Identification (Remote ID) operations for UAS in the National Airspace System (NAS).

BACKGROUND OF THE INVENTION

The recent proliferation of UAS has spawned numerous opportunities for their use. Many of these uses are commercial in nature such as package delivery, agricultural surveys, oil and gas pipeline inspections, real estate surveys, photography, etc. Many of these commercial uses require the drone to operate in or near the National Airspace System (NAS) and with the greatest commercial potential realized when operations are allowed Beyond Visual Line of Sight (BVLOS).

As the number of UAS expands along with their intended uses, it is increasingly probable that these vehicles will come into close proximity with manned aircraft or with each other. It is not only commercial operations that are an issue, but recreational users also pose a concern. Thus, it is increasingly urgent for governmental authorities to promulgate rules for integrating these unmanned vehicles into the NAS. The Federal Aviation administration (FAA) has dubbed this effort Unmanned Traffic Management (UTM). It is unlikely that the rules will be a 'one size fits all' but rather will be tailored to some degree to the nature of the flight operation. For example, there would likely be a different set of rules for recreational versus commercial operations. Also, commercial operations might be segregated into operations remaining within visual line of sight (WVLOS), those operations beyond visual line of sight (BVLOS) of the pilot, and/or flights over sparsely populated areas versus urban areas. Within this specification, use of the terms UAV and UAS shall include all types and sizes of unmanned aerial vehicles from large turbine powered autonomous vehicles down to model aircraft. When necessary, size related distinctions or differentiations will be made.

For traffic control and public safety, there is often a need for US governmental agencies such as the FAA, ATC, FBI, DHS, and local public safety, as well as civil aircraft operators, to be able to identify a UAS and its operator and to know where it is going. While UAS are required to have and display an FAA registration (aka 'tail number'), this is not typically visible from the ground. Thus, a remote method of identifying the vehicle is required. The FAA has designated the effort to design a system of remotely identifying UAS as 'Remote Identification and Tracking' or 'Remote ID' (RID). The idea is that certain UAS identification and navigation data is remotely transmitted during a flight and is made available to interested parties such as law enforcement, air traffic control, other operators, and even the general public. This data would facilitate the identification and tracking of the UAS. More specifically, the UAS data facilitates the 'identification' function, and the navigation data facilitates the 'tracking' function.

Two principal methods of remotely transmitting the UAS data are the 'broadcast' and 'networked' methods. Broadcast refers to the general transmission in the 'blind' similar to a commercial radio station. The signal may be received and decoded by anyone within radio range and with compatible receiving equipment. Networked refers to the collection of data and storage in a central location for access by computers with access to the network. Broadcast data is range limited, but networked data has the potential to be worldwide (i.e. internet).

According to the teachings of the present invention, the UAS Remote Identification Data (RIDD) may be broken into two parts: the identity data (IRID) and the navigation/guidance data (NRID). A complete Remote ID Message (RIDM) is constructed by combining the identity and navigation data: RIDM=IRID+NRID. The identity data may consist of items such as UAS registration, pilot ID, mission identifiers, UAS make and model, UAS owner, UAS classification, UAS serial number, flight type, and the like. Navigation/guidance data may consist of items such as position (L/L), altitude, speed, heading/course, vertical rate, winds, and the like. There may also be some 'administrative' type data such as status. Identification data pertains to a specific UAS airframe which, during a flight, is static, whereas, during a flight, navigation/guidance data is dynamic. In one embodiment, the navigational and identification data would be broadcast in real-time continuously throughout the flight and made available to data consumers via the broadcast method, the network method, or both. Data consumers might be air traffic controllers for traffic deconfliction, law enforcement for public safety, other UAS operators for operational situational awareness, and even the public to allay fears of invasion of privacy or other concerns real or imagined.

Since the ID data is static during the flight, it can be programmed and stored in memory before flight and retrieved during the mission as needed to build the Remote ID Message (RIDM). Navigation data sensors acquire the required navigation data continuously throughout the flight. To complete a Remote ID system, one or more communication modules are also required to transmit the identification and navigation data to end users and to communicate with the programming device. While the identification data is static during a given flight, it is likely to change from one flight to another. Items like mission ID and even the pilot are likely to change from one flight to another—especially on commercial flights. Since the data is not constant, a method is needed to efficiently update the identity data prior to the mission. In addition to the mission/UAS specific identity data, there may be some configuration items requiring updating from time to time, e.g. due to mission profile or the like. In this specification, this configuration and identity data is referred to as 'personality data.' To provide mission flexibility, ease of operation and reusability of a Remote ID Tracking System (RITS), a system and method of programming the RITS with mission specific personality data is needed.

SUMMARY OF THE INVENTION

The invention provides systems and methods executed by one or more computer application instruction sets for efficient pre-flight programming of a Remote ID Tracking System (RITS), with the mission specific personality data needed to implement Remote Identification (RID) functionality. Specifically, the invention discloses systems and methods for performing pre-flight initialization and programming of the UAS with identification and configuration data needed for operation of an RITS during a UAS mission. This specification uses the term 'personality data' to include UAS identification and configuration data. The personality data personalizes an anonymous/generic piece of RITS hardware to a specific UAS, pilot, and mission. Pre-flight personality programming is the process where the personality data is entered, uploaded, and verified prior to the UAS mission.

To implement the Remote ID function, a Remote Identification Tracking System (RITS) system is disclosed, comprising one or more sensors which may be affixed, secured or in some way associated with the UAS for sensing, processing, or otherwise obtaining the required navigational data required for the Remote ID function. Additionally, one or more communication modules may be employed to allow communication between the UAS and end users and between the RITS and the programmer. A variety of communication methods may be installed on the RITS permitting a variety of communication methods such as WiFi (both direct and as an internet gateway), V/UHF, cellular/internet, and even wired (for ground operations).

In addition to the sensors and communication modules, the RITS would include additional supporting components such as a processor system and associated memory. Computer program instructions may be stored in non-volatile memory (NVM) and executed by the processor systems to manage the programming, sensor, and communication functions. Equipage to implement the RID function may be part of the originally manufactured UAS (OEM) or may be part of a retrofit kit for existing UAS.

As mentioned, the personality data includes configuration and identity data. Identity data may comprise UAS registration, pilot ID, mission identifiers, UAS make and model, UAS owner, UAS classification (e.g. sUAS, UAS, civil, military), serial number, flight type (e.g. recreational, commercial, law enforcement, military, etc.), and the like. Configuration data may include operating mode (OPMODE) (e.g. recreational, commercial/local, commercial/extended, etc.), sensors utilized (e.g. GPS, barometric pressure, temperature, magnetometer, inertial reference, etc.), communication modules utilized (e.g. WiFi, Bluetooth, cellular, V/UHF, satellite, serial), data parameters to be transmitted, etc. The pre-flight configuration programming may also include parameters used for generating alerts such as min/max altitudes, BVLOS distance, data to connect to an FAA service provider (e.g. FAA designated UAS Service Supplier), and the like. Some of this data is needed to raise alerts and some necessary for providing services during the mission. The configurability provided by the programmed data parameters is referred to as 'soft' configurability. In addition to this 'soft' configurability, a 'hard' configurability may also be implemented.

This 'hard' configurability may be implemented with one or more dual in-line package (DIP) configuration switches, the position of which may indicate the presence or absence of a piece of hardware such as a sensor or communication module. These 'hard' configuration settings are sometimes referred to as 'straps.' A part of the pre-flight programming and initialization process may be the RITS software code 'reading' the 'hard' configuration settings ('strap settings'). In one exemplary embodiment, the 'hard' settings would take precedence over 'soft' settings. The concepts of 'hard' and 'soft' configurability support the concept of a modular hardware design so that communication and sensor modules may be physically swapped in/out in a 'plug and play' design and the 'hard' and 'soft' configurability set, accordingly.

The configuration parameters may also make allowance for connecting the RITS to a wireless network router by providing a means for entering the Service Set Identifier (SSID) and password of the network router. Many of the configuration parameters may have overridable default values such that if nothing is entered, the default values are used.

Configurability of the sensor and communication modules allows the functioning of the Remote ID system of the present invention to be tailored to the functional and regulatory requirements of the UAS' mission. For example, if there were a different set of rules for recreational versus commercial/local versus commercial/extended operations, these could be accommodated by different configuration settings. Configurability also allows for FAA rule and regulation evolution with few changes necessary in the basic hardware and operating software designs. In one exemplary embodiment, overridable configuration defaults are set in accordance with operational mode (OPMODE) rule sets. In another exemplary embodiment, the defaults may be the previously entered/stored/verified values (if any). In another exemplary embodiment, the OPMODE/rule set default mapping is re-configurable.

In one embodiment, the personality data is entered or edited on a portable programming device such as a laptop or smartphone. The entry and uploading of the data is executed on the programming device by an application ('app code'). This personality data (PD) (identity+configuration) may be uploaded to the RITS during the pre-flight programming using a wireless link. The data uploaded to the UAS/RITS is then stored in RITS NVM. A verification process ensures the data is verified before flight. For succeeding flights, the personality data (PD) may be read out of RITS NVM and presented to the pilot on the programming device for modification, as needed. Thus the pre-flight personality programming process may be limited to editing only the data changing from one flight to another, e.g. the new pilot's data, mission ID, etc. Similarly, moving the RITS from one UAS to another might only require reprogramming of UAS specific data (e.g. registration number, make/model/serial number, etc.) This enhances reusability of the RITS from one mission to another and from UAS to another. The verification process ensures that the personality data (new and reused) has been verified by the pilot prior to flight. An interlock system may also be provided to ensure the required configuration settings are entered/enabled prior to flight. Pre-flight personality programming may use wireless, wired, or portable storage devices (e.g. memory cards).

In an exemplary embodiment of the present invention, a wireless connection is used for pre-flight programming of the UAS. In one embodiment, the programmer is a smart device such as a smartphone, laptop, tablet, smartwatches, or the like. The programmer device may comprise a non-volatile memory for storing computer instructions or code (aka 'app code'), a processor system for executing those instructions, a display for displaying personality programming data and entry fields to the operator, input means for receiving input from the operator, and a communications module to facilitate wireless communication between the programmer and the RITS. In another embodiment, the programmer may also function as a receiver/display for displaying UAS Remote ID Data (RIDD), the receiver/ display having the ability to connect directly with the RITS or to receive Remote ID Data (RIDD) indirectly through a network connection.

The RITS may comprise a non-volatile memory for storing computer instructions or code ('flight code'), a processor system for executing those instructions, one or more navigation sensors, and one or more communications modules to facilitate wireless communication between the RITS and the programmer. The selections made during the pre-flight programming, including the personality (identification/configuration) data, may be stored in the RITS non-volatile memory (NVM) for use during the mission and for easy retrieval and modification during subsequent mission pre-flights. In exemplary embodiments, this reserved section of NVM is referred to as the 'personality module.'

The RITS system may function either as an 'add-on' aftermarket unit (i.e. retrofit) or as part of the original equipment manufactured (OEM) component of the UAS. If operated as an add-on aftermarket component, it may be removably attached to the UAS so as to permit easy movement from one UAS to another.

After pre-flight programming, initialization, and the verification of personality data, the mission may be launched whereupon Remote ID Data (RIDD) from the RITS is periodically transmitted. The data transmitted may be a combination of the navigation and identity data. The navigation flight data would be dynamically determined by on-board sensors. Thus, the list of navigation data available is determined by the sensors installed and may be selected in the pre-flight initialization/programming process. In an exemplary embodiment, the transmission of Remote ID Data is contingent on a successful verification of the programmed personality data ('verification contingency').

The invention also includes display systems and methods for receiving and displaying Remote ID and tracking data from equipped UAS on ground based receiver/display systems (GRDS) and airborne receiver/display systems (ARDS). The display systems may have receivers capable of receiving the RITS data, either directly via the RF broadcast or through a network such as the internet and accessing the data from the database server or cloud storage service. The displays may display both manned and unmanned traffic, manned and unmanned airways, obstacles, urban areas, airports and droneports, similar to what is shown on FAA sectional aeronautical charts. The display function may be integrated with the existing manned aircraft ADS-B systems and/or other overlay display functions such that both manned and unmanned traffic may be displayed relative to each other as well as terrestrial structures or geographic features.

In one embodiment, the invention includes a method of receiving, categorizing, sorting, storing, and retrieving UAS Remote ID Data (RIDD) such that it is easily and quickly retrievable from the database for display.

DETAILED DESCRIPTION

Figure 1:
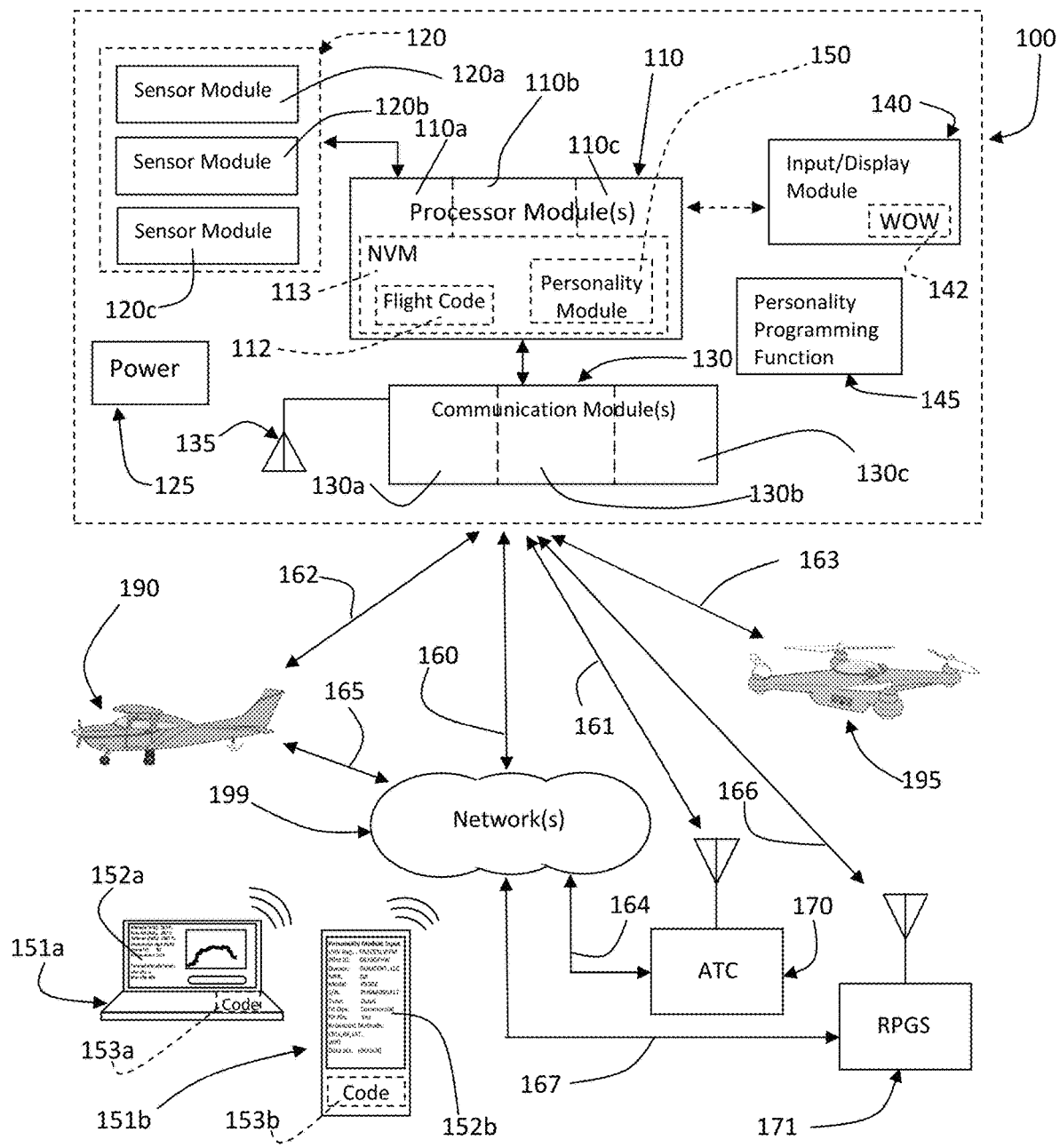
FIG. 1 is a block diagram illustrating major components of the system and method of the invention.

FIG. 1 illustrates, in block diagram form, an exemplary embodiment of the present invention. As seen generally, the invention comprises a Remote ID Tracking System (RITS) 100 wirelessly connected to one or more ground stations such as 170 and 171 through a network 199 or via direct RF communication 161, 166. Connections to another UAS 195 and airborne manned aircraft 190 (air-to-air mode), and portable receiver/programming devices 151a and 151b are also shown. In the figure, network 199 is intended to represent one or more networks which may be operating at any given time. For example, in the discussion below, a wireless WiFi network may be utilized at the same time the global computer network (internet) is also being used to convey Remote ID Data (RIDD) to end users.

RITS 100 generally represents the hardware, circuitry, and processing logic necessary to provide the Remote ID and tracking functions described in the present disclosure, including sensing UAS navigational data, processing the navigational data, retrieving identification and configuration data from NVM, forming a Remote ID Message (RIDM), and transmitting the RID message either directly or via one or more networks, or both.

One or more transmission or communication modes are contemplated, including broadcast (e.g. to other UAS, manned aircraft, or ground stations) and network (e.g. cellular, internet, WiFi etc.). In one exemplary embodiment, a broadcast mode is implemented. The broadcast transmission paths are represented in the figure as to other airborne manned 190 via path 162, unmanned vehicles 195 via path 163, and to ground stations such as air traffic control 170 via path 161 and remote pilot ground station 171 via path 166. Such direct communication modes are range limited based on multiple factors such as transmitter power, altitude, antenna, receiver sensitivity, frequency, and the like.

In another embodiment, network communication is utilized as shown via path 160. Data transmitted to a network 199, such as the internet, would then be available to ground stations such as FAA Air Traffic Control sites (ATC) 170 via path 164 and remote pilot ground station 171 via path 167. It is also contemplated that ATC ground station 170 might then rebroadcast the RID data to airborne aircraft 190, 195. It may also be possible for the airborne vehicles 190, 195 to obtain ID and tracking data from the network 199. In another exemplary embodiment, a local network (see FIGS. 3c, 3d, 4, 7, 9) may be used to program the UAS with the personality (i.e. identity/configuration) data as discussed below. The communication paths are not mutually exclusive, and in one embodiment, multiple communication modes are utilized.

In an exemplary embodiment, RITS 100 is designed to be a stand-alone device, i.e. not physically or electrically integrated with any of the UAS structures or components. In this embodiment, it is designed to be removably attached to a UAS such that it is carried aloft with the UAS in flight but is able to be easily moved from one UAS to another. In one embodiment, the RITS is independently powered, thereby eliminating any need to electrically interconnect the RITS with the UAS enhancing its portability.

The RITS processor module 110 generally represents the hardware, circuitry and processing logic necessary to execute software instruction code, process sensor data and interface with other RITS modules such as one or more sensor modules 120, one or more communication modules 130, the personality module (PM) 150, and input interface module 140. Personality module 150, while part of non-volatile memory 113, is called out explicitly to emphasize its function for the present invention. Personality programming function 145 represents functionality of the present invention and not a distinct piece of hardware. Thus, it is shown in the figure with no physical connections. Processor module 110 may comprise, or interface to, non-volatile memory 113 for storing computer software instructions (i.e. 'flight code') 112, initialization data, and the personality module 150. The non-volatile memory may be integrated with the processor module 110, may be external, or may have both integrated and external components. The software instruction code 112 would be executable by the processor 110 to perform the functions of sensing flight data, processing the data, retrieving the identity data, forming the Remote ID Message (RIDM), and wirelessly transmitting the RIDM, using the one or more of the communication modules 130, as well as various other interface and control functions.

Processor module 110 may comprise a single processor or may include a plurality of processors, e.g. 110a, 110b, and 110c. In some embodiments and architectures, it may be desirable to have multiple processors to manage multiple sensors or multiple communication modules as discussed in more detail below. In other embodiments, a single processor may manage all sensors and communication modules.

As will be appreciated by those skilled in the art, processor module 110 may be any of a number of devices capable of performing such functions, some examples being microprocessors, microcontrollers, Application Specific Integrated Circuits (ASIC), Programmable Logic Arrays (PLAs), Field Programmable Gate Array (FPGA), Processor System on a Chip (PSoC) systems, etc.

As is well understood in the art, processor module 110 and communication module 130, though drawn separately in FIG. 1 to highlight their functional responsibilities, may in fact be integrated into a single physical System on a Chip (SoC) fabricated component.

Personality programming function 145, though drawn as a separate component, represents a function which may, in fact, be implemented with various components of other modules such as input module 140, personality module 150, processor 110, NVM 113, flight code 112, and communications module 130, as described below (see FIG. 2).

Sensor module(s) 120 is used to gather the navigation data (NRID) of the RID message (RIDM) transmitted from the RITS 100. Recall that the Remote ID Message (RIDM) which is transmitted to end users comprises two major subcomponents, the navigation/guidance data (NRID) and the identity data (IRID). Processor module 110 may interface to sensor module(s) 120 to provide initialization commands related to sensor management and data acquisition. The processor interface to the sensor 120 also controls acquisition and processing of the navigation data. In exemplary embodiments, the sensor initialization, management, data acquisition, and processing is controlled by flight code 112 executing in processor module 110. Sensor management may include scheduling the data acquisition. The scheduling may specify the acquisition be accomplished periodically or on demand. Initialization of the sensor may include controlling the data sampling rate, defining output data types, and the like. Upon receipt of sensor data, the processor module may perform certain processing of the data which again may be controlled by flight code 112. Examples of such processing might be data smoothing, threshold exceedance analysis resulting in alerts, scaling, correcting, reformatting, etc. Coupling of the sensor module(s) 120 and processor module 110 may be by standard interfacing protocols such as I2C, SPI, serial or the like. Specific interface protocol choice will be driven by the sensor component and processor input compatibility. After any processing, the sensor data is available to be used in constructing the navigation/guidance (NRID) portion of the Remote ID Message (RIDM). The sensor data may also be stored for later use.

The RITS 100 comprises one or more sensor modules 120a, 120b, and 120c for sensing UAS navigation flight data. One or more of the sensors may be combined into physically integrated components. For example, one or more sensor modules 120a, 120b, 120c might be combined into a sensor suite 120, resulting in a sensor capable of sensing a plurality of data parameters. Alternatively, the sensors may be discrete, designed to implement acquisition of a limited set of data. As examples, a Global Positioning System (GPS) sensor might be used to acquire position and velocity data, an Inertia Measurement Unit (IMU) sensor to acquire attitude and acceleration data, and a pressure sensor to acquire atmospheric data such as barometric pressure, barometric altitude, temperature, vertical rate etc.

These sensors may work separately or cooperatively in performance of their tasks. For example, by principles well understood in the art, IMU acceleration data can be used to provide incremental position updates to fill in the gaps between the 1 Hz GPS position updates. Similarly, the barometric pressure sensor can be used with the GPS and IMU to refine altitude and vertical speed, infer wind speed and direction, and the like.

In an exemplary embodiment, the Remote ID Tracking System (RITS) 100 comprises one or more sensor modules 120 for acquiring various required UAS navigational flight data such as altitude, attitude, position, speed, heading, environmental data, video, etc. In one embodiment, a modular approach is taken such that sensors may be added or subtracted as needed to meet operational requirements. The complement of sensors is one of the configuration parameters which may be set during the pre-flight programming of the personality data. Even if a sensor is physically present, its data may be ignored by 'toggling' it 'out' of the sensor configuration during the pre-flight programming. This is referred to in this specification as 'soft' configuring meaning it is accomplished using programming and is contrasted with 'hard' configuring, which may use physical switches described below. It is also part of the present invention that specific data items may be selected or deselected from the message stream as part of the pre-flight programming. For example, a GPS sensor may produce outputs for position, speed, and altitude, but if the altitude parameter is not needed, it may be deselected in the configuration file. Note that the sensor may still physically output the data; it would just be ignored by the processor when processing the sensor data. The configurability of sensors permits great operational flexibility without the need for different flight software versions. The configurability function is discussed more below in conjunction with personality data (PD) and pre-flight programming.

Many of the navigational Remote ID Data (NRID) (a.k.a. navigational flight data) components, e.g. position, altitude (geometric), altitude (barometric), vertical rate, track, and ground speed, winds, may be provided by a combination of GPS and pressure sensors. An IMU sensor can add information about attitude and can add some interpolation to GPS position if required. Other data can be inferentially computed based on these inputs such as wind speed and direction. There are many commercial 'off the shelf' (COTS) examples of these sensors easily integrated with microcontrollers. There are also some circuits with an integrated GPS, just one example being a cellular/GPS module. The modular configurable design of the RITS contemplates that additional sensors may be added to accommodate any additional or later added FAA requirements.

Still another example of a sensor contemplated by the present invention is a video or image sensor. Such a sensor might be used for visual detection of nearby air traffic or ground obstacles. Such a video or image sensor might operate in the visual spectrum or at another wavelength such as infrared depending on operational requirements. Such sensors are offered in numerous resolutions, size, image quality, output formats and interface protocols etc.

The processor module(s) 110 also interfaces with the communication module(s) 130 to control initialization such as; setting protocols, communication rates, transmit power, modulation modes, transmit frequency, and the like. The processor module(s) 110 in conjunction with the communication module(s) establishes the external communication paths. The two primary communication tasks are the pre-flight programming of the personality data and the transmission of UAS flight and identification data during operational missions. The invention contemplates that a plurality of communication modes may be employed depending on task, operational mode, and equipment capabilities among other considerations. Communication modes contemplated by the present invention include wired (e.g. serial cable), wireless (e.g. WiFi, Bluetooth, V/UHF, cellular), and even direct physical (e.g. reading an SD card, direct USB interface to programmer). The invention design contemplates a modular design so that communication modules may be added or subtracted in a 'plug-and-play' fashion as mission needs dictate.

Each communication mode may have a communication module associated therewith. For example, if the wireless WiFi protocol is used, a WiFi communication module may be used; similarly, dedicated communication modules may be used for the V/U/SHF RF and cellular communication modes. For direct physical communications (e.g. upload of personality data), a card reader or USB interface might be used. It is also contemplated that multipurpose modules may be utilized. For example, combination WiFi/Bluetooth modules are available, allowing communication with both protocols with a single module. Furthermore, several manufacturers offer products combining a processor module with the communication module to create a System on a Chip (SoC). There are also manufacturers which integrate a sensor and a communication module.

Figure 3A:
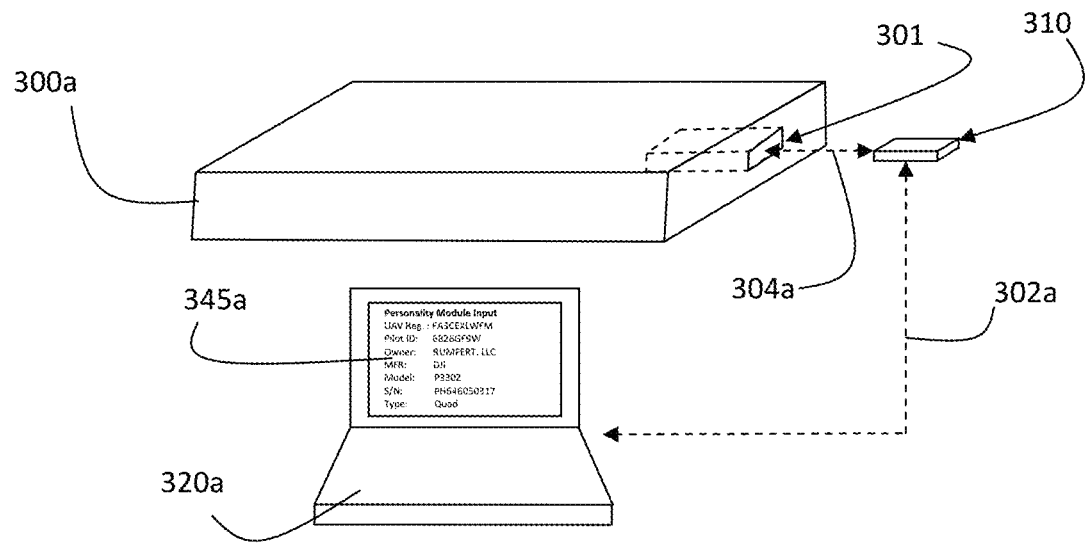
FIGS. 3a-3e illustrate several of the RITS pre-flight programming techniques.
Figure 3B:
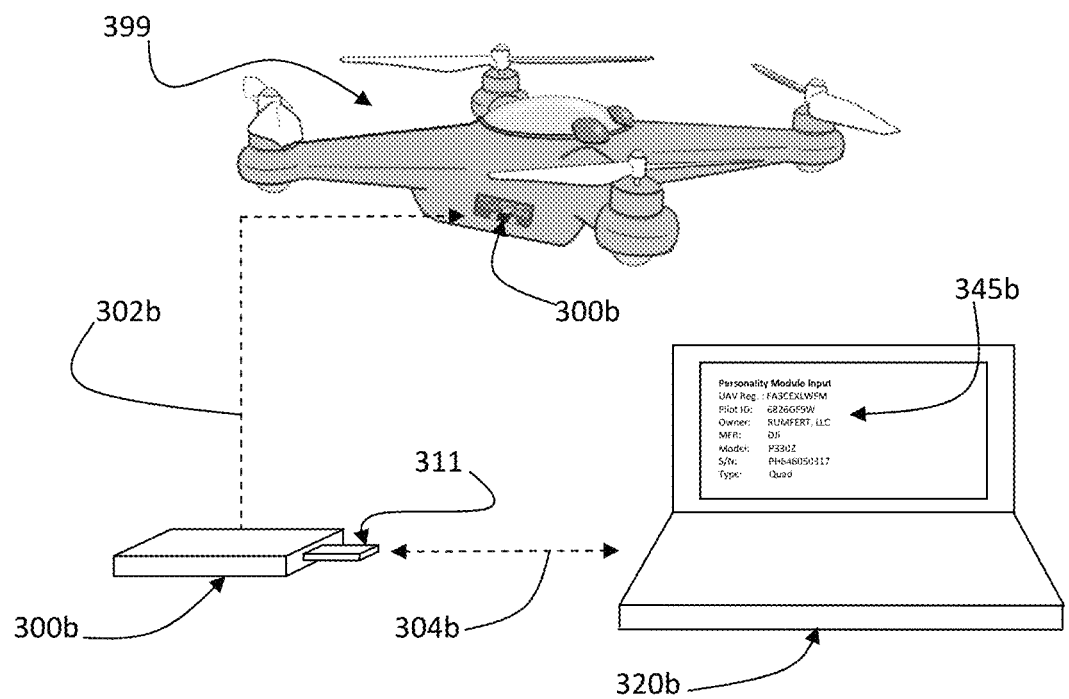

In an exemplary embodiment, the pre-flight programming of the personality data (PD) is accomplished using wireless techniques such as WiFi, Bluetooth or the like (see FIGS. 3c and 3d) which may be used to establish a communication link between the programming device and the RITS. In another embodiment, the pre-flight programming of the personality (i.e. identity/configuration) data is accomplished using the wired (serial) communications (FIG. 3e). In yet another embodiment, the pre-flight programming uses card readers or memory modules (FIGS. 3a and 3b). The installed RITS communication modules 130 would be compatible with the desired RITS/programmer communication protocol. For example a wireless communication module would be installed for WiFi, V/UHF, Bluetooth and the like. Similarly, a serial communication module would be installed for serial communication with the programmer.

In exemplary flight mode embodiments, communication of the UAS Remote ID Data (RIDD) is accomplished using wireless protocols. For example, line of sight communications utilize the V/UHF communication, while longer range communications are implemented utilizing cellular/internet. In some very short range missions, direct WiFi or WiFi to a router/internet modem or mobile hotspot might be used (see FIGS. 7-10). Note that the various communication modes are not mutually exclusive and can be utilized simultaneously. For security purposes, it may be desirable that the communication module transceiver(s) being used employ some type of encryption to secure the communications.

In an exemplary embodiment, the communication modules might establish one or more wireless networks 199, broadcast communication paths 161-163, or connect to the internet or any combination thereof (see FIGS. 7-10). As mentioned, there may be one or more communication modules to service multiple communication protocols such as Wi-Fi, Bluetooth, Zigbee, cellular, V/U/SHF RF, WPAN, satellite, Radio Frequency (RF), infrared, lightwave, microwave to name just a few. The processor/communication module interface provides the means for the processor module(s) 110 to convey the RID data message (RIDM) to the communication module 130 so that it can be transmitted to end users. Coupling of the communication modules 130 and processor module 110 may be by standard interfacing protocols such as I2C, SPI, serial or the like. Specific choice will be driven by the hardware selected for the implementation.

As mentioned, in some embodiments, multiple processors manage communications. For example, in one embodiment, employing a plurality of communications protocols, a first processor module is implemented by a System on a Chip (SoC) integrated circuit which also includes the WiFi communications module. In that same embodiment, a second processor module manages the communication with a cellular transmitter/modem and a V/U/SHF RF transmitter. In that embodiment, overall system processing and management such as reading from NVM, reading sensors, and constructing the output messages may be performed by either the first or second processor module. In another embodiment, a single processor manages interfaces with all communication modules. Specification of installed communication modules is a configuration item.

For longer distances, network 199 may represent a global network such as the internet. Access to the internet may be made directly from the UAS or indirectly routed through a ground receiver. In one embodiment, a cellular communication module is integrated as part of the RITS hardware to provide internet access through the cellular system (see FIGS. 7, 8). In another embodiment, internet access is accomplished through use of a WiFi communication module on the UAS/RITS to connect to a ground receiver (e.g. router/modem or mobile hotspot) which could then connect to the internet through its cellular/internet or broadband connection (see FIG. 10). In another embodiment keeping with the invention's modular design, a 'plug-and-play' cellular modem may be used as one of the RITS communication modules. Such 'plug-and-play' modems are available from some cellular providers. Another possibility is satellite communication, although the equipment requirements may be prohibitive for smaller UAS.

WiFi, Bluetooth, V/UHF may also be used directly for tasks such as pre-flight programming the RITS with personality data and pre-flight verification procedures as described more below. In addition to pre-flight activities, a WiFi connection might be used to receive and display UAS Remote ID Messages (RIDM) on flights in the local area. Such flights might be recreational or might be a limited range commercial flight such as real estate photographic survey or a property inspection.

Regardless of the communication module realization, transmission/reception will generally require one or more antennae. In FIG. 1 it is seen that the communication module(s) 130 are connected to communications antenna 135 for broadcast of Remote ID Data (RIDD) and reception of data such as pre-flight programming. When multiple communication modules 130 are utilized in the design, an antenna for each module may be needed. Antennae may be mounted on the top, bottom or sides of the UAS or any combination thereof necessary to achieve the communications desired. For example, for satellite communications, the antenna would typically be placed on the top of the UAS facing skyward. Similarly, for air-to-air communications, it would likely be desirable to have an antenna mounted on top of the UAS. Conversely, for communications primarily directed at ground receivers such as cellular communications, the antenna might be placed on the bottom. For communications directed to both ground receivers and airborne receivers, it might be desirable to have antennas on both the top and bottom of the UAS placed so as not to interfere with flight operations. Alternatively, some communication modules (e.g. WiFi) may have an integrated antenna such as a PCB trace antenna. Nonetheless, an external antenna may still be required.

It should be noted that there may be other antennas in the system beyond the antenna associated with the communications module. For example, if the sensor complement 120 includes a GPS receiver, it would have an antenna associated with it. The antenna associated with the GPS would typically be mounted on top of the UAS so as to have a clear view of the GPS satellite constellation. Patch antennas are frequently used in portable GPS applications.

As mentioned, network 199 may include one or more networks which may be operating simultaneously. In one exemplary embodiment, RITS 100 utilizes a WiFi module programmed to function as a wireless access point to implement the pre-flight programming function. Client devices such as portable programming devices 151*a* or 151*b* may then wirelessly connect to the RITS 100 thru the Wi-Fi network 199 created by the RITS WiFi module. Portable programming devices may be any variety of portable devices capable of displaying, storing, processing, and transmitting data. Some examples without limitation include laptop computers, personal data assistants, miscellaneous computer devices, smartphones, smartwatches and other so-called smart devices. Client devices such as portable programming devices 151*a* and 151*b* may also function as receivers/displays to receive and display RID data during the mission.

In another exemplary embodiment, network 199 may also represent a global computer network (internet) where RITS 100 may convey Remote ID Data (RIDD) to ground stations such as 170 and 171. As described in more detail below, the RITS 100 may utilize a cellular/internet modem as one of the communication modules 130 to connect directly to internet database servers which may collect and disseminate RID data from RITS throughout the US to end users (see FIGS. 16-18). Ground stations such as 170 and 171 connect to the internet database servers using conventional means to retrieve the RITS RID data. In addition to the internet connection through a cellular/modem, the RITS 100 may utilize a relay connection to the internet by connecting to a ground based router/modem or an intermediary device (see FIG. 10).

In addition to networked communications, broadcast communications may be employed 161-163. Again, the various communication modes, WiFi, cellular/internet and broadcast are not mutually exclusive, and one or more may occur simultaneously. In one embodiment, V/U/SHF RF signals are used for broadcast communication 161, 162, 163, 166 between the RITS 100, other airborne manned vehicles 190, unmanned vehicles 195, and ground stations 170 and 171. Such communications are, of course, subject to the range limitations inherent in such modes. All three of the above embodiments may be employed simultaneously, exclusively, or in any combination thereof, depending on circumstances as discussed below. Opting various communication modules 'in' or 'out,' is accomplished during the pre-flight personality programming.

As mentioned, a feature of the invention is the personality programming function (PF) 145 which implements the pre-flight programming of the configuration and identity data, referred to collectively as 'personality' data. Configuration data allows the operator to opt 'in' or 'out' various sensors and communication modules while the identity data identifies a particular UAS, pilot, and the mission. Upon programming, the personality data is written to the personality module (PM) 150. Together, the personality (identity/configurability) programming process enhances the utility and mission flexibility. The personality programming function 145, though drawn as a separate discrete component to facilitate discussion, may, in fact, be implemented with various components of other modules such as input module 140, personality module 150, processor 110, NVM 113, flight code 112, and communications module 130 (see FIG. 2).

As part of the pre-flight programming process, the personality programming function 145 also provides a means for accomplishing a pre-flight verification of the data. A major benefit of the invention's teaching is the ability to reuse personality (i.e. identity/configuration) data which has not changed from the previous flight, thereby minimizing the amount of data which must be entered. Notwithstanding the reuse, it is prudent to enforce a verification process to ensure both the reused data and any edits are properly stored in NVM 113. Note that for the programmed personality verification process, the personality data (PD) is retrieved from RITS NVM personality module to ensure the data verified is what is actually stored, not what is on the programmer GUI 'screen' or 'page.'

The personality module (PM) 150 includes an area of NVM where the personality data is stored. In the figure, it is drawn separately to illustrate that it is separately programmable from the remainder of the RITS flight code 112 which may also reside in NVM. The module may also comprise software coded procedures to execute the programming/verification functionality, and it may include routines executed during flight into which the main software application 112 may 'call into' to retrieve the identity or configuration data.

There are a variety of methods for programming the personality data into the RITS personality module 150. In one embodiment, personality module 150 programming utilizes a portable storage media such as an SD card or the like, which could be inserted into a card reader associated with the RITS. In a second embodiment, the personality module programming function utilizes wireless transfer, where the personality data would be wirelessly conveyed to the RITS and then read and stored by the RITS processor in NVM personality module 150. In yet another embodiment, the personality module 150 programming utilizes a direct transfer mechanism, where the personality data would be directly transferred to the RITS via a physical connection and then read and stored by the RITS processor. These techniques are discussed more in connection with FIGS. 3a-3e.

Once the personality data has been programmed into the personality module 150, it needn't be changed unless the personality data changes. For example, if the pilot and the UAS remain the same from flight to flight, there is likely no need to update the personality data (PD) other than perhaps any mission specific identifier. However, if the RITS is moved to another vehicle or there is a change in pilot or the like, then it would be necessary to update the personality data (PD) prior to flight. This processing logic is part of a pre-flight process to determine if personality data (PD) has been presently programmed or that previously programmed data is still valid. This process is discussed in detail below in conjunction with FIGS. 5a-5d.

The RID data transmitted by the RITS can conceptually be separated into two groups: navigation/guidance data and identity data. Navigation/guidance data includes one or more parameters such as position, velocities, heading, track etc. Navigation data is dynamic in that it changes throughout the flight. Identity data may include one or more data such as pilot identity, vehicle registration, vehicle make and model, mission ID, etc. The identity data is static during a flight but changes from vehicle to vehicle and may even from one flight to another on the same vehicle (e.g. mission ID). Therefore, the identity data most likely must be programmed or at least updated before each flight.

The navigation and identity data are utilized to create an output message or plurality of messages which constitute the Remote ID Message (RIDM). The RIDM is what is transmitted from the communication modules 130 to end users such as law enforcement, air traffic management, remote pilots, and the like. In one exemplary embodiment, the processor module 110 receives the navigation data by 'reading' sensors 120 and the identity data by 'reading' NVM 113, constructs the RIDM in accordance with FAA rules, and then forwards the message to the communication module(s) 130 for transmission.

As mentioned above, the data pertaining to remote identification and tracking function (i.e. Remote ID Data (RIDD)) can be subdivided into two components: navigation flight data (NRID) and identity data (IRID). A few examples of the navigational flight data which could be useful for implementation of the 'tracking' portion of the remote identification and tracking function include:

UAS Position (latitude/longitude)
Position integrity/accuracy (GPS estimate of position integrity/accuracy)
Altitude (barometric, geometric)
Vertical Rate (rate of climb/descent)
Heading, Track Angle, and Ground Speed (velocity)
Wind Speed/Direction
Control Station Position/Altitude
Environmental data (temperature, pressure)
Status (Normal/Emergency)

A few examples of identity data which may be useful for implementation of the 'identification' portion of the remote identification and tracking function include:

UAS FAA Registration
UAS owner
UAS Manufacturer, make/model, serial number
UAS Class (e.g. <55 lbs)
Pilot identification
Mission ID Clearly, data may be added to or subtracted from these lists. The precise composition of the navigation and identity data used to compose the RID message (RIDM) will be determined based on operating mode and regulatory requirements (rule sets) and may vary from time to time. Note that not all entered personality data (PD) or sensed navigational data is necessarily transmitted in the RIDM.

The personality programming function 145 includes a plurality of parameters ('configuration parameters') to tailor the operation of the RITS 100 to the specific requirements or physical configuration of the RITS 100. Recall that configurability relates to specifying what sensors and what communication modules are to be used. Configuration might also include some operational parameters such as timing, sensor constants, alert or other limits, and the like. Configurability may have aspects of 'hard' configurability and 'soft' configurability as described below. 'Soft' configurability is the pre-flight programming which sets 'flags' in the software indicative of the desired configuration. 'Hard' configurability may be set by a physical switch (e.g. DIP switch) indicating the presence or absence of a particular sensor or communication module. These 'hard' settings are sometimes referred to as 'straps' or 'strap settings.' The 'hard' and 'soft' configurability functions would work cooperatively with compatibility error checks. For example, if the RITS did not physically have a GPS sensor or cellular modem installed, and the operator attempted to configure 'in' those components, an alert might be raised. The physical configuration switch may be part of the input module 140 and may be physically interfaced to the processor module 110. As part of the power-up initialization process, the state of the switch ('straps') may be read and stored in NVM personality module 150. In addition to hardware, configurability may also be used to specify the navigation and identity parameters used in the Remote ID Message (RIDM) and also some operational parameters such as integration constants, power settings, alert limits, data smoothing constants, security (encryption) constants, frequency modes, operational flags (e.g. data verification, weight-on-wheels (WOW) state), and the like. (Note that throughout the specification, where Weight on Wheels (WOW) is used, it is intended to cover both a 'hard' physical WOW switch and a 'soft' virtual switch where the switch state is inferred based on some criteria such as altitude, e.g. if AGL altitude <10 feet=>WOW=ground).

The ability to opt 'in' or 'out' various sensors and communication modules on a mission by mission basis promotes operational flexibility by allowing a 'generic' design with a full-up complement of sensors and communication modules along with a full-up software build, all of which can be configured with a simple pre-flight programming, thereby tailoring the system to the mission while maintaining the same physical hardware and software. This allows the hardware and even the flight code to remain the same and only a reprogramming of the NVM personality module 150 required to move the RITS from one UAS to another. This configuration programmability is referred to in this specification as the 'soft' configurability. In addition to this 'soft' configurability, a 'hard' configurability may also be implemented. In one exemplary embodiment, the 'hard' configurability is implemented using a series of switches, the position of which indicates the configuration status of an individual item. These switch settings are sometimes referred to as configuration 'straps.' A part of the pre-flight programming and initialization may be the flight code 113 'reading' the 'hard' configuration settings ('strap settings') in addition to the 'soft' settings in NVM.

The portability afforded by the 'generic'+configurable design might help mitigate the costs for drone operators by sharing the cost of an RITS system. As one example, members of a flying club might be spared the expense of each purchasing a Remote ID unit if the club purchased a set which could be borrowed or otherwise shared between members with the member personalizing the unit to himself prior to flight by reprogramming the personality module 150.

The RITS includes a non-volatile memory (NVM) 113. The NVM may be utilized for storage of software instructions (code) 112, executable by the processor module(s) 110. Additionally, an allocation of NVM is set aside as the personality module 150 for the storage of the personality and initialization parameters. The personality module (PM) 150 is shown separately in the figure to emphasize that it is separately programmable from the software instructions also residing in the NVM. During the flight, the processor module(s) may read the personality module 150 to extract the identity data for use in formatting the RITS output message (RIDM). The configuration parameters, also stored in the personality module (PM) 150, may be read at power-up or after a programming event. The non-volatile memory 113 may be a separate, discrete component in the RITS, or, in some cases, a processor module 110 may integrate a nonvolatile memory as an integral part of the Integrated Circuit such as in a System on a Chip (SoC) design.

NVM 113 may also be used to store flight data. One example is to store a portion of flight data such as the last 30 minutes of flight, to provide data for graphical displays or for later analysis supporting incident investigations, etc. The data stored might be all the collected data or a relevant subset of data.

The processor module(s) 110, as well as other components, will require access to electrical power. In one exemplary embodiment, an independent source of power 125 such as a battery is provided to electrically power airborne sensor system components. In one preferred embodiment, a battery such as a LiPo battery is used. As is well understood in the art, LiPo batteries are high energy voltage sources capable of supporting the discharge rates frequently required by transmitting components while still maintaining a compact size and weight. Use of a separate power source electrically and physically isolates the RITS from the UAS. The physical isolation facilitates its movement from one UAS to another, as well as preserving the integrity of the UAS itself. Also, electrical isolation eliminates the power drag on the UAS power and resulting decrease in UAS flight time. Additionally, an independent power source may be a more viable design for retrofit RITS units. Further, physically and electrically isolating the RITS from the UAS system works to enhance security of Remote ID Data (RIDD) by minimizing potential for 'hacking' of the RITS data and the possibility of data being shared with unintended third parties or foreign governments.

In an alternative embodiment, the RITS may be powered from the main UAS power source. This may or may not include other integration of the RITS unit with UAS avionics systems. In one embodiment discussed below in conjunction with FIG. 4, the RITS implements a power interlock so that power to the UAS avionics and flight controls is inhibited until pre-flight verification checks are completed.

The invention may include computer software instructions executed by the one or more processor modules 110. In these embodiments, the computer instructions or code 112 are executable by the processor module(s) 110, and when executed, cause the Remote Identification and Tracking System (RITS) to perform the data sensing and tracking functions described herein. As described in more detail below, these instructions will, among other things, control the personality programming, initialization sequence, sensor data collection, and processing and wireless transmission of RID data. In one exemplary embodiment, the code 112 also builds the display pages on the portable programming device during the pre-flight programming operations discussed below. The code 112 may be referred to as the 'flight code' to identify it as the code associated with the airborne RITS system. Flight code 112 might be factory preloaded and/or field loadable or field modifiable as is well understood in the art. In an exemplary embodiment, the flight code 112 is loaded into the RITS processor NVM memory 113 in the factory prior to shipment. As mentioned above, in an exemplary modular design, a 'generic' flight code could be loaded into NVM and the desired sensors, communication modules, and functions activated by the pre-flight programming of the configuration parameters as dictated by the mission. An overridable default set of configuration parameters may be pre-programmed into the code to allow a default set of functions in the absence of pre-flight programming. In one exemplary embodiment, the modifiable defaults are in accordance with the applicable rule sets (see FIG. 6*q*).

In addition to the flight code 112, the invention contemplates a computer software instruction set 153a, 153b executing in the receiver/programmer devices 151a, 151b. This code might be referred to as 'app code' to distinguish it from the 'flight code.' The app code provides an operator interface to the RITS for the pre-programming function and for displaying Remote ID Data (RIDD). Functional operation of the app code and associated operator graphical user interface (GUIs) is discussed in more detail below in conjunction with FIGS. 5a-d and 6a-r.

In some embodiments, the RITS 100 may also include an input/display interface module 140 coupled to processing module 110. The input/display module 140 could be an alternative means of setting configuration or initialization variables that could be read by the processing module 110. The input/display might comprise one or more dual in-line package (DIP) configuration switches, keypad, and/or other entry means, and associated display. As was mentioned, a 'hard' configurability might comprise a plurality of switches, the position of which might indicate the presence or absence of a particular sensor or communication module or other configurable item. The input module 140 may also comprise the weight-on-wheels (WOW) module 142 used to determine if the UAS is on the ground or in the air. Recall the WOW module may be a physical 'hard' switch or a virtual 'soft' switch. The input module 140 may also include a display module for displaying personality and initialization data for verification. The input interface 140 may also comprise a power switch controlling application of electrical power to the RITS 100. The input/display may also comprise a card reader for reading portable storage media such as SD or CF memory cards, memory sticks or the like for use in pre-flight programming.

As was mentioned, the personality programming function (PF) 145 may include a portable storage media. The removable storage media could be something similar to a micro SD card or a Universal Serial Bus (USB) memory 'stick.' The card or memory stick could be inserted into a computing device such as a personal computer, laptop, tablet, or similar. The portable programming device could capture the personality data and transfer the data onto the card/stick. The card/stick could then be inserted into the RITS for reading. The process is discussed in more detail below in conjunction with FIGS. 3a and 3b.

Figure 2:
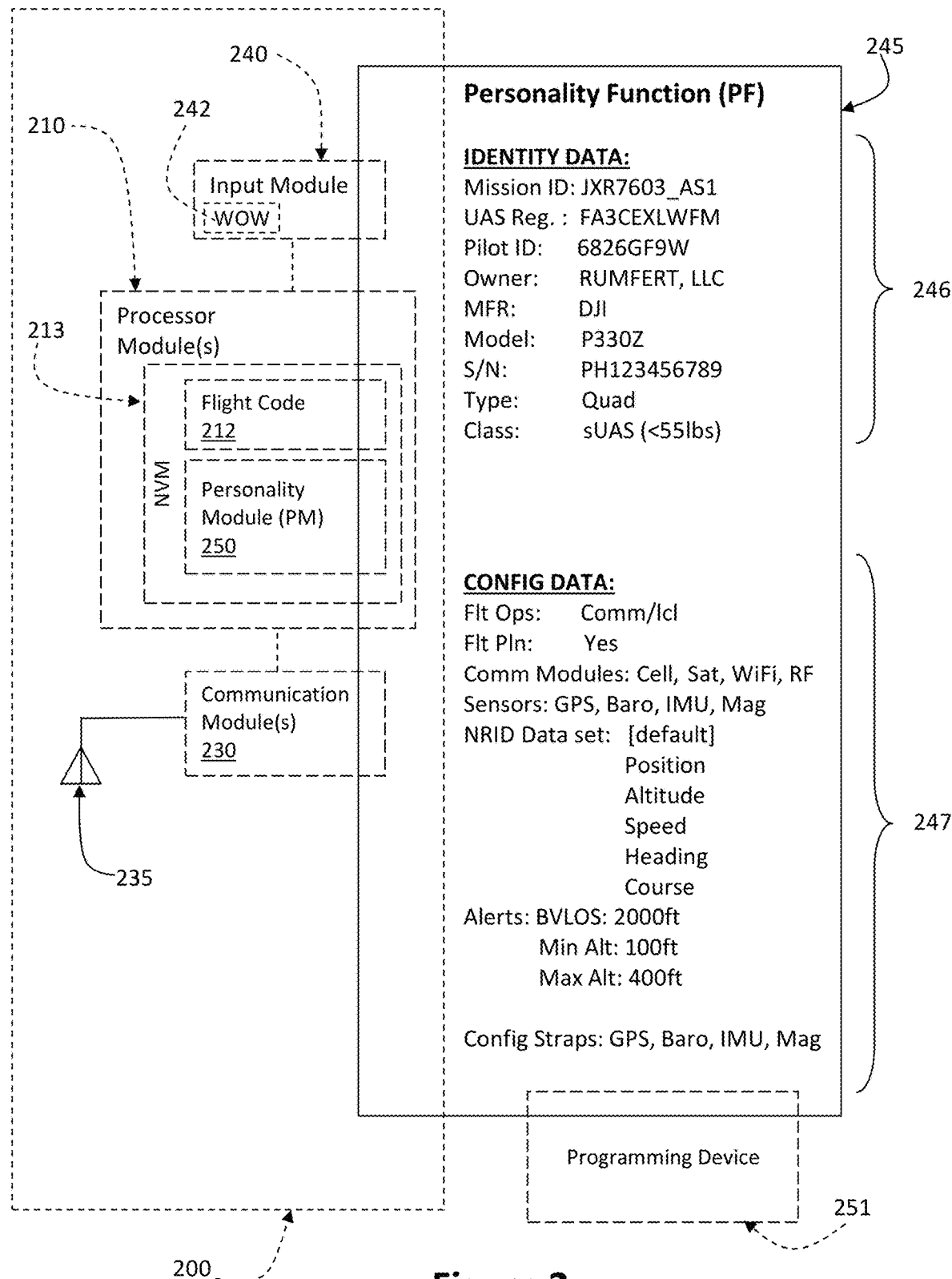
FIG. 2 is a block diagram showing the personality programming functionality and its interface with the RITS.

FIG. 2 illustrates the functioning of the personality programming function (PF) 245 and how it interfaces with various components of the RITS 200 system and the programming device 251. The personality programming function (PF) 245 is a conceptual construct used to explain the functional features of the pre-flight programming process and how the function utilizes various physical components of the system to implement the function. As described above, in one exemplary embodiment, the personality module (PM) 250 is a reserved section of NVM 213 where the personality (i.e. identity and configuration) data resides.

As was mentioned above, the personality data comprises two categories of data: the identity data 246 and the configuration data 247. The configuration data 247 component of the personality data includes information regarding the hardware state of the RITS (e.g. sensors/communication modules utilized for the mission, operating mode, and perhaps data set identification). The 'identity' component 246 of the personality data comprises data associated with the 'identity' of the UAS (e.g. Mission ID, FAA UAS registration number, pilot identification, UAS owner, UAS manufacturer, UAS Model, UAS serial number, UAS Type, and UAS Class (i.e. greater or lesser than 55 lbs)). This identity data is then used to construct one portion of the Remote ID Message (configuration data is generally not used in construction of the RID message). Recall that the remote identification data message (RIDM) comprises a navigation component (NRID) and an identity component (IRID); RIDM=NRID+IRID. The abstraction of the personality (i.e. identity/configuration) data from the remaining (navigation) Remote ID Data (RIDD) allows this vehicle/pilot/mission data to be programmed into the RITS prior to flight. The personality programming function (PF) 245 is a method of providing the pilot/operator the means for programming and verifying the RITS personality module 250 prior to flight. This allows the RITS to be 'personalized' for a specific flight and vehicle. Thus, the RITS can be moved between UAS vehicles with only a reprogramming the personality module 250 needed to adapt the unit to the specific UAS.

As mentioned, the personality module (PM) 250 is drawn separately from the NVM 213 to highlight both its function within the larger personality programming function (PF) 245 and to illustrate its programmability separate from the remaining NVM 213. To illustrate the role that each of the system components may play in the personality programming function, the box representing the personality programming function 245 is shown overlaying input module 240, the processor module 210, the flight code 213, the personality module 250, the communications module 230, and the programming device 251.

In an exemplary embodiment, a communication module 230 on the RITS 200 establishes a wireless network to which the programmer 251 may connect. Upon operator command, the programmer may display one or more pages listing the various personality (identity+configuration) items to be defined and/or specified. If the RITS personality module is being programmed for the first time, all the data items may be blank. If the personality data is merely being updated from a prior flight, the pages may display the data currently stored. The pilot would then enter data anew or edit the existing parameters requiring modification. The pilot may then select the program function which would transfer the entered/modified data over the wireless network to the RITS 200 where it would be written into the personality module 250. In an exemplary embodiment, a verification of the data is required due to the importance of the data.

A verification may be initiated either automatically after the programming function or manually at the request of the pilot. Either way, the data is retrieved from the personality module 250, transferred over the wireless connection to the programmer 251, and displayed for review. If verification is indicated, a command may be sent to the RITS 200, whereupon a verification 'flag' may be stored. If verification is not indicated, the pilot may edit any offending data entries and the personality module re-programmed. The edited personality data would then be transferred to the RITS, and the verification process would be reinitiated. For succeeding flights, only delta data (e.g. mission ID) need be modified and reprogrammed, thus minimizing the chance for erroneous entry and also minimizing the time necessary for pre-flight programming. During flight, the processor would access the personality module 250, retrieve the identity data, and use it in constructing the Remote ID Message (RIDM). Note that not all entered identity data or sensed navigational data is necessarily transmitted in the RIDM. Note also that programming may be restricted to when the UAS is on the ground (weight on wheels (WOW)=ground). (As noted above, WOW is intended to cover both a physical WOW switch and a virtual switch). The process steps and additional details are discussed below in conjunction with FIGS. 5a-d and 6a-r. While the process described utilized a wireless transfer, the invention contemplates non-wireless transfers as well.

In some embodiments, the input module 240 might be used to facilitate the transfer of the personality data into personality module 250. In one embodiment, the input module might have input keys to input data and command the transfer of data into memory. In another embodiment, the input module 240 might include a display for displaying actions and results of the transfer of identity data 246 and configuration data 247 into personality module 250. In still another embodiment, the input means may comprise a 'card reader' adapted to read a memory card such as an SD or CF card or 'memory stick' on which the personality data has been previously stored.

In one embodiment, input module 240 might also comprise an alternative means of entering hardware configuration. In that embodiment, input 240 might comprise a switch such as a dual in-line package (DIP) switch, the positions of which indicating the presence or absence of particular hardware such as sensor or communication modules. This is referred to in the specification as 'hard' configurability in contrast to the 'soft' configurability provided through personality programming. The input module 240 may also comprise the weight-on-wheels (WOW) module 242 used to determine if the UAS is on the ground or in the air. Recall the WOW module may be a physical 'hard' switch or a virtual 'soft' switch.

Figure 3C:
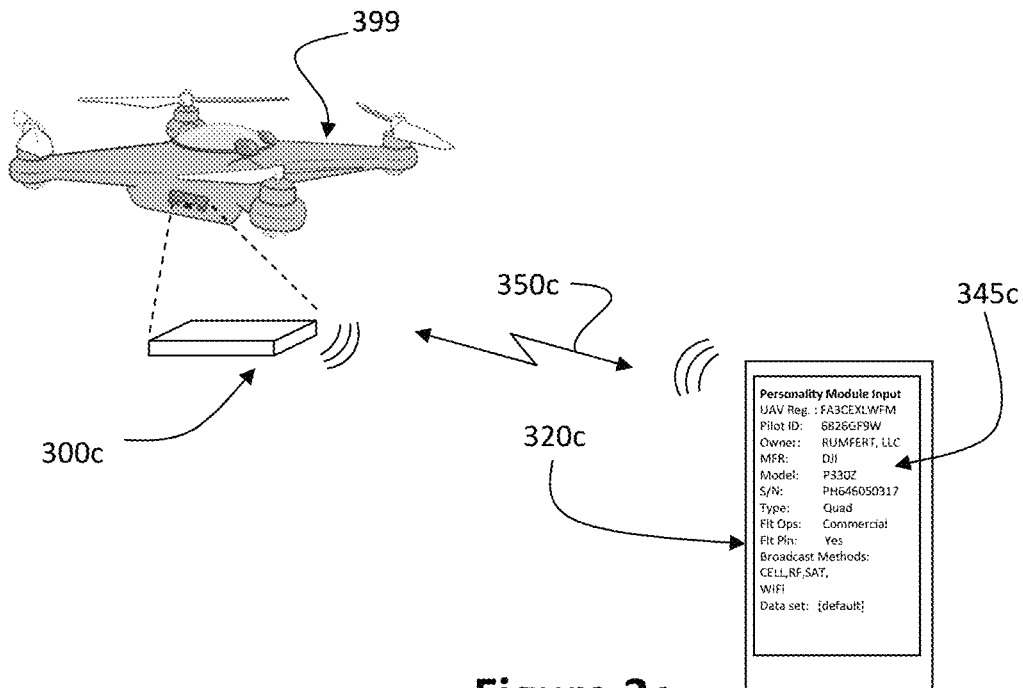
Figure 3D:
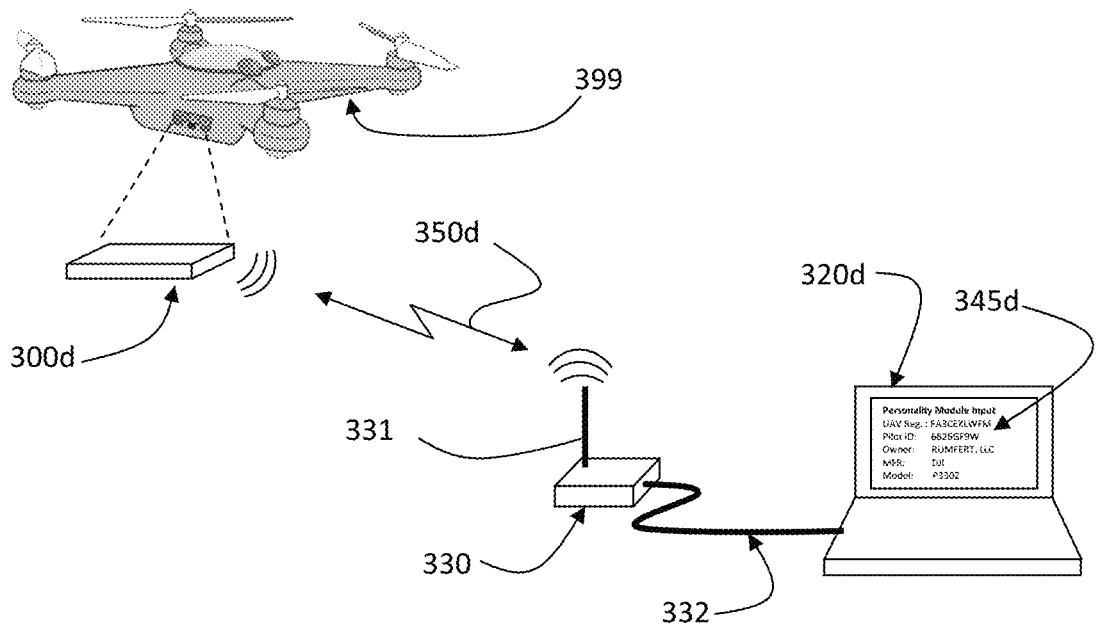
Figure 3E:
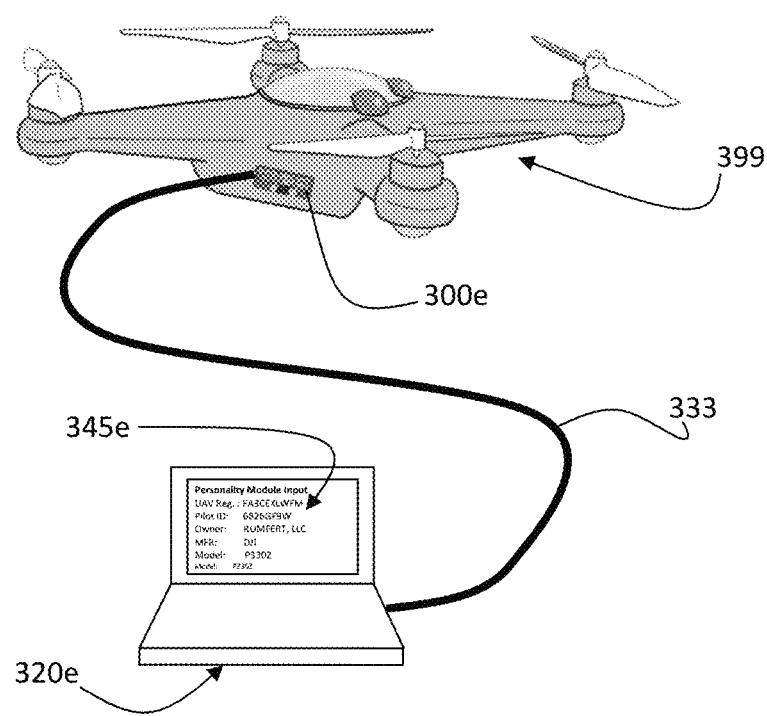

FIGS. 3a-e illustrate different methods for programming the personality module (PM) in Remote ID Tracking System (RITS) non-volatile memory (NVM). As mentioned previously, the three principle methods are wired, wireless, and a portable storage media. FIG. 3a illustrates the use of a portable memory storage media 310 to transfer the personality data to the RITS 300a. FIG. 3b illustrates the direct transfer of the personality data into the RITS 300b by temporarily connecting the RITS 300b to a portable programming device 320b. FIG. 3c illustrates a first method of wireless transfer of the personality data to the RITS 300c. FIG. 3d illustrates a second method of wireless transfer of personality data to the RITS 300d. FIG. 3e illustrates a method of wired transfer of personality data to the RITS 300e.

For operational and security reasons, programming of the personality module with personality data may be restricted to situations where the UAS 399 is not in flight (i.e. weight-on-wheels=GROUND). Additionally, for security reasons, access to any wireless networks used for programming could be controlled by encryption codes requiring proper authentication prior to being granted access to the UAS/RITS wireless network. Access for the wired implementations is likely not as critical since physical access to the UAS is more easily controlled.

In an exemplary embodiment, the personality programming process includes verification of the data after it has been entered and stored in RITS NVM. In addition to verification of the personality (i.e. identity/configuration) data, the navigational flight data might also be part of the verification process. The connections between the RITS 300a-e and the portable programming device 320a-e illustrated in FIGS. 3a-e would permit this pre-flight verification. In one exemplary embodiment, transmission of RID data from the RITS is inhibited until verification of personality data is accomplished. The techniques are described in greater detail below.

FIG. 3a illustrates a method of programming the RITS 300a with personality data using a portable storage media 310. In one embodiment, the portable storage media 310 might be a micro secure digital (SD) card. In other embodiments it might be a USB memory stick, a Compact Flash (CF) card, universal flash drive or the like. As was mentioned in conjunction with FIGS. 1 and 2, the input means (not shown) may comprise a card reader. In FIG. 3a, RITS 300a is shown comprising a 'port' 301 for receiving the portable storage media 310. The 'port' or 'card slot' 301, as it is sometimes referred, would receive the portable storage media 310, allowing it to be 'read' in the conventional manner.

In operation, the portable non-volatile storage media 310 might be inserted 302a into a portable programming device 320a such as laptop, tablet, or other portable computing device. The portable programming device 320a might have a software application ('app code') which provides a template 345a or other means for an operator to enter the personality data. The portable programming device software application may perform checks on the entries to make sure they have the correct format and that any 'must enter' data has been entered. There may also be code in the portable programming device 320a and/or RITS to perform verification that the data was properly transferred to the RITS 300a. The data might then be transferred to the portable storage media 310 by conventional means such as writing to the card or file copying, using the 'drag and drop' file transfer function in a process well understood in the art.

Once the personality data has been stored on the portable storage media 310, the portable storage media 310 could then be removed 302a and inserted 304a into the card reader slot 301 in RITS 300a. For example, if a micro SD card is used, receptacle 301 might be a micro SD card connector such as Micro SD by Molex, TE connectivity and others. Other storage media (e.g. CF, PCMICA, etc) have similarly compatible card reader connectors.

Once the portable storage media 310 has been inserted into the reader slot 301, the RITS instruction set (212, FIG. 2) would execute a 'read' of the installed portable storage media 310 and transfer its contents into the personality module (PM) (250, FIG. 2) of the RITS 300a. The RITS instruction set (212, FIG. 2) could be programmed to 'read' and transfer the contents of the portable storage media in response to a user input from the input module or automatically upon detection of the portable storage media in card slot 301. This functionality is described in more detail below in conjunction with FIG. 5b. Verification of the personality data could be accomplished using the wireless techniques described below or could be accomplished by the RITS retrieving the contents of the personality module (250, FIG. 2), storing them on the portable storage media, returning the storage media to the programming device, and verifying the data.

FIG. 3b illustrates another exemplary implementation of the personality programming method. In this embodiment, instead of having a slot for receiving a portable storage media, the RITS 300b itself has a connector 311 for connecting directly to the portable programming device 320b such that the personality data is transferred directly to the personality module (250, FIG. 2) from the programming device. As discussed above, portable programming device 320b may be any type device able to store and transfer data such as a laptop, tablet, PDA, or smart devices such as smartphone or the like. In one preferred embodiment, the portable programming device 320b is a laptop. The RITS 300b data transfer connector 311 may be inserted 304b into the portable programming device 320*b* containing a reciprocal mating connector (not shown) (e.g. USB). Connecting the RITS 300*b* to portable programming device 320*b* allows the personality data resident on portable programming device 320*b* to be transferred to the RITS 300*b*, using, for example, the 'drag and drop' file transfer or the like. RITS 300*b* is then re-attached 302*b* on the UAS 399. Upon insertion into the portable programming device, the RITS might appear in the file explorer as a memory device as is well understood. Verification could be accomplished by reading the contents of the personality module (250, FIG. 2), displaying the data on the programmer, and verifying its contents.

Data transfer connector 311 may be any type compatible with the portable programming device 320*b*. In one exemplary embodiment, connector 311 is a USB connector. Many other connector types are acceptable, the important feature being that it is compatible with the mating connector on the data storage device 320*b* or that an adapter is available. One additional advantage of using the direct physical connections illustrated in FIGS. 3*b* and 3*e* is that the recharging of the RITS battery may also be accomplished through the same connection used for personality data transfer as is well understood in the art. A still further advantage is the security aspect. The techniques of FIG. 3*b* are especially applicable to embodiments where the RITS is a removable attached stand-alone device.

FIGS. 3*c* and 3*d* illustrate other exemplary implementations of the personality programming function. In these implementations, the personality data is programmed using over-the-air (OTA) wireless communication links. This may occur while the RITS is attached to the UAS 399. Any one of numerous communication protocols may be used. In one embodiment, the WiFi protocol is used. In another, the Bluetooth protocol is used. In still another, V/U/SHF RF protocol is used. In exemplary embodiments, the wireless networks are password protected to secure communications.

As discussed above, portable programming devices 320*c*, 320*d* may be any type device able to store and transfer data such as a laptop, tablet, PDA, or smart devices such as a smartphone or the like. In one exemplary embodiment, the portable programming device is a laptop, and in another it is a smartphone. For initial entry of data (no personality data previously stored), the portable programming device 320*c*, 320*d* may contain code ('app code') which displays a template 345*c*, 345*d* of personality data entry and display fields and selections. This template provides an easy method for entering the personality data. The app code may even perform range and format checking on the entries and verify that any 'must enter' data has been entered. If personality data has been previously stored, the app code in conjunction with the flight code may retrieve and display the currently stored data for editing of necessary parameters. In exemplary embodiments, there is also code in the portable programming device 320*c*, 320*d* and/or RITS 300*c*, 300*d* to perform verification that the data was properly transferred to and stored in RITS personality module. These process steps are discussed in more detail in conjunction with FIGS. 5*a*-5*d*.

In the exemplary embodiment illustrated in FIG. 3*c*, the portable programming device 320*c* is embodied as a smart phone connected via a wireless WiFi connection 350*c* to the RITS 300*c*. Other computing devices might also be used such as smartwatches, personal data assistants (PDAs), tablets, laptops and the like. While for illustration purposes the RITS 300*c* is shown separated from the UAS 399 in the figure, there is no need to remove the RITS 300*c* from the UAS for programming. It is expected that the programming of the personality data will occur while the RITS 300*c* remains attached to the UAS 399 to minimize unnecessary activity. In one exemplary embodiment, a communication module on the RITS 300*c* may act as a WiFi access point. The portable programming device 320*c*, such as a smartphone, may connect to this network 350*c* as a client. In one embodiment, the RITS 300*c* builds pages on the programmer 320*c* for entry of the data. In an alternative embodiment, the programmer software app ('app code') may include a template 345*c* for entering and editing personality data. In one embodiment, html forms are used to collect the data. After entering the personality data, it may be wirelessly transferred to the RITS 300*c* using standard techniques. As part of the programming process, a verification of the data may occur by retrieving the data stored in the RITS personality module (250, FIG. 2), transmitting it to the programmer for display to the pilot for inspection. If the data is correct, a verification signal may be sent to the RITS 300*c*. If any errors exist, edits may be made using the process described. The techniques are described in greater detail below. It should be noted that while many times the distance between the programming device and the UAS small enough that WiFi or Bluetooth communications may be used, it is contemplated by the invention that the pre-flight programming might take place over a long range network such as use of cellular/internet communications.

FIG. 3*d* illustrates another over-the-air (OTA) programming implementation. The wireless method of FIG. 3*d* might be used when a communication protocol 'incompatibility' exists between portable programming device 320*d* and the RITS 300*d*. As just one example, the RITS 300*d* may be equipped for V/U/SHF RF communications, but the portable programming device 320*d* is limited to WiFi, Bluetooth, or the like. In that case, a converter apparatus 330 may be employed. For example, the converter 330 may connect to the portable programming device 320*d*, using a USB cable 332 or the like. The converter 330 might be equipped with processing and communication modules which 'convert' data coming in on the USB input to a V/UHF RF output functioning as a sort of repeater. In this example, the portable programming device 320*d* could 'write out' the personality data to the USB port. The converter 330 could then read in the personality data from its USB port and broadcast the data to the RITS 300*d* in the converted protocol (in this example V/U/SHF RF). Obviously, many other format conversions are possible. Also, while the connection shown in the figure is a wired USB connection, it is also possible the connection between the portable programming device 320*d* and the converter 330 might be wireless. The programming process would otherwise proceed as described for FIG. 3*c*.

FIG. 3*e* illustrates an embodiment of the personality programming method where the portable programming device 320*e* is physically wired to the RITS 300*e* for transfer of the personality data from the portable programming device 320*e* to the RITS 300*e*. The connection cable 333 would have terminators compatible with the receiving connectors on the portable programming device 320*e* and RITS 300*e*. As just one such example, the connectors could be USB connectors. A hardwire communication link eliminates RF incompatibilities or the need for compatible receptacles for portable storage media but does require physical proximity to the UAS 399 and physical access to the RITS 300*e*. Hardwiring does have security advantages, as physical access to the UAS 399 could presumably be controlled. Otherwise, transfer of the personality data proceeds generally as described above. For example, the RITS 300e might appear as an external memory storage device in the file explorer when connected to the portable programming device 320e, allowing the personality data file to be copied to the RITS personality module (250, FIG. 2) using the 'drag and drop' function or the like. Verification could proceed as discussed above.

Figure 4:
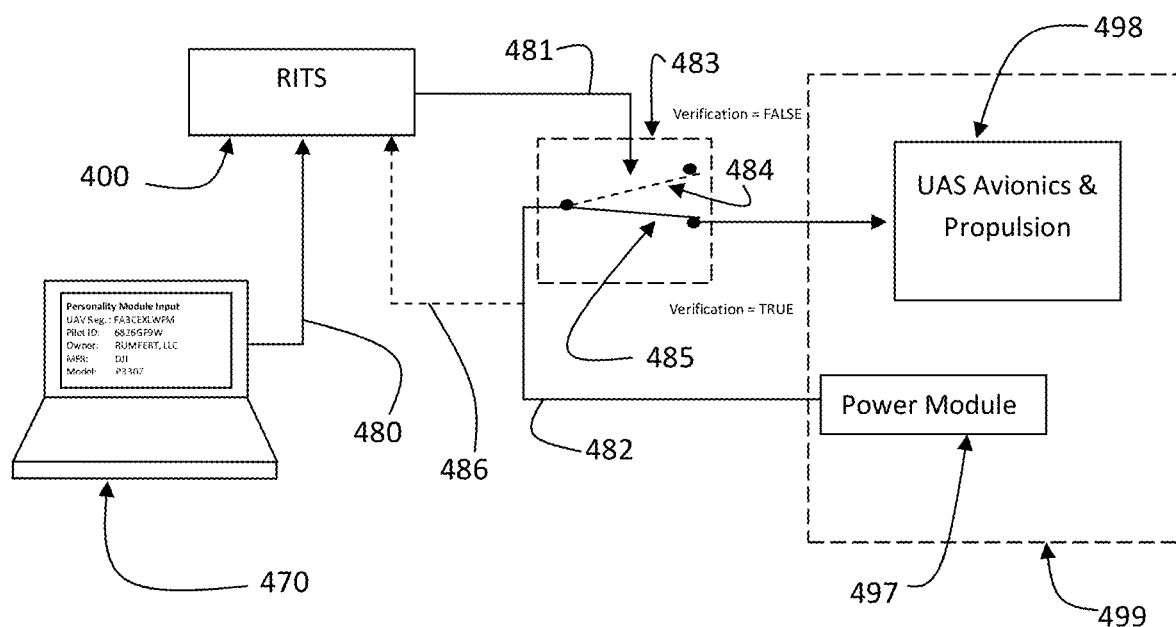
FIG. 4 is a diagram showing one embodiment of the RITS power interlock of the invention.

FIG. 4 shows one example of an interlock system designed to enforce rules regarding the verification of UAS personality data prior to flight. As mentioned, exemplary embodiments of the invention require the verification of the entered personality data prior to flight. In one embodiment, the RITS 400 receives the verification signal 480 from the portable programming device 470. The RITS 400 processes the signal 480, and if verification is indicated, sets the power control signal 481 to place power control circuit 483 in the 'closed' position 485, thereby applying power to the UAS avionics 498. As long as no verification signal 480 has been received, RITS 400 sets the control signal 481 to place the power control circuit 483 in the 'open' position 484, interrupting electrical power to the avionics 498. Note that the UAS power module 497 could be integrated in the UAS, or it could be external to the UAS. Power control circuit 483, although shown as external to the UAS, could also be integrated within the UAS 499. How the power interlock is integrated with the UAS may depend on whether it is added as an aftermarket retrofit to existing UAS or is a component of the original UAS manufacturer (OEM). As part of an OEM system, the power interlock could be integrated into the system. As discussed above, RITS 400 may have its own source of power independent of the UAS 499 or may utilize the UAS power module as shown in the dotted connection 486.

Figure 5A:
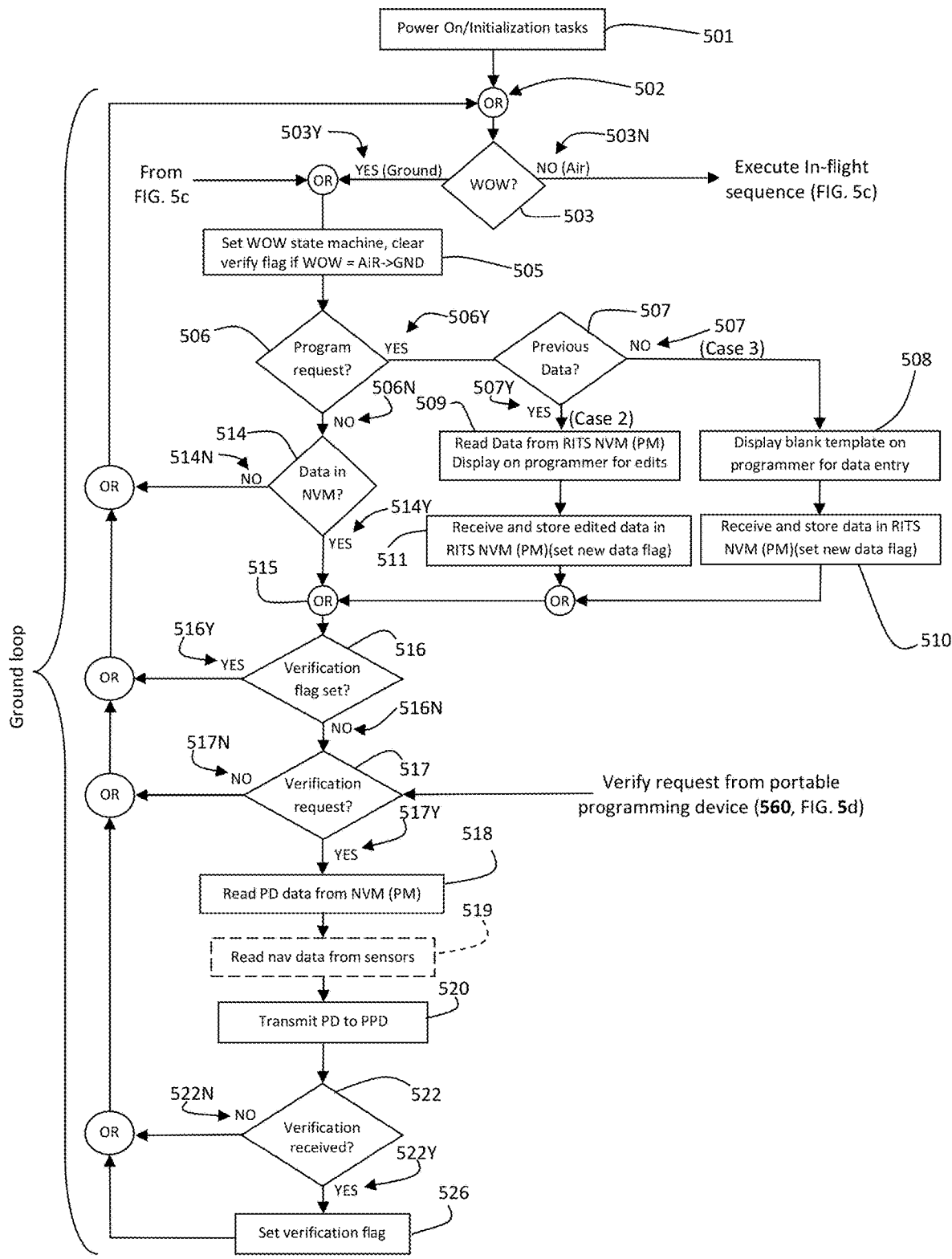
FIGS. 5a-5d are flowcharts illustrating processes for various functional aspects of the invention as might be implemented in one or more computer program applications.
Figure 5B:
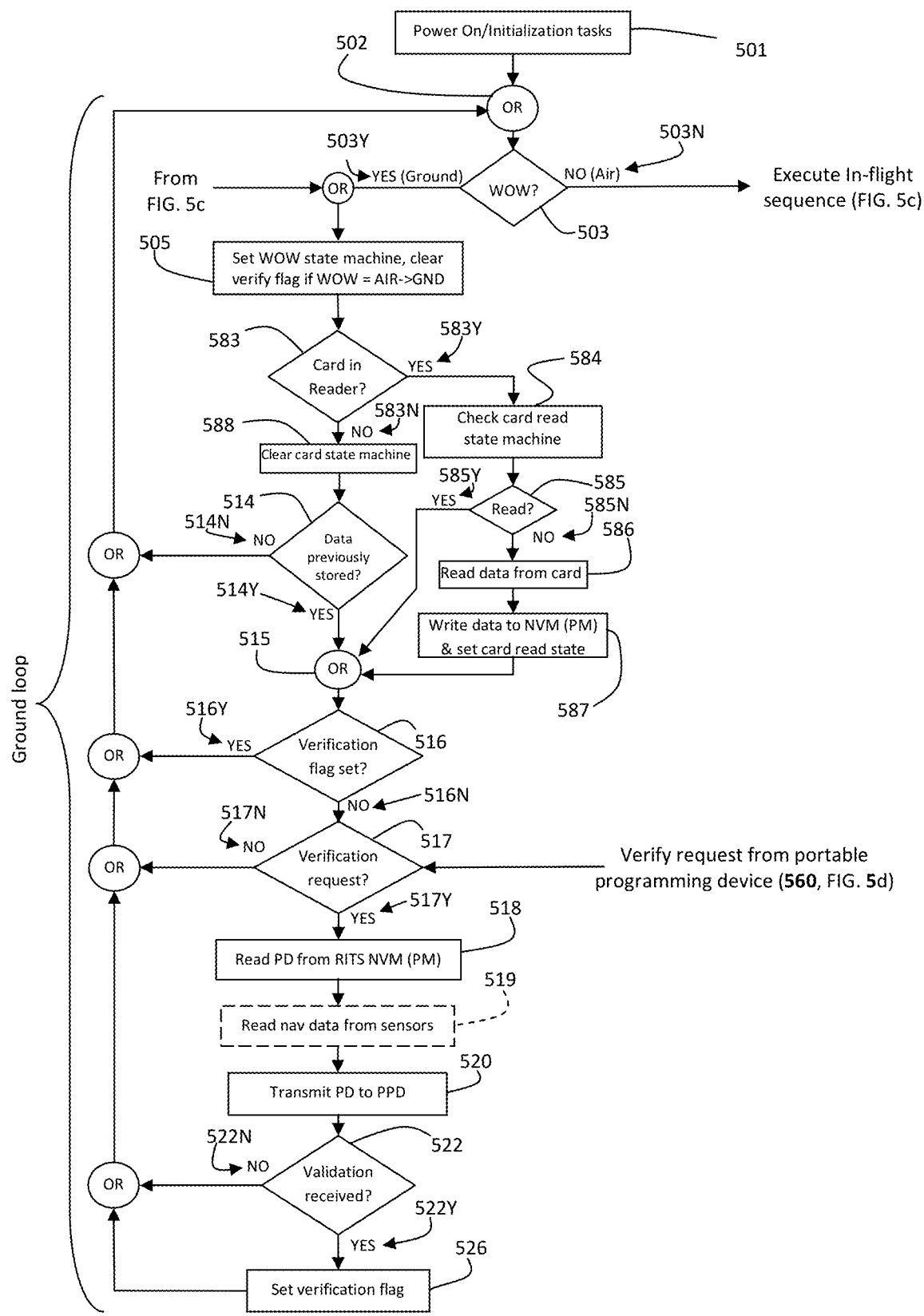
Figure 5C:
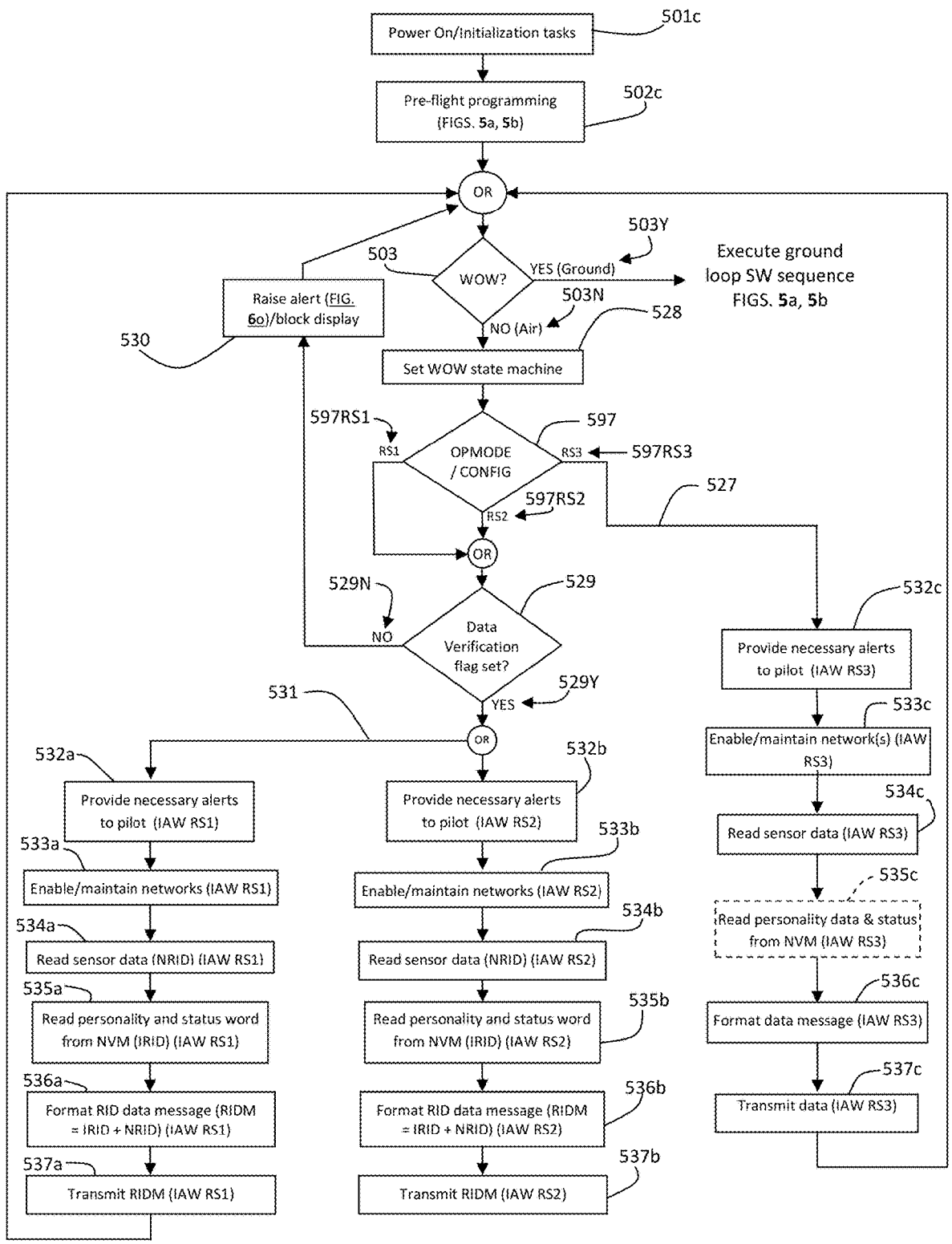
Figure 5D:
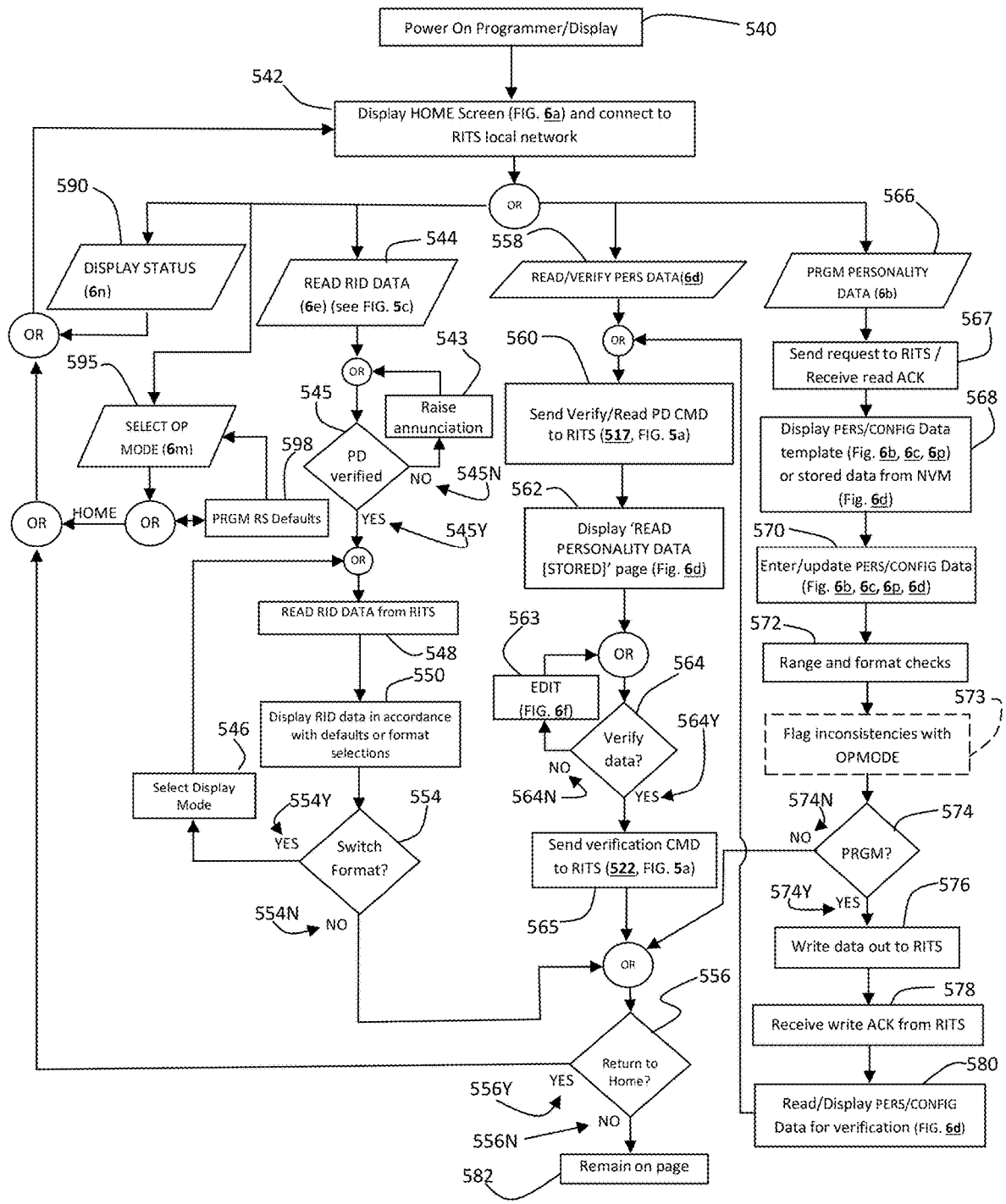
Figure 6A:
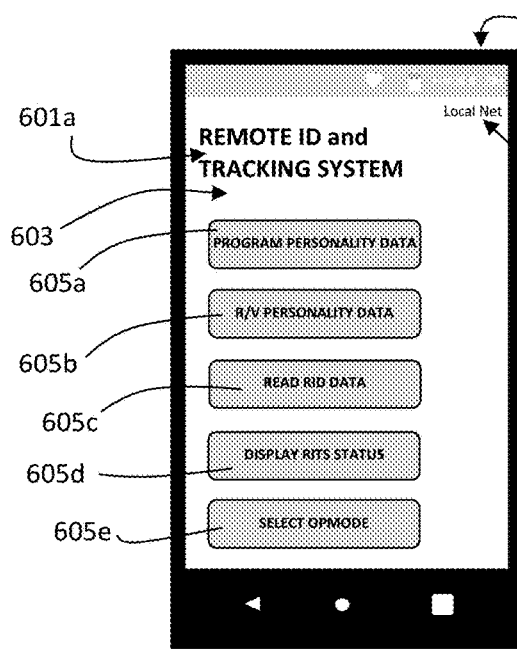
FIGS. 6a-6r illustrate some graphical user interface (GUI) 'screenshots' or 'pages' as they might appear on a portable computing device when implementing various functions of the present invention.
Figure 6B:
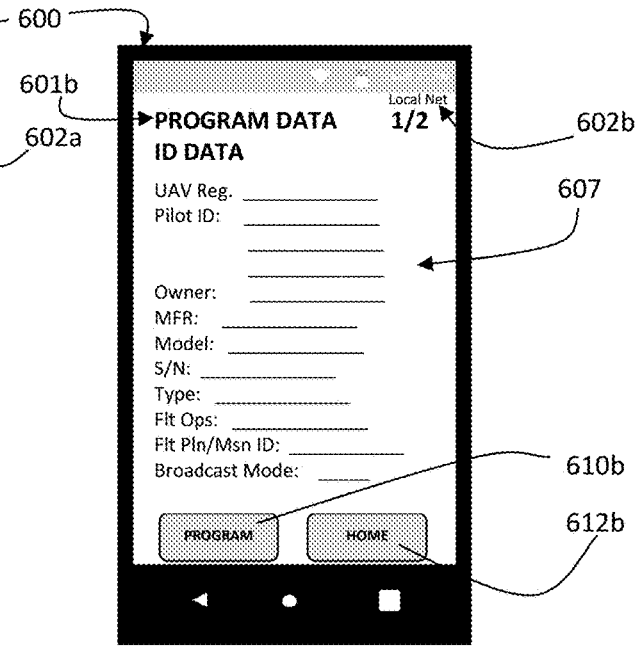
Figure 6C:
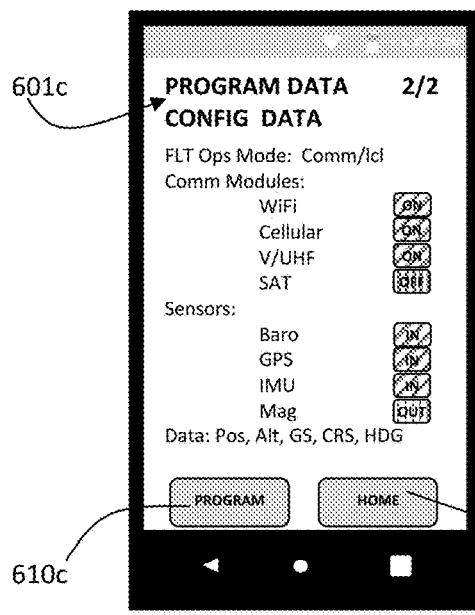
Figure 6D:
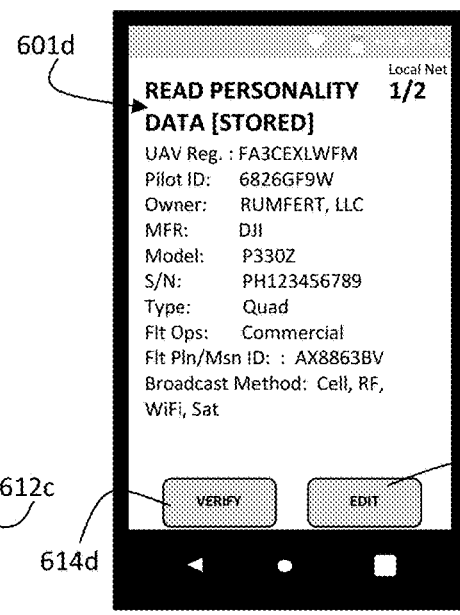
Figures 6E, 6F:
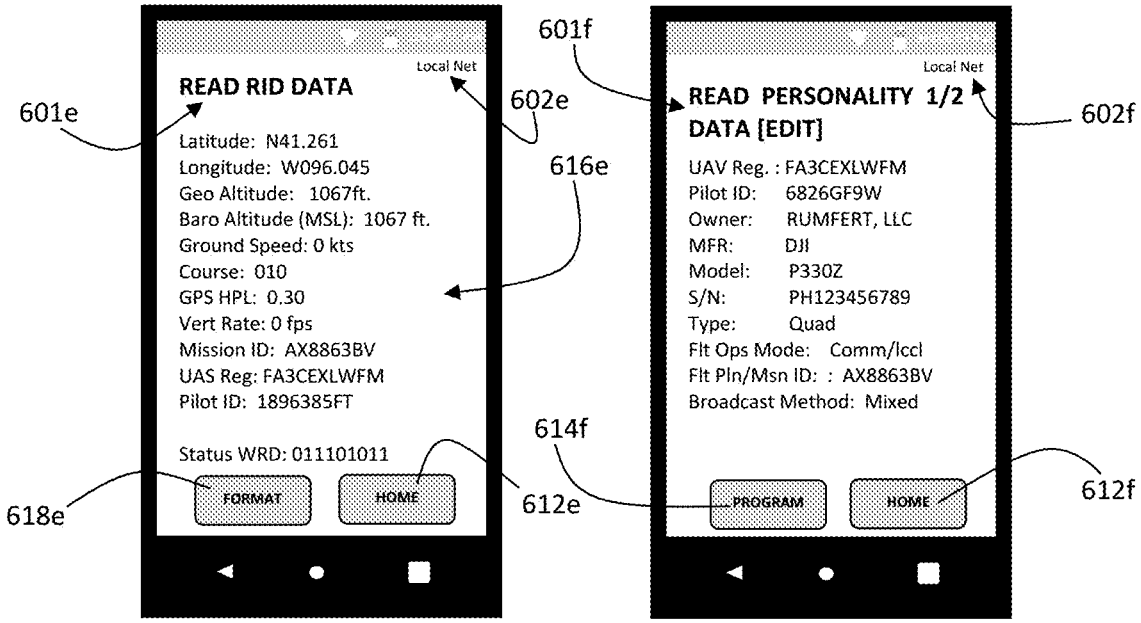
Figures 6G, 6H:
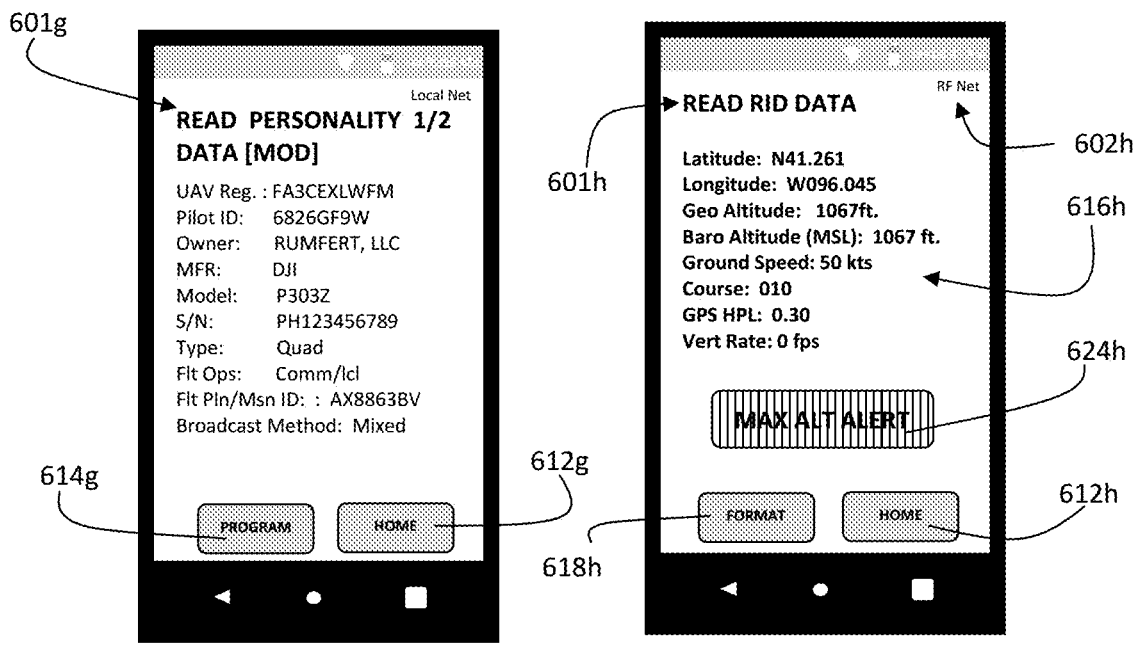
Figure 6I:
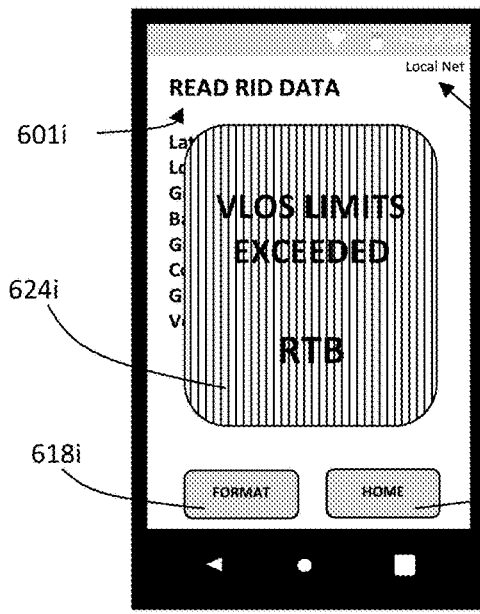
Figure 6J:
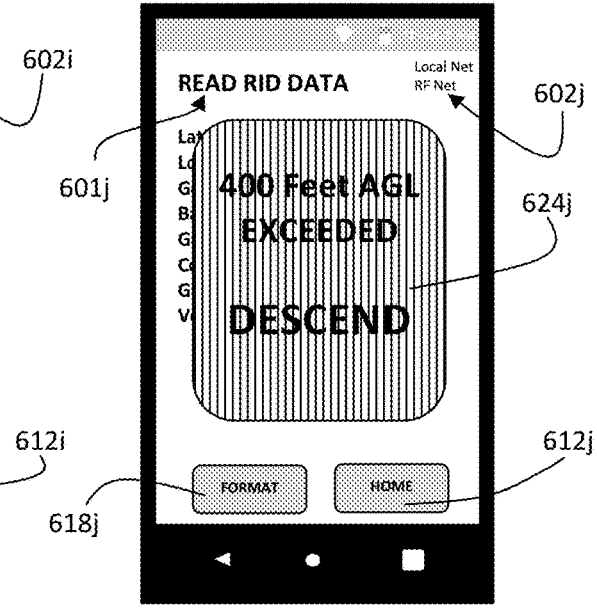
Figure 6K:
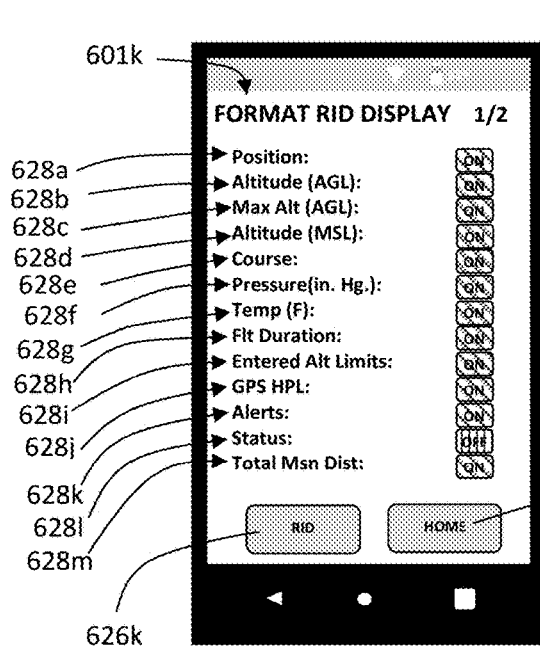
Figure 6L:
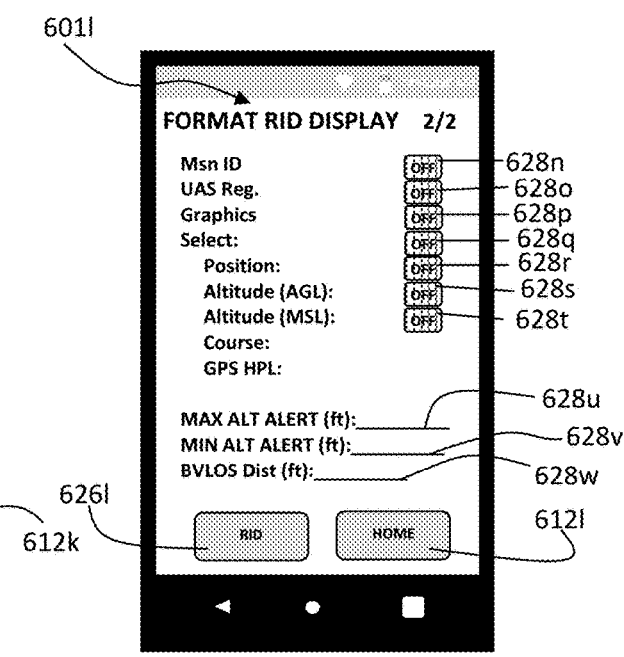

FIGS. 5a-5d illustrate methods of the present invention which may be executed in software instructions in the RITS (FIGS. 5a, 5b, and 5c) and in the programmer/receiver (FIG. 5d). More specifically, FIGS. 5a, 5b illustrate methods which might be executed in RITS software code while the UAS is on the ground ('ground loop'), as might be associated with pre-flight personality module programming, while FIG. 5c illustrates the 'flight loop' which might be executed in RITS software code. The main distinguishing functional difference between the methods of 5a and 5b is the manner in which the personality module programming occurs. The FIG. 5a embodiment utilizes a wireless network for programming, whereas the FIG. 5b utilizes non-wireless methods. FIG. 5d illustrates the methods which might be executed in programmer/receiver software code for preflight programming as well as flight operations. As was noted earlier, the programmer and receiver functions may be implemented in the same physical device, i.e. laptop, smart phone, etc. The code packages for executing the two functions may be separate or integrated into the same code package. In an exemplary embodiment, they are integrated, and the following description follows that implementation. Note that these are high level functional illustrations, not itemized code listings. Thus, not all steps implemented in the flight or programmer/display code are shown. FIGS. 6a-6r illustrate possible programmer/receiver Graphical User Interfaces (GUIs) (display screens/pages) used to display the personality programming pages. Since the methods and associated GUI screens are interrelated, they will be discussed together. Note that in exemplary embodiments, the selection and command buttons on the GUI screens are 'soft' buttons which may be selected or activated using either an interactive 'touch screen' or using 'mouse clicks' in the conventional manner.

Referring then to FIGS. 5a, 5b and 5c, the software instruction code logic shown might be captured in instructions 112, stored in NVM 113, and executed by processor module 110 (FIG. 1). Recall that some operations might be restricted to when the UAS is on the ground. One such operation might be the pre-flight programming illustrated in FIGS. 5a and 5b.

FIG. 5a illustrates one exemplary embodiment for the wireless pre-flight programming of the RITS. The process begins with a power application to the RITS. After the RITS is powered on, initialization tasks are completed 501. As discussed above, initialization tasks may include initializing data and other variables including status flags, initializing the navigational flight data sensors, initializing communication modules, and altitude calibrations such as zero AGL bias computations. The initialization may also include setting up and connecting one or more wireless network(s) (e.g. WiFi, Bluetooth, etc). In one exemplary embodiment, the network is a password protected WiFi network, and the RITS functions as a wireless access point with the programming device functioning as a client. In another embodiment, the RITS is programmed through the cellular/internet network. As was discussed with FIG. 1, in one embodiment, the input may include one or more 'hard' configuration switches. In such an embodiment, one of the initialization tasks may be a reading of the 'hard' configuration variables ('straps').

Once the power on/initialization is complete, the software checks the state of the WOW flag 503 (WOW module). As mentioned, some operations such as pre-flight programming might be restricted to 'on ground' situations. If the WOW flag indicates AIR (503N), the 'flight loop' of the software code is executed (FIG. 5c). If the WOW flag indicates GROUND (503Y), the WOW state machine is updated 505 if necessary, and ground loop execution continues. In one exemplary embodiment, the WOW state 503 is determined on each pass through the 'ground loop.' (Note that throughout the specification, where Weight on Wheels (WOW) is used, it is intended to cover both a physical WOW switch and a virtual switch where the switch state is inferred based on some criteria such as altitude, e.g. if AGL altitude <10 feet=>WOW=ground). The WOW state machine keeps track of the WOW transitions between GROUND and AIR states. This might be desirable, for example, to enforce pre-flight verification protocols or the like. In one exemplary embodiment, verification of the personality data is required before commencement of each flight. In that case, it is necessary to know that a previous flight has completed (UAS has landed=WOW transition from air to ground) so that the verification flag may be cleared, i.e. set to 'not verified' in anticipation of the next flight. This ensures that another verification of data must occur before the next flight—notwithstanding whether any changes in data were made. The verification flag is maintained in NVM (113 FIG. 1) so that its state is preserved across power cycles.

Three use cases are defined to aid the description of the conditional execution steps. Case 1 is where programming data has been previously stored and no changes are required. This would be a rare case, since something almost always needs to be changed, e.g. mission ID. Case 2 is where data had been previously stored and needs modification for the current mission. Case 3 is when no data currently exists. In all three cases, verification of the personality data is required.

If the personality data from the previous flight is identical to that for the follow-on flight, no programming is required (Case 1). The only step necessary is the verification of the data. Thus, the operator need not make a programming request 506N. Since in Case 1 the previous flights data is stored in RITS NVM (514Y), the code checks to see if verification has occurred (516). As mentioned, the verification flag is cleared on termination of the prior flight 505. Thus, the verification flag is not set (516N). Next, a check for verification request is made (517). If no request is pending (517N), the software will continue to loop through the code. A verification request is made with the R/V PERSONALITY DATA selection button on the programmer HOME display page (605b, FIG. 6a). Pilot selection of this button sends a verification request to the RITS (517). The RITS flight code then reads the existing personality data (PD) from the RITS NVM personality module (518) and sends it to the programmer for display (520). If the data is correct, the programmer sends a verify command to the RITS (522Y) by selecting the VERIFY command button (e.g. 614d, FIG. 6d) on the programmer. The RITS then sets the verify flag (526) in the RITS NVM. Note that for the programmed personality verification process, it is the stored programmed personality data that is verified, i.e. the personality data retrieved from the RITS NVM personality module, not what is on the GUI screen. Note also that 'null' personality data may be verified. If data must be corrected, the EDIT command button 612d on the read personality data display page (FIG. 6d) may be used.

While not strictly part of the program data verification, it may also be desirable to check the functioning of the RITS sensors. Thus, the pre-flight process may include reading the navigation sensor data 519 and transmitting it 520 to the programmer/display, in addition to the personality data. Reading and display of the Remote ID Data (RIDD) is initiated using the READ RID DATA selection button (605c, FIG. 6a) on the programmer and is discussed more below.

For Cases 2 and 3, at least some personality data needs to be entered. For this, the pilot executes a programming request. If the programmer is connected to the local network, the programmer may send a programming request 506 to the RITS based on pilot selection of PROGRAM PERSONALITY DATA on the programmer HOME display page (see 605a, FIG. 6a). If a programming request exists 506Y, what happens next depends on whether personality data has been previously stored (Case 2: edit mode) or whether this is the first time (Case 3: novel mode). If data has been previously stored (507Y), the existing personality data may be retrieved from RITS NVM and presented to the operator on the programmer display for editing 509. The display may be generated by the programmer or by the RITS. In one exemplary embodiment, html forms are used to display, edit, and communicate the data to the RITS. Any required edits are made to the existing data and selections displayed on the personality data entry pages (FIGS. 6b, 6c, 6p) and transmitted to the RITS to be stored in the RITS NVM 511 using the PROGRAM command button (see 610b FIG. 6b). If no previously stored data exists (Case 3), the programmer may display blank personality data entry page templates (see FIG. 6b, 6c) for the operator to fill out 508. The personality data would be entered and selections made on the pages and transmitted to the RITS to be stored in the RITS NVM 511 using the PROGRAM command button (see 610b FIG. 6b). In both cases, the verification flag is cleared to indicate a verification must occur.

As mentioned, verification is initiated with the R/V PERSONALITY DATA selection button (605b, FIG. 6a) on the programming device HOME page which transmits a read programmed personality data request to the RITS. In one exemplary embodiment, the verification page (R/V PERSONALITY DATA) is automatically displayed when new data is written into NVM. In another embodiment, the operator must request the page. Either way, verification is accomplished as described above with Case 1.

In one embodiment, the code continuously cycles through waiting for a programming/verification request or for the UAS flight to commence. In another embodiment, each of the programming/verification requests generate an interrupt, which is accommodated using an interrupt handler routine.

As mentioned, Case 2 is the most frequently encountered case. Thus, the most frequent programming task is the editing of previously stored data. That is, once the personality data has been programmed, it need not be re-entered as long as the data remains valid. Common things that may require editing include changing pilots, uniquely assigned mission ID, changes in equipment configuration (e.g. sensors or communication modules). Of course if the RITS is moved to another UAS, several other parameters would require edits. This reusability of previously stored personality data minimizes the amount of time which must be spent in pre-flight.

Pre-flight verification may be more or less intrusively enforced in several different ways. According to one implementation, RITS data transmission is conditioned on execution of the verification procedure, i.e. no verification=no Remote ID Data (RIDD) (see FIG. 5c) ('verification contingency'). In another embodiment, this verification might be part of a pre-flight check interlock (PCI) system such as a system to prevent flight until the verification has occurred. In one such example of an interlock system, the RITS controls the power to the UAS thru a relay system or the like. In that embodiment, power is not allowed to the UAS controls and/or avionics until the verification has occurred (see FIG. 4). The verification flag state may be reported in the RITS data stream or status word (see 622, FIG. 6n; 1465, FIG. 14; 1210d, FIG. 12). This would give the air traffic controller or other observers an indication the data had been verified.

It should be apparent that the steps, tasks, and functions described above in FIG. 5a may be performed by software, hardware, or firmware. It should also be apparent that additional or alternative steps relative to those described below may also be performed. Also, steps may be reordered from what is shown. As an alternative to the wireless methods of FIG. 5a, other transfer methods are also contemplated.

As discussed above in connection with FIGS. 3a, 3b and 3e, there are methods of programming the RITS personality module (250, FIG. 2) other than wireless transfer. One of these methods involves the use of a portable storage media such as a memory card.

It will be observed from FIG. 5b that the 'ground loop' steps are very similar to those of 5a with the exception of the card reading loop, steps 583-587. As was discussed with FIG. 5a, after the power on/initialization tasks are completed 501, the software checks to see if the UAS is on the ground (WOW=YES) 503. If not, (i.e. WOW flag indicates AIR (503N)), the software executes the 'flight loop' (FIG. 5c). If so, (i.e. WOW flag indicates GROUND (503Y)), the WOW state machine is updated 505 if necessary. The software then checks to see if a card (portable storage media) has been placed in the card reader slot 583. If so 583Y, it checks the card reader state machine 584 to see if the card has been previously read 585. If the card has already been read 585Y, the logic proceeds to step 516 to check verification flag state. If the card has not been read 585N, the card containing the personality (i.e. identity/configuration) data is read 586. In one embodiment, the data is read automatically once the determination is made that the card was not previously read 585N. In another embodiment, the reading of the card 586 is in response to a command from the programming device. After reading, the card data is stored in NVM and the state machine is set to the 'card read' state 587. A check for the verification flag is then made 516, and the flow proceeds as discussed in 5*a*. Regarding the methods involving direct transfer from the programmer to the RITS, the RITS connector would be inserted into the programmer receptacle (method FIG. 3*b*) or the cable from the programmer connected to the RITS (method FIG. 3*e*). The data would then be directly transferred to the RITS.

If in step 583 it is determined there is no card in the slot 583N, the state machine is cleared 588, and the data and verification steps discussed in 5*a* are executed. Since the steps are executed continuously while on the ground, steps 583/588 ensure that if a card is inserted/removed/reinserted, it will be read again. Note that in the method of FIG. 5*b*, the verification process may still be accomplished using the wireless method of FIG. 5*a*.

FIG. 5*c* illustrates what the RITS flight code 112 logic flow might be when the UAS is in flight mode (WOW=AIR)). For purposes of this discussion, the power on/initialization tasks 501*c* and pre-flight checks and programming 502*c*, as discussed above in FIG. 5*a*, have already occurred. In one exemplary implementation, flight code 112 makes a continuous check of whether the UAS is on the ground or in the air (WOW) 503. Recall from the above discussions that in one embodiment, the WOW state determines whether 'ground loop' (FIGS. 5*a*, 5*b*) or 'flight loop' (FIG. 5*c*) RITS software routines are executing. As discussed above, certain functions are restricted to ground execution (e.g. programming of the personality data) and others to flight execution. If the WOW state is AIR (i.e. WOW flag indicates AIR (503N)), software code executes the flight loop (FIG. 5*c*). First in the flight loop of FIG. 5*c*, the WOW state machine is updated 528 so that transitions from air to ground are recognized. In one exemplary embodiment, code execution paths are determined by an operational mode (OPMODE) setting 597. Recall that one or more OPMODEs may be used to distinguish flight operations. As just one example, recreational, commercial/local, and commercial/extended modes might be used.

The operational mode (OPMODE) parameter contemplates that the FAA may implement different rules for different operating situations. For example the FAA may implement one set of rules for recreational use and another for commercial. Each set of rules may have functional, software, and hardware implications. As one example, commercial operations may be required to put one set of data to a network while recreational operations may get by with only broadcast of a more limited set of data. In the present invention, these differences are accommodated with configurable hardware and software. In an exemplary embodiment, an operating mode might be mapped to a default set of configurations. This mapping or correlation between configuration settings and operating modes are referred to in this specification as 'rule sets.' For example, rule set 1 (RS1) might relate to local commercial operations, say for example operations where the UAS is maintained within visual line of sight (WVLOS). Rule set 2 (RS2) might refer to extended commercial operations, i.e. operations where the UAS flies beyond visual line of sight (BVLOS). Rule set 3 (RS3) might refer to recreational operations within a FAA Recognized Identification Area (FRIA), and rule set 4 (RS4) might refer to recreational operations outside a FAA Recognized Identification Area (FRIA). These are but four examples to illustrate the pre-flight configuration programming functions of the present invention. Quite obviously, the number of sets can be increased to encompass variations within each set. The rule set/configuration correlation or mapping defaults might be programmed into the baseline flight code. The pre-flight programming gives the operator not only the ability to specify a rule set but also the ability to edit the factory rule set/configuration correlation default settings. This configurability gives the pilot/operator maximum flexibility and control over the operation of the UAS. It also allows for any evolution in FAA regulations (i.e. rule set changes) without the need to reprogram the UAS RITS. It is important to observe that as mentioned, any of the default settings associated with an operating mode/rule set may be overridden during the pre-flight programming. It should also be noted that in exemplary embodiments, selection of operating mode during the pre-flight programming process is optional. Its function is to provide a shortcut to setting configuration parameters. In exemplary embodiments, not only may the default rule set/configuration settings may be overridden (see FIG. 6*c*), but the rule set/configuration default mapping may also be changed (see FIG. 6*q*). Selection of an OPMODE may be made by selecting the SELECT OPMODE button (605*e* FIG. 6*a*) on the programmer.

Figure 6M:
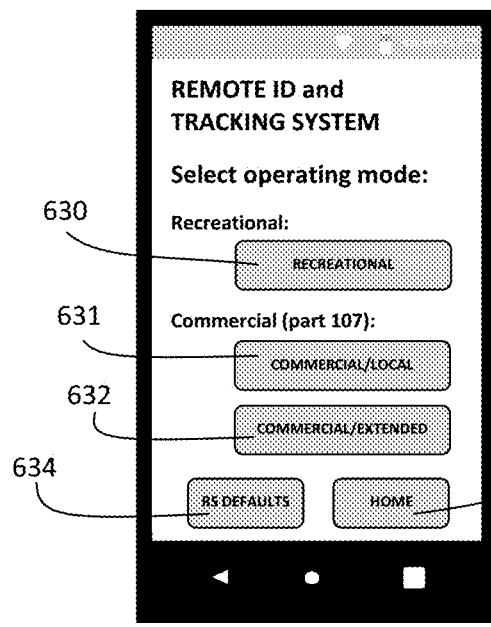

In one exemplary embodiment utilizing three modes as an example, the portable programming device may present an initial SELECT OPERATING MODE screen (FIG. 6*m*) for the pilot to select whether the operating mode is recreational (630 FIG. 6*m*), commercial/local (631 FIG. 6*m*), or commercial/extended (632 FIG. 6*m*). As mentioned, selecting one of the three OPMODES implements a set of (overridable) default configuration parameters in accordance with the OPMODE rule sets. As also mentioned, selection of an OPMODE is an optional shortcut.

FIG. 5*c* illustrates how selection of an OPMODE and associated rule set configuration defaults might affect execution of the flight software. For purposes of illustrating the principles of the OPMODE/rule set configuration defaults, FIG. 5*c* shows three exemplary OPMODE settings corresponding to commercial/local (rule set 1) 597RS1, commercial/extended (rule set 2) 597RS2, and recreational (rule set 3) 597RS3. As has been mentioned several times, these default configuration settings may be changed during the pre-flight programming. However, for purposes of this illustration, it is assumed that the default settings associated with the rule set are used without modification. Other assumptions for the purpose of illustration are made as indicated below. In this exemplary illustration, the power-on initialization, pre-flight programming and WOW state determinations are as described above with FIGS. 5*a* and 5*b*. The flight code then begins conditional execution based on the configuration settings/OPMODE at step 597. If the operator has selected the 'recreational' operational mode 597RS3, the logic may proceed down path 527 in FIG. 5*c*.

For the purposes of this illustration, it is assumed that the recreational rule set does not require personality data or its verification. Thus, the verification check 529 is bypassed. During the flight loop, the software constantly checks for any conditions requiring pilot alerts 532*c* in accordance with rule set 3. For example, in the recreational mode, various alerts may be associated with UAS altitude. As one example, monitoring that the UAS does not exceed the FAA 400 feet AGL limit (624*j*, FIG. 6*j*) or alerting that the UAS has exceeded some other operator entered altitude limit (624*h*, FIG. 6*h*) (see e.g. 628*u*, 628*v* FIG. 6*l* where min and max altitude limits may be entered). Another annunciation might be for the UAS flying beyond the visual line of sight (BVLOS). As discussed elsewhere, the UAS/pilot distance might be a proxy for the visual line of sight. In recreational mode, one restriction may be that the UAS must remain within visual line of sight. Thus, when this distance is exceeded, the VLOS limit annunciation (624*i*, FIG. 6*i*) might be raised. Since the point at which the UAS is no longer within visual sight is a function of the UAS size (as well as pilot visual acuity), provision is made for manual entry of a BVLOS limit distance (see 628*w* FIG. 6*l*) to accommodate those variables.

The rule set for the recreational mode may have lesser networking requirements 533*c* for the RID data and or may prescribe a different sensor data 534*c* from other rule sets. The software would ensure that the networks are active 533*c*, read and process the sensor data 534*c*, and format 536*c* and transmit 537*c* data messages, all in accordance with the applicable rule set. (Note it was mentioned during discussions of FIGS. 5*a* and 5*b* that part of the power-up initialization might be setting up a wireless network. This ground network may be different from the network(s) utilized in flight.) In one scenario, the FAA may not require broadcast of Remote ID Data (RIDD) for recreational users within a FRIA, and the operator may broadcast UAS data only for his own situational awareness. In one embodiment, the data is transmitted via WiFi back to the pilot for display on the receiver/display. In this case, the same network as was used for ground operations may be used for flight operations. Alternatively, the FAA may require that recreational data must be networked, in which case a network other than that used for ground operations might be required.

In the illustrated exemplary embodiment, if the operator has selected either of the 'commercial' operational modes, 'commercial/local' 597RS1 or 'commercial/extended' 597RS2, a check of the verification flag is made 529. In the exemplary embodiment illustrated in FIG. 5*c*, if the verification has not occurred 529N, an alert may be raised 530 to the pilot which may be displayed on the programming device (e.g. 624*o*, FIG. 6*o*). As was discussed, the requirement to verify the personality data prior to flight might be enforced in one embodiment by making the transmission/display of Remote ID Data (RIDD) contingent on receiving the verification (the 'verification contingency'). Thus, in the illustrated embodiment, the software flow through 529 and 530 is repeated until the verification has been accomplished. Blocking of the RID display might occur both at the source, by inhibiting its transmission, but also on the receiver by displaying of the alert. As verification is something that must be done on the ground, the UAS would be required to land in order to accomplish the verification, thus enforcing this safety feature (see FIGS. 5*a*, *b*).

In exemplary embodiments, the flight code may constantly monitor relevant flight parameters to determine which commercial flight mode UAS is in and set an alert to the pilot when a transition is made from one type to another. For example, for purposes of this illustration, it is assumed that the difference between the commercial/local and the commercial/extended mode is the flight beyond visual sight. If the commercial/local mode was chosen but the UAS flies beyond visual range (BVLOS) (as determined for example by flying beyond the BVLOS distance entered during pre-flight programming 628W, FIG. 6*l*), an alert might be raised to the pilot such as that indicated by 624*i*, FIG. 6*i*. The pilot could be given the opportunity to correct the condition or land and reconfigure the RITS for extended commercial operations. Another annunciation might be generated if/when a required network communication link is broken FIG. 6*r*.

The rule sets for the commercial modes may have different networking requirements 533*a*, 533*b* for the RID data. Thus, the software operating in the RS1 or RS2 loop would establish, maintain, and monitor the required network communications 533*a*, 533*b*. The software would read and process the sensor data 534*a*, 534*b*, read the identity data and status word from NVM 535*a*, 535*b*, and construct the Remote ID Message (RIDM) 536*a*, 536*b*, all in accordance with the applicable rule set. The RIDM would then be transmitted on the applicable network(s) 537*a*, 537*b*.

As mentioned, the 'flight loop' data flow shown in FIG. 5*c* is one example of the execution of instruction set 112 mentioned above. In this exemplary embodiment, the instruction set 112 is executed in a continuous loop. In such a cyclical execution, once the transmission of RID data is accomplished 537*a, b, c*, the process returns to the weight-on-wheels check. Should the software detect the transition to ground (WOW=YES), execution of the 'ground loop' illustrated in FIGS. 5*a, b* would resume.

It should be apparent that the steps, tasks, and functions described above in FIG. 5*c* may be performed by software, hardware, or firmware or a combination thereof. It should also be apparent that additional or alternative steps relative to those described below may also be performed. Also, steps may be reordered from what is shown. The rule set assumptions of FIG. 5*c* are for illustration of the invention's principles. Operational rule set definitions would be determined by FAA rules.

FIG. 5*d* and FIGS. 6*a*-6*r* illustrate the logic flow of software code, which may run in the portable programming/receiver device and associated graphical user interfaces (aka 'pages' or 'screenshots'). Recall that the portable programming/receiver device may be used for pre-flight programming/verification of the personality data and may also be used to monitor Remote ID Data (RIDD). For the purposes of discussion of the logic flows in FIG. 5*d* and the GUI pages of FIGS. 6*a*-6*r*, the programmer and receiver will be assumed to be the same device. The programmer/receiver may communicate with the RITS for programming using one protocol and receive Remote ID Data (RIDD) using a different protocol. In the illustrated embodiment, the pilot selectable functions on the programmer/receiver are programming personality data (566), reading/verifying personality data (558), reading/displaying Remote ID Data (RIDD) (544), displaying system status (590), and selecting an operational mode (595). Each of these functions and associated GUI pages are accessible from the HOME page (FIG. 6*a*).

In one exemplary embodiment, upon power-up 540, a 'HOME' page or screen (603, FIG. 6*a*) may be displayed 542 on the portable programming/receiving device (600, FIG. 6*a*), giving the user the option of selecting one of five choices: PROGRAM PERSONALITY DATA 566 (605*a*, FIG. 6*a*), R/V PERSONALITY DATA 558 (605*b*, FIG. 6*a*), READ RID data 544 (605*c*, FIG. 6*a*), DISPLAY STATUS 578 (605*d*, FIG. 6*a*), and SELECT OPERATING MODE 595 (605*e*, FIG. 6*a*). As mentioned above, power-on initialization of the RITS may include establishing a WiFi network. In that embodiment, the operator would manually connect with the RITS network in the normal manner through the device's network and internet setting page (i.e. outside the programmer 'app code'). Once the setup is network complete, the programmer/receiver app may be started or resumed. In one exemplary embodiment, the network SSID or other name, being used for communication, is indicated 602a. It is envisioned that more than one network may be active at any time. In that case, a plurality of connections may be listed (602j, FIG. 6j; 602o, FIG. 6o).

The PROGRAM PERSONALITY DATA and READ/VERIFY PERSONALITY DATA functions are part of a pre-flight programming routine to program and verify personality data respectively, the personality data. As described above, the personality data comprises identity and configuration data regarding the identification of the UAS, its pilot, and its mission, and the configuration of sensors, communication modules, and other data. The identity data is used to build one component of the Remote ID Message transmitted from the UAS, whereas configuration data is associated with the operation of the RITS.

There are many ways of transferring data between two devices. One method is to establish a client/server relationship where data can be passed using html forms, JSON, and the like. In one exemplary embodiment, when the PROGRAM PERSONALITY DATA function 566 (605a FIG. 6a) is selected, a command is sent to the RITS that a program request has been made. If the RITS is ready to receive data, a programming request acknowledgement (ACK) may be sent back to the programmer 567. In an exemplary embodiment, the state of the weight-on-wheels (WOW) state machine is checked and verified to be in the GROUND state before returning an ACK to the programmer 567. In one embodiment, the PROGRAM PERSONALITY DATA page(s) FIG. 6b, 6c, 6p are displayed when the program selection is made 605a. In another embodiment, the pages are only displayed after the ACK is received from the RITS. If data has not previously been entered/stored, a blank data entry template (FIG. 6b) and a page of the configurable items (FIG. 6c, 6p) may be presented to the user 568. In one exemplary embodiment, three program data pages are used: one for entering the identity data (FIG. 6b) and two for making the configuration selections (FIG. 6c, 6p). These personality programming pages are provided as examples of how personality data may be displayed/modified but should in no way be construed as limited to these pages or data. The user can then step through each item entering data 570 or toggling selections. In another embodiment, it is contemplated that fourth or fifth pages of personality data may be added to allow for selection of the data transmitted and additional parameters. Note that in some embodiments, certain pages may be dynamically configured. For example, service provider login 642p may only appear on configuration pages (e.g. 6p) when an operating mode is selected with a rule set requiring network communication with a service provider (e.g. commercial operations).

As the personality data is entered, the code may perform range and format checks 572. As just one example, the code may check that only characters have been entered for the pilot's name etc. In one exemplary embodiment, an additional consistency check is made with the OPMODE defaults 573. For example, if an OPMODE has been selected and configuration selections are made that are inconsistent with the OPMODE rule set, the value may be highlighted to the operator. This would not preclude entry but is intended as a double check that the inconsistent value is indeed desired. Once entry of the data has been completed, the user may be given the option 574 of writing the data to the personality module 576 using the PROGRAM command button (610b, FIG. 6b; 610c, FIG. 6c; 610p, FIG. 6p). If the user chooses not to write out the data 574N, he may select to be taken back to the HOME screen 556 using the HOME command button (612b, FIG. 6b; 612c, FIG. 6c; 612p, FIG. 6p) where he can make another selection. In one embodiment, leaving the programming pages without programming the data would cause the data to be cleared from the programming pages. In another embodiment, the changes are preserved but not programmed. Note that in some flight operations (e.g. recreational), 'null' data may be a legitimate entry and may be programmed and verified as such.

If the user chooses to write out the data by selecting the PROGRAM command button, the entered personality data is sent to the RITS 576 where it is written into the NVM personality module. Note that PROGRAM command may be selected from any of the program pages. Upon completion of the writing to memory, the RITS may send an acknowledgement 578 to the programming device. Upon completion of the personality module programming, the process calls for a verification of the data prior to flight. In one exemplary embodiment, the programmer automatically proceeds to the verification page 580 by displaying the R/V PERSONALITY DATA page (FIG. 6d). In another embodiment, the page is manually selected 558.

Verification of the programmed data is accomplished using the R/V PERSONALITY DATA page (FIG. 6d). Accessing the page 560 causes the RITS to retrieve the stored data from the NVM personality module and send it to the programmer, where it is displayed 562. An attribute in the page title '[STORED]' 601d indicates that the data displayed has been retrieved from RITS NVM. If after retrieving the one or more pages of data it is determined that the data is all correct, the VERIFY command button (614d, FIG. 6d) may be selected 564, sending a verification indication to the RITS 565, causing it to set the verify flag (526, FIGS. 5a, 5b). Note that VERIFY command may be selected on any of the R/V PERSONALITY DATA pages. If data needs to be updated 564N, the EDIT command button (612d) may be selected, thereby displaying the EDIT page (FIG. 6f). The user can skip over any data which is still correct, changing only that which needs correcting. As soon as any modification is made to the data on the page, the '[EDIT]' (601f, FIG. 6f) is replaced with '[MOD]' (601g, FIG. 6g). Selecting the PROGRAM command button (614g, FIG. 6g) would cause the data to be sent to the RITS as described above. Note that PROGRAM may be selected from any MOD page. In an exemplary embodiment, after programming, the R/V PERSONALITY DATA page 6d is automatically redisplayed, repeating the programmed personality verification process discussed above. Selecting the PROGRAM command button (614f, FIG. 6f) without having changed any data, could also be made causing the above process to be repeated.

It should be noted that for illustrative purposes, only a sample of multiple pages are shown in FIGS. 6d, 6f and 6g. The number of pages in total may depend on display particulars (e.g. screen size, font, etc.) and, of course, the number of parameters. The number of parameters may vary without distracting from the teachings of the invention. Where access to additional pages is needed, access may be accomplished by 'swiping' or 'scrolling' up/down or right/left as is common practice.

In one exemplary embodiment, during pre-flight programming activities, the RITS functions as a wireless WiFi access point, and the programming device is the client. In that embodiment, the R/V PERSONALITY DATA page is built by the RITS acting as a server building html pages in the portable programming device acting as its client. In another embodiment, the programming pages are built by the code running in the programming/display device.

After verification, the pilot may then select to return to the HOME page (FIG. 6*a*) using the HOME command button (612*f*, FIG. 6*f*) or in some embodiments, the display may automatically return to the HOME page. If the user wants to check that the verification flag was in fact set in the RITS, he may select the DISPLAY RITS STATUS option (605*d*, FIG. 6*a*). In one exemplary embodiment, the data verification flag is one of the statused items (623, FIG. 6*n*; 1210*d*, FIG. 12*b*).

It should be noted that the programming verification steps described above apply also to the non-wireless methods of transferring personality data to the RITS as illustrated in FIGS. 3*a*, 3*b*, and 3*e*.

The READ RID DATA function data 544 (605*c*, FIG. 6*a*) gives the user the opportunity to see the data in the Remote ID (RID) data message. Selecting the READ RID DATA function from the HOME page (605*c*, FIG. 6*a*) results in the READ RID DATA screen display (FIG. 6*e*). As described elsewhere, the transmitted Remote ID Data message (RIDM) is composed of navigational flight data and identity data. Some combination of all or part of this data may be displayed on the READ RID DATA page. The data is read from the Remote ID Message (RIDM) 548 and displayed in accordance with the format selections 550. The operator is given the opportunity to change format selections at any time 554.

In one embodiment, the parameters displayed are controlled by overridable defaults based on the operational mode selection (i.e. rule sets). In this exemplary embodiment, the pilot is given the option to override the defaults by selecting the FORMAT command button (618*e*) on the READ RID DATA page (FIG. 6*e*). Formatting is accomplished with a FORMAT RID DISPLAY pages FIG. 6*k*-6*l*. As seen in the figures, a series of data items, representing the data parameters which could be displayed, are listed 628*a*-628*o*. The items may include both navigational data as well as identity data. Each item has a button to toggle the display of that item ON or OFF. Selection of any item to the ON state results in the real time display of that data item. It is also contemplated that in addition to the textual display, the ability to graph certain items may also be provided using buttons 628*p*-628*t*. Selection of that item to ON would result in a graphical display of that data over a period of time. Finally, the ability to enter values for some alerting items may be provided on the screen. Examples include maximum altitude 628*u*, minimum altitude 628*v*, and a BVLOS limit 628*w*. The values might also be used as configuration items stored in the RITS personality module. Selection of the RID command button (626*k*, FIG. 6*k*; 626*l*, FIG. 6*l*) takes the user back to the READ RID DATA page incorporating the selections made. The list of format items is illustrative only, and other items may be added to or deleted from the list creating more or fewer pages.

As mentioned elsewhere, one possible means for enforcing personality data verification prior to flight might be preventing various functions until the pilot verifies the data. Thus, in an exemplary embodiment, the display of RID data is conditioned 545 on verification of the personality data ('verification contingency' condition). If the condition is not met 545N, an annunciation may be raised 543. The annunciation (e.g. 624*o* FIG. 6*o*) may indicate an attempt to display RID data without first verifying personality data (see 529 FIG. 5*c*).

It should be noted that while a single READ RID DATA page is shown for illustration (FIG. 6*e*), there may, in fact, be multiple pages depending on the number of parameters displayed. As mentioned, while a list of RID data is presented in the figure, it is for illustrative purposes only, and additional or alternative data may be added or removed.

In addition to the display of the RID data, various warnings and alerts may be displayed. Some of the alerts and warnings may be informational, and some may require pilot action. The size and format of the alert may change from one alert to another. Some example formats are illustrated in 624*h*, FIG. 6*h*; 624*i*, FIG. 6*i*; 624*j*, FIG. 6*j*; 624*o*, FIG. 6*o* as just a few examples. The following are some possible alerts or warnings and their triggering mechanism:

CHK POS—GPS position integrity
MAX ALT EXCEEDED—Entered max altitude exceeded
MIN ALT EXCEEDED—Entered min altitude exceeded
ALT ALERT—Database altitude exceeded (e.g. FAA 400AGL limit)
MAX SPEED—Maximum FAA allowed speed exceeded (e.g. FAA 100 mph limit)
VLOS LIMITS EXCEEDED—UAS is BVLOS (distance exceeds entered BVLOS distance)
400 FEET AGL EXCEEDED—UAS is above 400 foot AGL FAA limit
PERSONALITY DATA NOT VERIFIED—Personality data has not been verified These are but a few of the alerts or warnings which could be issued.

Figure 6N:
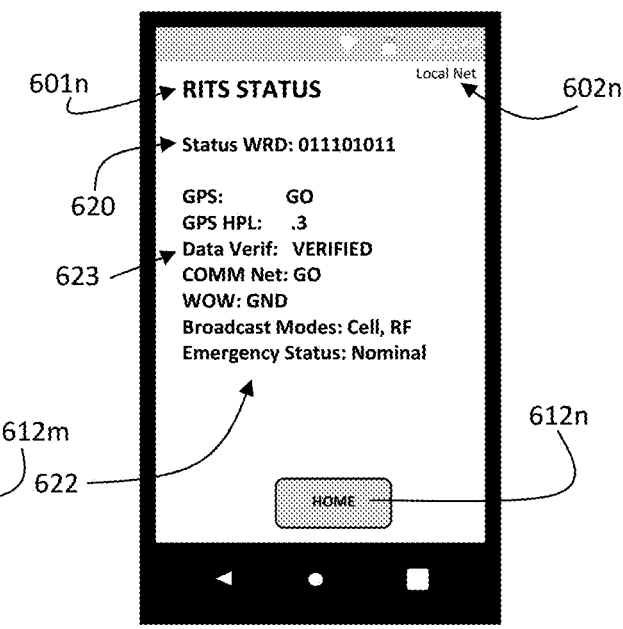
Figure 6O:
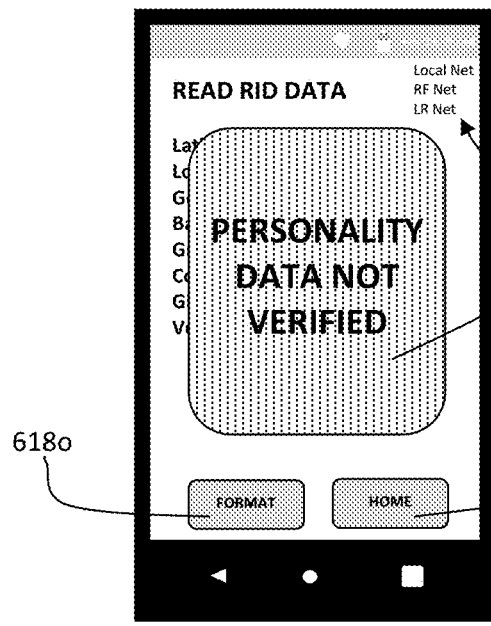
Figure 6P:
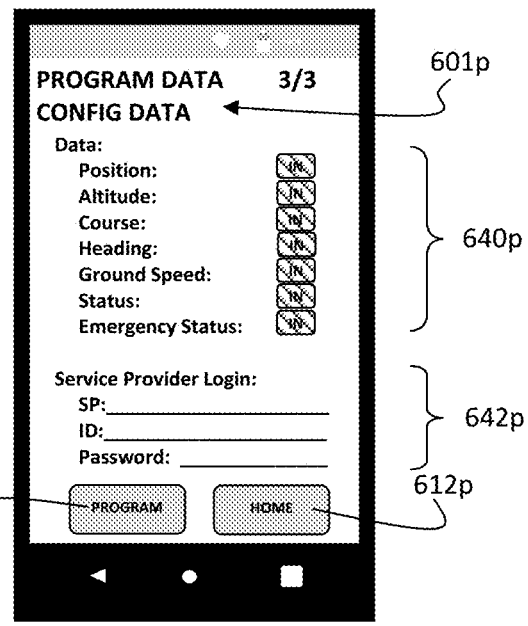
Figures 6Q, 6R:
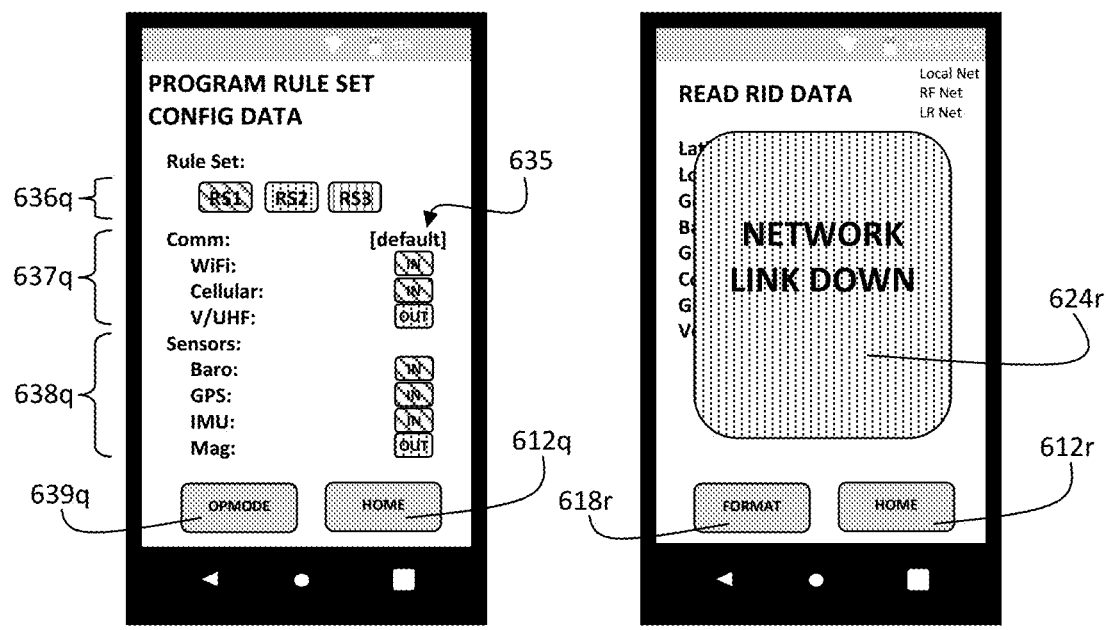
Figures 12A, 12B:
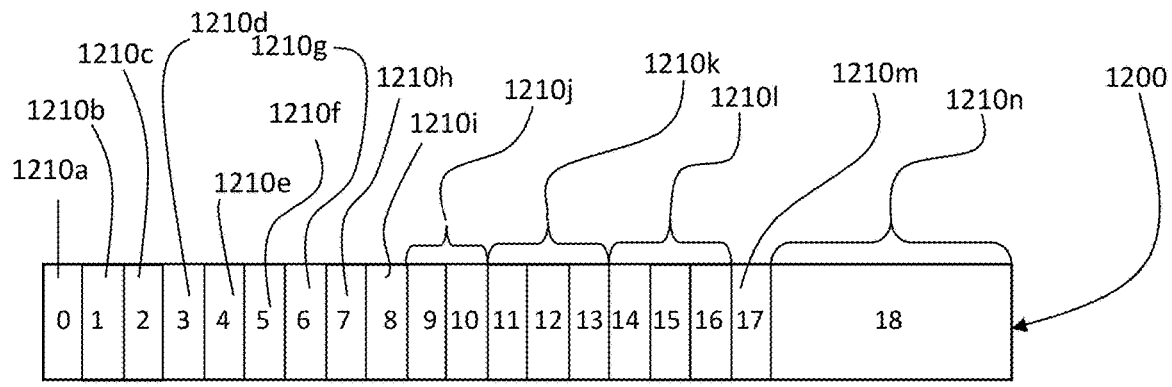
FIGS. 12a and 12b illustrate an example of an UAS/RITS status word.

Selecting the DISPLAY RITS STATUS function 590 from the HOME page (605*d*, FIG. 6*a*) displays the current status of monitored items in 'plain English' (622, FIG. 6*n*). It may also display the binary status word (620, FIG. 6*n*). One exemplary status word is illustrated in FIGS. 12*a*, 12*b*. Data items may be added or removed from the exemplary listing. Selecting the HOME command button (612*n*, FIG. 6*n*) returns the user to the Home page.

In one exemplary embodiment, the SELECT OPERATING MODE page (FIG. 6*m*) is the default display page once the application has been started. In other embodiment, the SELECT OPERATING MODE page (FIG. 6*m*) might be a selection option 595 on the HOME page (605*e* FIG. 6*a*). As just one example, three operating modes are shown available for selection (FIG. 6*m*). The number of modes may be more or less. The mode selection is associated with a rule set which has associated overridable default configuration settings. These settings may be reviewed by examining the personality data pages, specifically the configuration page(s) (e.g. FIGS. 6*c*, 6*p*). Note that in some embodiments, certain pages may be dynamically configured based on OPMODE selection. For example, service provider login (642*p*, FIG. 6*p*) may only appear on configuration pages when an operating mode is selected with a rule set requiring network communication with a service provider (e.g. commercial operations). Recall that review of the personality data pages, identity and configuration selections, is part of the verification process. Once the operating mode has been selected, the HOME page may be accessed using the HOME command button (612*m* FIG. 6*m*). Alternatively, the rule set default mapping page may be accessed (634 FIG. 6*m*) to edit the default configuration/rule set mapping.

As mentioned, selection of an OPMODE implies a set of default configuration settings. As also mentioned, these defaults may be individually overridden manually on the PROGRAM PERSONALITY DATA page (see FIG. 6*c*). Additionally, the rule set/configuration default mapping may be changed 598 on the PROGRAM RULE SET page (see FIG. 6*q*). This page may be accessed from the OPMODE select page using the RS DEFAULTS command button (634 FIG. 6*m*). The PROGRAM RULE SET page allows the mapping of rules to configuration defaults to be changed using toggles for the communication modules 637q and the sensor modules 638q. As on the other configuration pages, the toggle may be selected between 'IN' or 'OUT' to indicate the default status of that module (IN' being selected and 'OUT' being deselected). Prior to making any configuration default selections, the rule set to which the changes will be made is selected 636q. Only one of the rule sets may be selected at any given time. Selecting one automatically deselects the others. An indication of whether the current settings are default or manual 635, may be provided. When edits are complete, the operator may return to the OPMODE page (639q FIG. 6q) or to the HOME pages (612q FIG. 6q).

It should be apparent that the steps, tasks, and functions described above in FIG. 5d may be performed by software, hardware, or firmware. It should also be apparent that additional or alternative steps relative to those described below may also be performed. Also, steps may be reordered from what is shown. The graphical user interfaces illustrated in FIGS. 6a-6r are examples of display pages which could be used to implement the objectives of the present invention. It should be clear that the display formats and content may be adjusted without distracting from the intended purposes.

Figure 7:
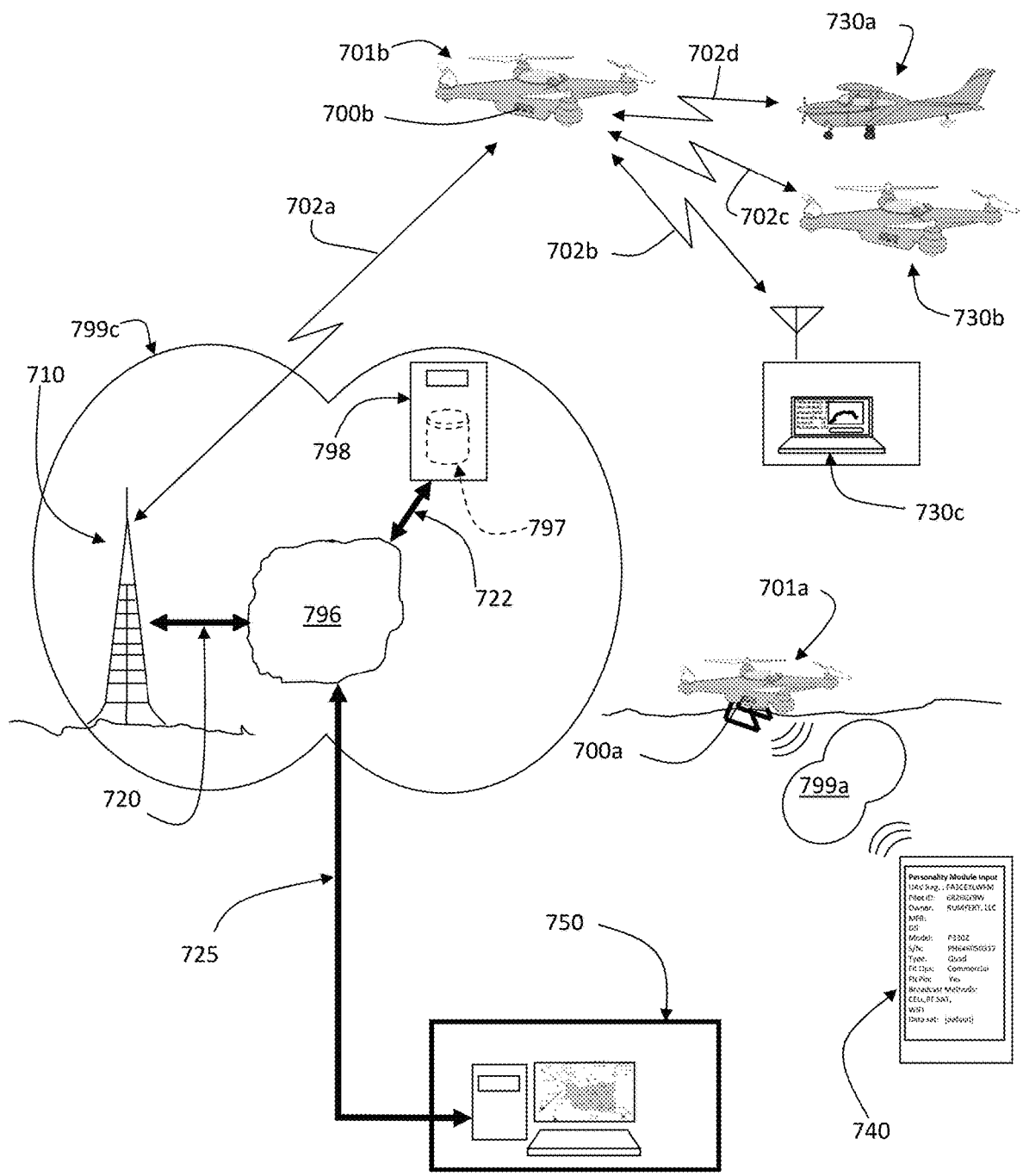
FIG. 7 illustrates an exemplary embodiment of various communications modes of the present invention.

FIG. 7 illustrates various communication modes which have been discussed. Specifically in the figure, a local WiFi network, a wide area network (e.g. internet), and broadcast (e.g. V/U/SHF) modes are illustrated. As mentioned previously, it is envisioned that a single RITS may employ one or more of these technologies either exclusively or simultaneously depending on circumstance. Recall that the communication modes/modules are one of the programmable configuration parameters. One exemplary embodiment envisions the following communications networks/protocols:

Local network: Examples include WiFi, Bluetooth, cabled (direct wired); used primarily for pre-flight programming and verification of the personality data and other operational pre-flight checks. May also be used to receive Remote ID Data (RIDD) for flights in the very near range.

Mid-range: V/U/SHF RF (broadcast); air to air transmissions, mid-range ground stations. Retrieval and display of Remote ID Data (RIDD).

Long range network: cellular/internet, satellite/internet; remote operations (BVLOS), low altitude FIG. 7 is a top level overview of the three communication modes, as defined above, which might be used in an exemplary embodiment. Three modes, 'local,' 'mid-range,' and 'long-range,' are depicted. The terms, 'local,' 'mid-range,' and 'long-range' are referenced relative to the distance between the UAS and the receiver or end user of the data. First, a UAS is on the ground 701a, representing the local mode; second, an airborne UAS 701b illustrates the mid/long-range modes; and third, the airborne UAS 701b is shown communicating through a cellular network to an internet server and users.

A 'local' or short range network might be employed when performing pre-flight programming or checks such as loading and verifying personality data, checking Remote ID Data (RIDD), or checking UAS status as discussed previously. As discussed, it might be a best practice to limit personality module programming to situations where the UAS is on the ground 701a. As described above in conjunction with FIGS. 3a-3e, the on ground 'local network' may be either wired, wireless (RF), or a card reader. An example of a wired connection might be of a USB cable connecting a portable programming device and the RITS 700a installed on the UAS. Examples of RF wireless networks could be WiFi, Bluetooth, V/U/SHF RF, or even cellular/internet for long range pre-flight programming. In one exemplary embodiment shown in FIG. 7, the wireless local network 799a is a WiFi network with one of the RITS communication modules implemented as a WiFi transceiver. In one exemplary embodiment, the WiFi transceiver functions as an access point to which a WiFi enabled portable programming device 740 may connect. In that embodiment, as discussed above, the RITS 700a may function as a server with the portable programming device 740 acting as a client. The RITS/server 700a might 'build' pages on the portable programming device 740 display using html techniques or transmit raw data, such as in JSON format as is well understood in the art. The portable programming device 740 could be any number of devices such as, but not limited to, smartphones, laptops, tablets, PDAs or smartwatches. The portable programming device 740, when connected to the RITS WiFi access point 700a, could exchange data with the RITS 700a such as transfer of the personality data to the RITS 700a. The exchange may also include the receiving and display of navigation, personality or other data for pre-flight verification purposes as described above. Of course, the programming device need not necessarily be a portable device such as a laptop or smart phone. In the case of long distance programming over a cellular/internet connection, the programmer may be a desktop computer 750 or the like.

In addition to programming and other pre-flight verification checks, portable programming device 740 may also function as a receiver/display of the UAS Remote ID Data (RIDD). RITS 700 may also utilize 'local' network 799a to send Remote ID Data (RIDD) to the portable programming/receiver device 740 when the UAS is airborne and in the local area. As discussed in FIGS. 1, 9, and 10, various other communication protocols may be employed for transmission/reception of RIDD when the UAS is beyond the reception range of the local network.

In one exemplary embodiment, the mid-range communication mode may be a standard V/U/SHF RF transmission in so called 'broadcast' mode, meaning that the RF signal is transmitted in the blind to no particular receiver. A mid-range network might be employed for air-to-air operations or when operating near an urban or airport area where the combination of the UAS altitude and distance from the data receiving station could permit use of lower wattage V/U/SHF RF transmitters. In FIG. 7 this is illustrated with UAS 701b broadcasting to manned vehicles 730a, other unmanned vehicles 730b, and mid-range ground stations 730c, using RF paths 702d, 702c, and 702b respectively. The mid-range ground stations could be Air Traffic Control Centers, public safety organizations, or UAS ground control stations such as operated by a remote pilot. As discussed below in conjunction with FIGS. 13, 14, and 15a-c, displays in manned aircraft or mid-range ATC/UAS ground control stations 730c may display maps using the RITS data from UAS 701b (and other airborne UAS) much in the same way ADS-B Out data is displayed. In one exemplary embodiment, as further described below, an interface is available to show both manned aircraft ADS-B received data as well as UAS Remote ID Data (RIDD) in a single display mode. In one exemplary embodiment, these display options are overlays on other map formats such as flight plan, weather, TCAS, and the like.

Finally, FIG. 7 also illustrates use of a long distance network 799c. A long range network might be employed in situations where the UAS is operating in locations and under conditions where the mid-range RF transmitters may have insufficient range to reach the receiving stations or where protocols require the RID data (RIDD) be available on a network regardless of range. Several different long range networks are considered: HF radio link, satellite/internet and 4G/5G/LTE cellular/internet. Each has advantages and disadvantages. In one exemplary embodiment, the cellular/internet option is employed as the long range network.

As shown in FIG. 7, the RITS 700b is attached to the UAS 701b and transmitting on long range path 702a to long range network 799c. In this exemplary embodiment, long range network 799c is comprised of a cellular/internet network, i.e. cell sites 710 connected via standard techniques to the internet 796 and through the internet to database server or cloud storage 798. End user computers 750 may then access RID data on server 798 through the internet using standard techniques.

In one exemplary embodiment, the UAS RITS 700b would have as one of its communication modules a cellular/modem capable of connecting to the internet through cell site 710 which is connected to the internet 796 via standard connection 720. Because of the distribution of cell sites across the US (and the world), the UAS would almost always be within radio range of a cell site. This is especially true when the UAS is at a higher altitude. The ubiquitous connection of cell towers to the internet ensures that RID transmitted to the cell tower would be available to users worldwide. The database 797 hosting the RID data may be on a server 798 managed by a government agency such as the FAA or by a government contractor (e.g. FAA UAS Service Suppliers (USS)) or stored in the cloud by any one of a number of cloud storage service providers. An application (not shown) could be running on the database server which would gather all of the incoming data and sort it according to some useful parameter. For example, the data might be sorted by geographical location so that the FAA air traffic controllers can access and display the data relevant to their control sector. By principles well understood in the art, internet server 798 or a cloud based data storage service would then be able to service client requests for RID data from end user computers 750 connected to the internet 796. RID data may be encrypted and access controlled using access credentials. For example, in some cases it might be desirable to protect some or all of the RID such as personally identifiable information (PII). Access to this data may be limited to public safety or air traffic control (ATC).

Consumers of the RITS data on the long range network such as remote UAS operators or FAA ATC sites 750 may access the RID data in the standard manner by connection to the internet server 798 hosting the RID database 797 using a standard internet connection 725 such as a broadband ISP connection. Once the end user has retrieved the data, it is available for display as discussed below. In addition to public safety and governmental agencies, end user 750 may be a UAS control station operated by the remote pilot controlling the UAS.

Figure 8:
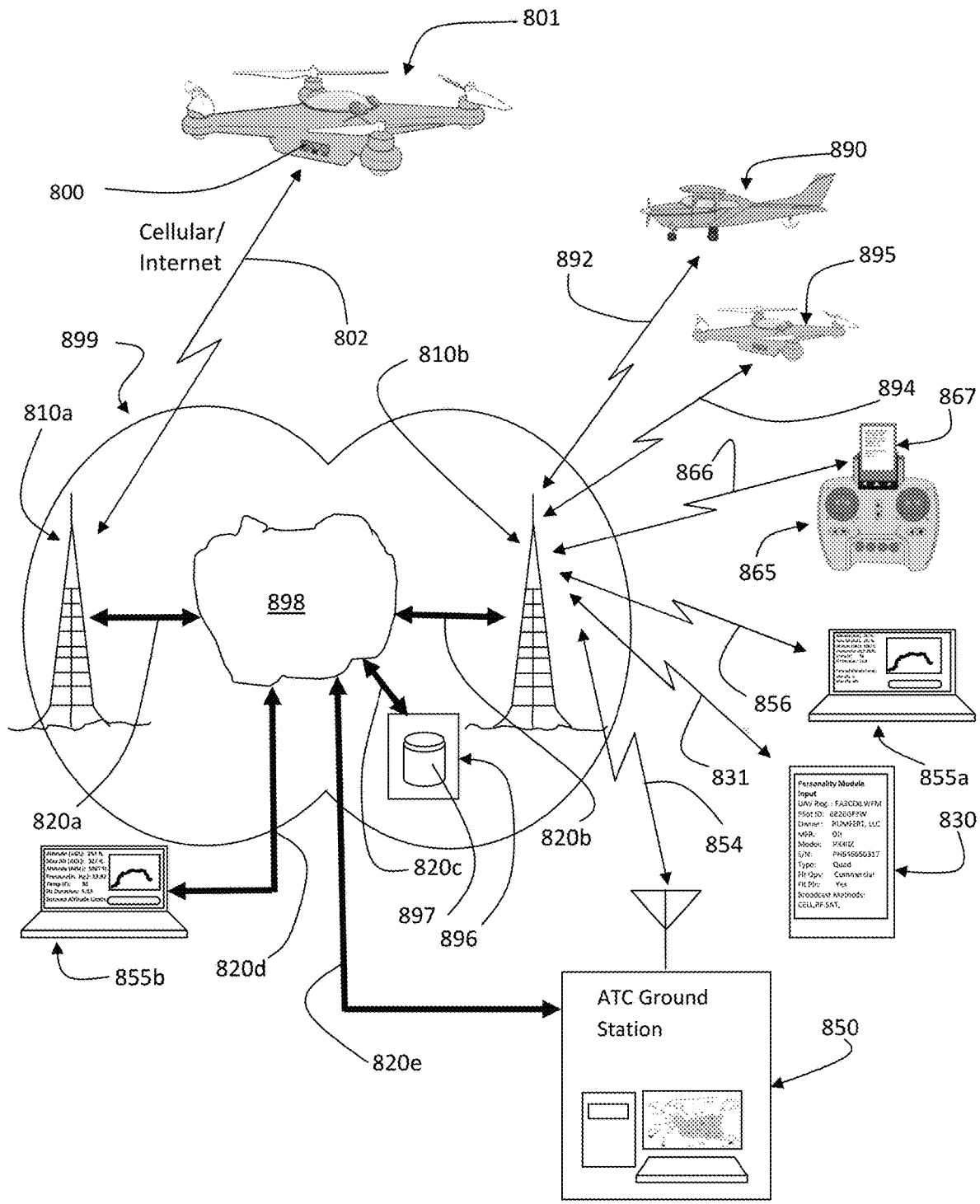
FIG. 8 illustrates a network communication topology with the connection of a plurality of devices to the RITS through one or more data networks.

FIG. 8 illustrates a further use of a long range network 899. As shown in FIG. 8, the RITS 800 is attached to UAS 801. In this embodiment, the RITS is airborne and shown with a cellular connection 802 to the long range network 899. In this exemplary embodiment, the long range network 899 is comprised of the cellular network represented in the figure by cell sites 810a and 810b, and database server 896 connected through the internet 898. End users such as FAA air traffic control 850 or UAS control stations 855b may access the RID data from the database 897 by connecting to the database server 896 thru the internet 898 using conventional means 820d, 820e such as an ISP broadband connection or the like.

As mentioned, the worldwide cellular network is comprised of a multitude of cell sites, represented in the figure by sites 810a and 810b. The cell sites are connected 820a, 820b to the internet 898 via standard techniques well understood in the art. A database 897 hosted on an internet server 896 is connected 820c to the internet 898 so that data received by cell sites 810a, b may be stored on the database 897. The database may be on a server managed by a government agency such as the FAA, by a government contractor, or private entity (e.g. FAA designated UAS Service Supplier (USS)).

While the main consumer of data from the long-range network are ground stations (e.g. 855b, 850) connecting to the internet via standard landline (wired) connections, it is possible that remote stations 830, 855a, 865 or airborne users 890, 895 might need to wirelessly access information from the long-range network 899. Stations 830, 855a, 865 might be UAS control stations, FAA ATC centers, public safety, and the like. In particular, device 830 represents a portable device such as a smartphone which could be used by a remote pilot monitoring a UAS flight or a public safety officer monitoring the sky over a public event such as a sporting or concert event. Station 830 might also represent a programming device conducting a remote pre-flight programming of the UAS RITS 800. For systems lacking a traditional wired broadband connection or not within range of a wireless router, internet access may be via cellular/internet in a manner similar to what is done with mobile broadband via wireless (cellular/satellite) connections 831, 856, 866, 894, and 892 respectively. In case of remote operations or perhaps as backup functionality, ATC stations 850 might also connect via mobile broadband 854.

Figure 9:
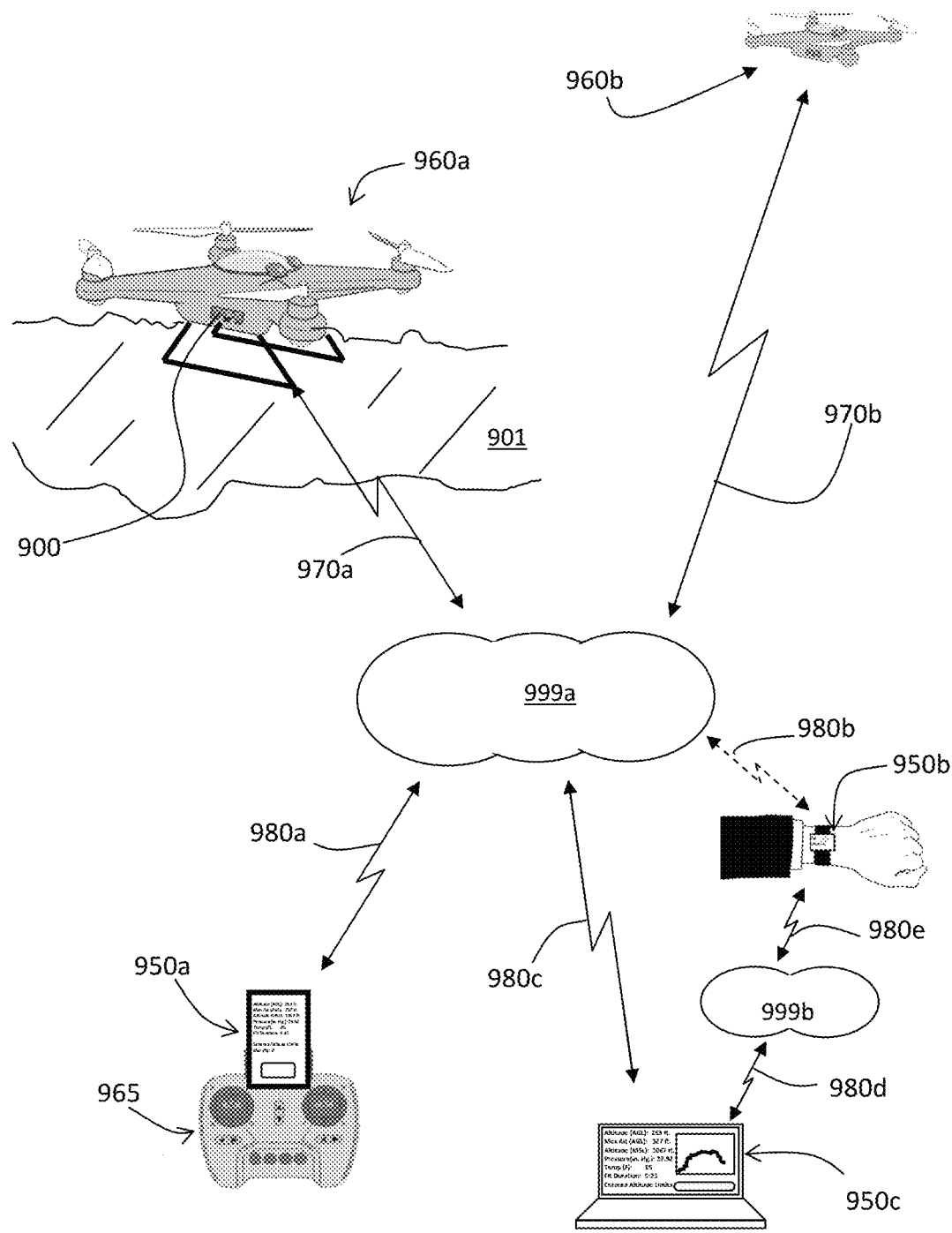
FIG. 9 illustrates a 'local' network employed by the invention.

While FIG. 8 illustrates a long-range network, FIG. 9 illustrates additional details and embodiments of the short range or 'local' network. Recall that the local network 999a might be employed when uploading/verifying the personality data or checking the navigational output of the RITS as part of the pre-flight process described above. Also the local network might be used in-flight for retrieving and displaying Remote ID Data (RIDD) where the UAS is maintained a short distance from the control station(s)/receiver. Some examples might be recreational flights or local commercial operations such as real estate photography, building inspections, site surveys, near range reconnaissance of pipelines, transmission lines, or the like.

As mentioned above, in one embodiment, the short range or 'local' network is a wireless network. In a further exemplary refinement of that embodiment, the wireless network is a WiFi network. In other embodiments, local network 999a may be a Bluetooth wireless network, a cabled network, or a combination of cabled, Wi-Fi and Bluetooth networks. FIG. 9 illustrates the wireless WiFi network of the present invention and its employment in various modes of operation with a plurality of portable programming/receiver/display devices 950a-c and a plurality of local networks 999a, b. In a first illustrative embodiment, RITS 900 attached to UAS 960a is positioned on the ground (WOW=GROUND) 901. As discussed above, in one exemplary embodiment, the programming of the RITS with personality data and/or configuration data using the local network may be limited to when the UAS is in the on-ground state.

In this embodiment, the RITS 900 may establish a first WiFi network 999a when it is ON GROUND and power is applied to the unit. In an exemplary embodiment, a wireless communication module of the RITS 900 creates a WiFi access point with which a wireless device may connect. In the exemplary embodiment, the network is secure, requiring a password for network access. As is well understood in the art, one or more portable programming/receiver/display devices, for example 950a, 950b and/or 950c possessing proper security access, connect to the wireless network 999a thru RF signals 980a, 980b and 980c, respectively, using standard WiFi techniques. The programming and pre-flight data check procedures have been described in detail above, but in summary, in this embodiment, the RITS 900 may function as a server providing html pages or may transmit raw data (e.g. JSON) to connected portable programming device(s). When the portable programming device is powered on, and the programming function selected, a page may be presented offering different personality programming selections or data entry fields. The entries or selections are transmitted to the RITS 900 via the network 999a, and the RITS 900 responds by transmitting data responsive to the programmer request, as described in detail above. Thus, data may be exchanged back and forth between the programming device and the RITS through network 999a.

In a second illustrative embodiment, multiple local wireless networks may be utilized wherein a portable programming/receiver/display device may receive data via a relay path from a second local network 999b instead of a direct connection to first local network 999a. The need for such a configuration might arise due to technological incompatibilities between a portable programming device and the first wireless network such as communications protocol incompatibility or the like.

As an example, portable programming/receiving device 950c may be a laptop or tablet, or the like, having both WiFi and Bluetooth functionality. Smart device 950b may be a smartwatch, or the like, having say only Bluetooth communication functionality. Further, suppose that the local network 999a is functioning using only the WiFi protocol. In that situation, smart device 950b would have communication incompatibility with network 999a. However, portable programming/receiving device 950c could perform a relay function by receiving the WiFi signal transmitted by the RITS 900 through local network 999a via a first RF path 980c in accordance with WiFi protocols. Portable programming device 950c may then establish another Bluetooth compatible network 999b, to which smart device 950b could connect. Portable programming device 950c may then relay the received data via a second RF path 980d through Bluetooth network 999b to the smart device 950b through path 980e.

Figure 10:
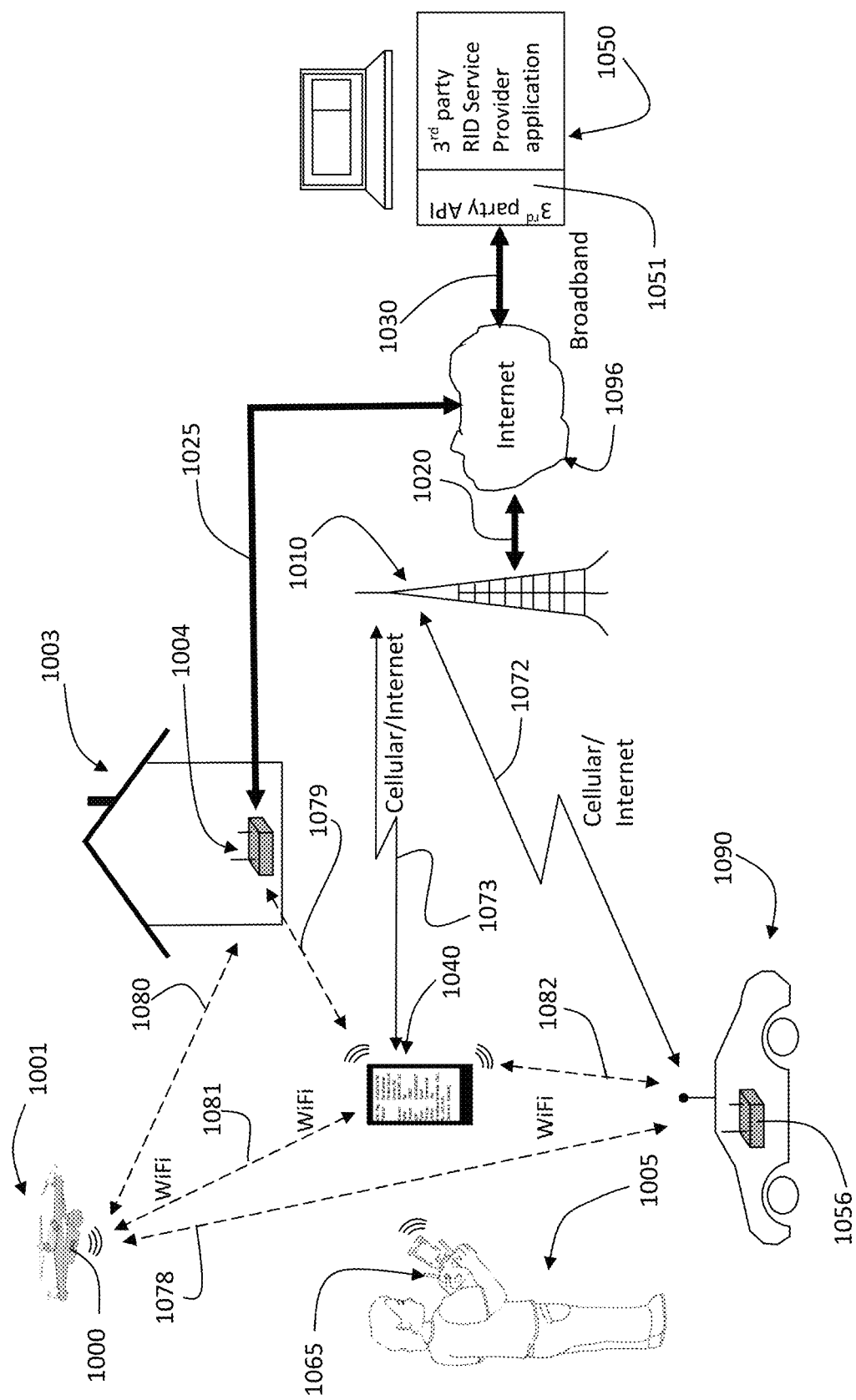
FIG. 10 illustrates several communication modes of the invention.

FIG. 10 illustrates several additional connection modes which could be used in the present invention. One mode illustrated utilizes a wireless router 1004 connected by broadband to the internet as might be found in a residential or business structure. Recall that one common set of commercial operations is the survey of real property; for example a photographic survey conducted in conjunction with a real estate listing, a structural inspection, or the like. In those cases, the drone operator 1005 might be standing just outside or adjacent to the structure 1003 being photographed/inspected. In some cases, especially where the property is an inhabited structure such as a residence or office structure, often a wireless WiFi router 1004, connected to internet 1096 through conventional broadband techniques 1025, will be within radio range of the UAS/RITS 1001/1000 and pilot 1005 conducting the survey. If the UAS/RITS 1001/1000 is within radio range of the wireless router 1050, the RITS 1000 (equipped with a WiFi communication module) may connect to the internet 1096 in the usual fashion along WiFi path 1080, thus making the RID data available for storage on internet connected database servers to which end users may connect directly or through $3^{rd}$ party providers, e.g. FAA USS, to which end user 1050 may connect and retrieve data.

In another embodiment, smart device 1040 may act as a mobile hotspot (e.g. smartphone mobile hotspot (SMHS)). The UAS/RITS 1001/1000 may connect to smart device 1040 along WiFi path 1081, and then smart device 1040 may provide internet access using its cellular/internet connection 1073. This process is sometimes referred to in the art as "tethering" or "phone-as-modem" (PAM). Alternatively, smart device 1040 may act as a relay by receiving data from the RITS via WiFi path 1081 and then connecting to wireless router 1004 over WiFi path 1079 which then connects to the internet 1096 using conventional broadband connection 1025. In still a further embodiment, the smart device may act as a relay to mobile hotspot 1056 to connect to the internet. In that implementation, smart device 1040 may connect 1082 to mobile hotspot (cellular modem) 1056 which provides a connection to the internet 1096 using conventional cellular/internet techniques 1072. As is well understood in the art, a mobile hotspot is a mobile device which allows a connection to the internet. Contrasted with the ubiquitous internet café, this hot spot is mobile, meaning the connection between the modem and the internet is wireless, relying generally on a cellular internet modem as opposed to a landline connection. User connection to the modem is typically through WiFi or physical connection via USB or some other sort. As such mobile hot spots can be associated with automobiles, computers, and smartphones (e.g. tethering) or stand-alone to name just a few.

In still another alternative implementation, the UAS/RITS 1001/1000 connects directly 1078 to the mobile hotspot 1056 which provides a connection to the internet 1096 using conventional cellular/internet techniques 1072. The mobile hotspot (cellular modem) may be associated with a motor vehicle 1090 or may be an independent unit which may be hand carried into position. This latter embodiment allows the hotspot to be easily positioned in the most range advantageous spot.

Figure 11A:
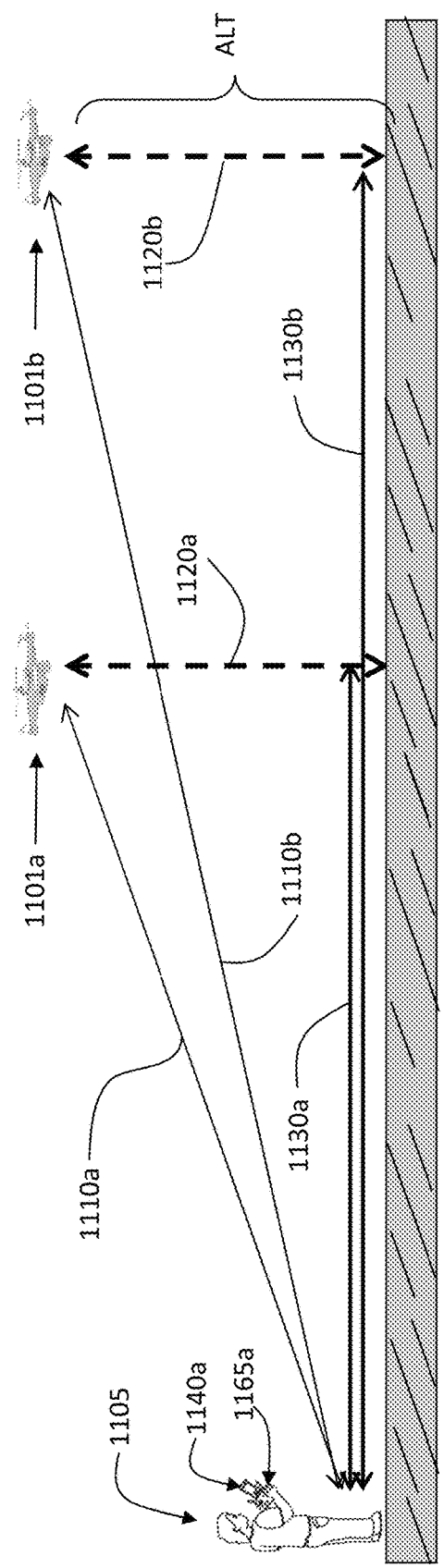
FIGS. 11a and 11b are illustrations of several distance parameters discussed in the specification.
Figure 11B:
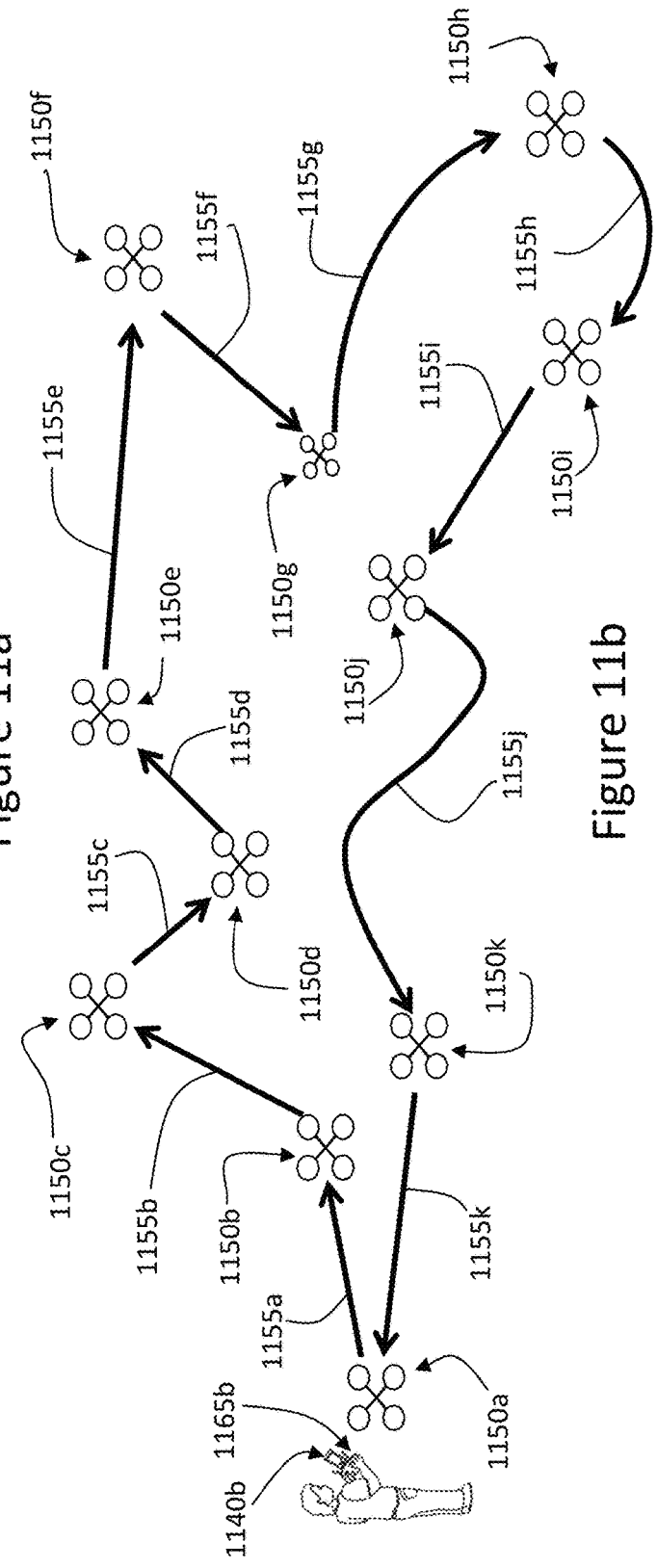

FIGS. 11a and 11b are side and top views, respectively, showing some distance measurements referred to in this specification. FIG. 11a illustrates the altitude 1120a, 1120b and instantaneous distances 1110a, 1110b between the UAS 1101a, 1101b, respectively, and the pilot 1105. The altitudes and lateral distances are quantities provided by or computed from RITS sensor data. As described above, AGL altitudes 1120a, 1120b are computed based on barometric altimeter data and an initial zero AGL bias measurement. Lateral distances 1130a, 1130b are computed based on the current position (L/L) of the UAS and the position of the control station determined during initialization. It is an elementary computation to then determine the line of sight distances 1110a, 1110b based on the Pythagorean Theorem. (Note this assumes that the control station is not appreciably moved since the commencement of flight. This is a reasonable assumption as FAA part 107 regulations generally forbid operations from a moving vehicle. If necessary, the internal GPS included in most smartphones could be used to update the control station position.) As mentioned earlier, an important flight consideration is the distance at which the UAS becomes invisible to the pilot. This is commonly referred to in the art as Beyond Visual Line of Sight (BVLOS). This distance is a function of many things, most prominently, the size of the object. Since there is no way for the instrumentation to determine whether the UAS is within or beyond visual range, the distance to the UAS may be used as a proxy. As discussed above, during pre-flight programming, the pilot is given the opportunity to enter a BVLOS distance value (see FIG. 6*l*) which the system will use for any alerts (see FIG. 6*i*) or other functions which may queue off this distinction.

FIG. 11*b* is a top down view of an illustrative UAS mission for purposes of illustrating the total distance traveled parameter which may be reported on the receiver/display unit as discussed above. In operation, starting at initial position $P_{i=0}$, designated as 1150*a*, the RITS processing system would periodically obtain the UAS positions $\{P_i, P_{i+1}, P_{i+2}, \ldots\}$ using the GPS sensor, corresponding in the figure to point 1150*a*, 1150*b*, 1150*c* etc. and then determine the incremental distance traveled between updates $\{D_i = |P_i - P_{i+1}|; D_{i+1} = |P_{i+1} - P_{i+2}|; \ldots\}$. The position sampling rate would be sufficient to accurately approximate curved path legs such as 1155*g*, 1155*h*, and 1155*j* in the figure. These incremental distances would then be summed to obtain the total mission distance (TMD).

$$TMD = \sum_{i=1}^{n} D_i$$

FIGS. 12*a* and *b* illustrate an example of an RITS status word 1200. It is envisioned that a status word would likely be transmitted along with the rest of the RITS data to give an indication of sensor status, data verification, active transmission networks, emergency status, and information regarding the navigation system.

It is likely the computer software code 112 in the RITS would survey the various sensors and data necessary to compile this information and update a status word in NVM. As part of its sequence to construct an RITS data output message (RIDM), the software could pull this status word from NVM and use it when constructing the RITS output message. One example of a message 1200 is shown, but the contents could be amended and extended. One example of possible status message 1200 bit definitions 1210*a-n* is shown. In one exemplary embodiment, the following definitions might apply:

| Bit | Definition | Meaning |
|---|---|---|
| 0 | GPS Sensor (1210a) | Status of GPS sensor |
| 1 | Pressure Sensor (1210b) | Status of pressure sensor |
| 2 | Comm module(s) status (1210c) | Status of communications module(s) |
| 3 | Pers Data Ver (1210d) | Pers. data verification flag |
| 4 | Net Active - Local (1210e) | Indicator that the local net is active |
| 5 | Net Active - RF (1210f) | Indicator that the RF net is active |
| 6 | Net Active - Long (1210g) | Indicator that the long range net is active |
| 7 | Power Status (1210h) | Battery status |
| 8 | Program Requested (1210i) | Programming request flag |
| 9-10 | EPU (LSB)(1210j) | GPS estimated position uncertainty |
| 11-13 | Satellites in Solution (1210k) | No. of satellites. in solution |
| 14-16 | SPARE (1210l) | Spare |
| 17 | Emergency Mode (1210m) | Emergency mode state |
| 18 | SPARE (1210n) | Spare |

In addition to the display modes discussed above in connection with the pre-flight program of data and the display of in-flight Remote ID Data (RIDD) (FIGS. 6*a*-6*r*), the present invention discloses additional situational awareness or air traffic control display modes. For example, displays in manned aircraft (Airborne Receiver/Display System—ARDS) may display maps using the RITS data from the UAS for use in traffic avoidance and situational awareness in a manner similar to the way ADS-B Out data is displayed for traffic avoidance between manned aircraft. Also, a ground system (Ground Receiver/Display System—GRDS) is available for public safety or other governmental officials such as ATC to monitor manned and unmanned traffic for control or safety purposes. Finally, there are also display modes associated with display of UAS data on UAS ground control stations for situational awareness and control of the UAS by the remote pilot.

A ground based receiver/display system (GRDS) for receiving and displaying the Remote ID and tracking data transmitted by UASs would include a receiver capable of receiving the Remote ID Data (RIDD) transmitted by multiple UAS. It is important to note that the GRDS is designed to receive and display data from a multitude of UAS transmitters, not just the RITS disclosed herein. The FAA rules will ensure that the data content and format is compatible from various vendors so that they can all be integrated into the system. It may also be desired to display ADS-B data from manned aircraft. Thus, in addition to Remote ID and tracking interface, the GRDS would include receivers capable of receiving the ADS-B Out transmissions from manned aircraft.

FIGS. 13, 14, 15*a-c* illustrate some display examples. In one exemplary embodiment, a display interface is available to display both ADS-B data as well as RITS data so that they may be displayed together in a single display mode. In one exemplary embodiment, these display options are overlays on other map formats such as flight plan, weather, TCAS, terrain, sectional charts, and the like.

Figure 13:
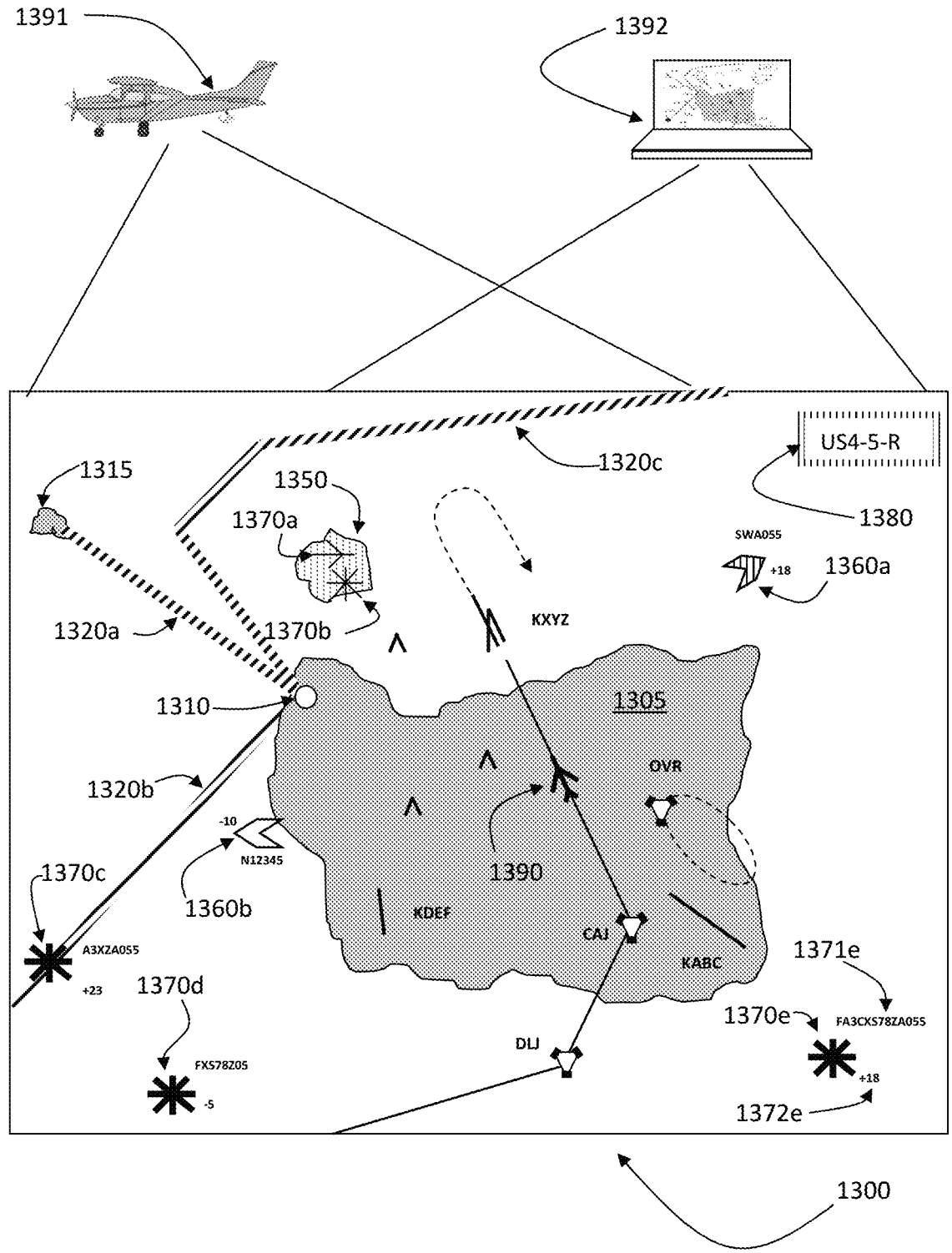
FIG. 13 illustrates an exemplary embodiment of a display presentation for an aircraft Airborne Receiver/Display System (ARDS) or ground based receiver/display system (GRDS), showing airborne traffic in air vehicle centric format.

FIG. 13 illustrates a mapping function which might be displayed in an aircraft cockpit 1391 or a ground monitoring display 1392 such as for UAS control. Illustrated on the display 1300 is a portion of the aircraft or UAS flight plan showing the manned aircraft 1390 in the center of the display 1300. For illustration purposes, the aircraft 1390 is shown on final approach into an airport (KXYZ). Shown in the figure are various other air traffic, ground obstructions, and traffic corridors.

In the figure, urban areas are indicated such as 1305 and 1315 with the size proportional to its geographical footprint. Special use airspace is indicated in a separate color such as 1350 which might indicate a recreational radio control model field, e.g. an AMA field or an FAA Recognized Identification Area (FRIA). Shown flying at the field are two RC/UAS models 1370*a* and 1370*b*. RC/UAS models 1370*a* and 1370*b* are shown without Remote ID data displayed to illustrate the point that FAA rules may exempt some small recreational UAS from the Remote ID requirements. Several other UAS are shown in the illustration such as 1370*c, d, e*. In one exemplary embodiment, the size or format of the symbol would be dependent on the weight of the UAS (assuming weight, or some proxy thereof, is included in the personality (identity) data).

In the figure, an RITS equipped UAS is shown 1370*e*. The displayed data for the RITS may be call sign 1371*e* and relative altitude 1372*e*. If the display is in a manned aircraft or a UAS ground control station, the displayed altitude may be a relative altitude. If the display is associated with ATC, it may be an MSL altitude. The display map also indicates manned aircraft operating in the area as indicated by symbols 1360*a* and 1360*b*. These manned aircraft are ADS-B equipped and thus display their call signs and relative altitudes as part of the ADS-B Out data stream. It is seen that the symbols for manned and unmanned aircraft are different.

In the figure, a drone staging area 1310 is shown, located a suitable safe distance from any manned aircraft airports and population centers. A drone staging area (aka droneport) might be a central spot from which drone missions are launched, similar to the function of an airport for manned aircraft. Accordingly, there might be a plurality of pre-designated drone flight corridors 1320*a-c* along which routes UAS missions are executed, similar to the airway system for manned aircraft. Given the flexible nature of UAS operations, many UAS flights will not be part of structured route based flight plans but rather will be unique mission-specific flight paths operating off corridor. While these UAS may nonetheless still operate on a flight plan, the route may not be shown on the airborne display of FIG. 13. This is similar to the current operation of ADS-B/TCAS equipped aircraft which may operate on point-to-point direct paths independent of the airway structure. Examples of such UAS operating off-airway in FIG. 13 are 1370*d* and 1370*e*.

The data needed to populate the UAS Remote ID Data (RIDD) shown on display 1300 would be acquired using the methods described above. In the situation where the display 1300 is associated with an airborne manned aircraft 1391, the data would likely be acquired using the air-to-air communication methods described above or alternatively from a rebroadcast of the data from a ground relay. In the case of the display on a UAS ground control station, the data would likely be retrieved from accessing a database connected to the internet. It is also possible that if the UAS ground control station is within RF proximity of the UAS, it may receive data directly from UAS transmitting V/U/SHF RF as described above in conjunction with the medium range system.

As described in more detail below, to facilitate RITS data storage and retrieval for display, a method of geo spatial classification of RITS data might be employed. In one exemplary embodiment, the Continental United States (CONUS) is subdivided into a series of 1 degree squares of latitude and longitude. Each square can be uniquely positionally identified based on an assigned number/lettering scheme as described below. In such an embodiment, an optional sector identifier 1380 may be displayed on the display 1300, indicating the geospatial sector being displayed.

Figure 14:
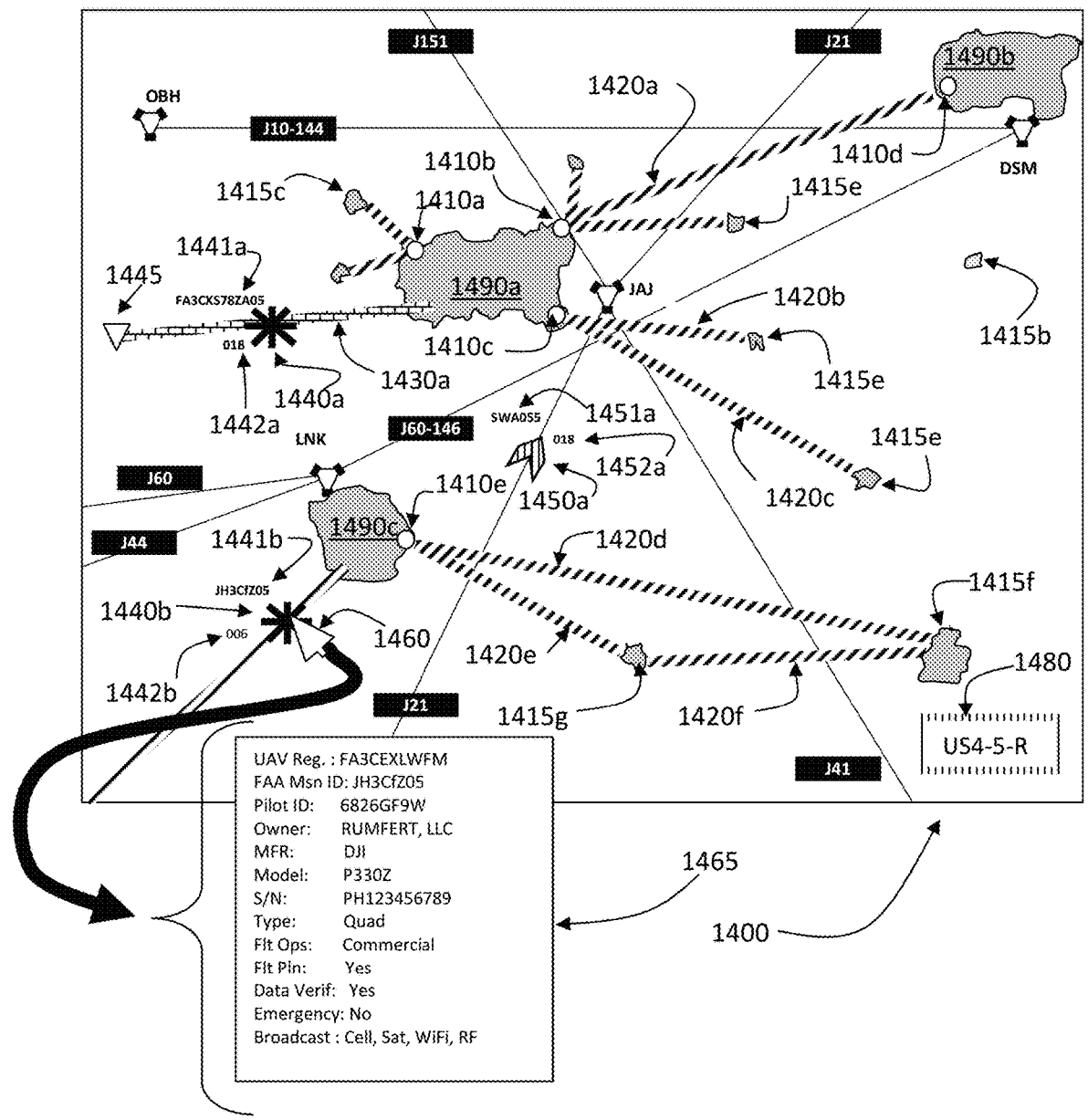
FIG. 14 illustrates an exemplary embodiment of a display presentation for a ground based receiver/display system (GRDS) presentation of other airborne traffic, including manned and unmanned aircraft with a geographical centric format (e.g. ATC center).

FIG. 14 illustrates an exemplary display 1400 which might be used in an air traffic control facility monitoring air traffic. The display shows the National Airspace System (NAS) around several metropolitan areas 1490*a-c*. Instead of being aircraft centered, the display of FIG. 14 is centered on a geographical location. The display operator has the control to determine the map center point which may be the center of the area under control of this air traffic controller, or it may be some other location.

Shown in the figure are some pre-designated commercial drone corridors 1420*a—f*. These are analogous to the airway system used for manned aircraft. Also shown is a temporary commercial drone corridor 1430*a* which might be used for transiting a UAS 1440*a* from a metropolitan area to a temporary activity site 1445 such as emergency surveys, pipeline inspections, agricultural surveys etc. Also shown is a manned aircraft symbol 1450*a* with call sign 1451*a* and altitude 1452*a* indicators. UAS symbols are shown 1440*a, b* along with associated call sign 1441*a, b* and altitude labels 1442*a, b* transmitted by the RITS. In one exemplary embodiment, the size or format of the symbol would be dependent on the weight class of the UAS (assuming weight class is included in the personality (identity) data).

In one exemplary embodiment, placing the display cursor 1460 over or adjacent the UAS symbol 1440*b* opens a window 1465 displaying personality (identity) data associated with that UAS.

Similar to display 1300, the data needed to populate the UAS Remote ID Data (RIDD) on display 1400 may be retrieved from the long range network by accessing a database connected to the internet, from an FAA USS, or possibly directly from nearby UAS.

As mentioned above and described in more detail below, to facilitate RITS data storage and retrieval for display, a method of geospatial classification of RITS data might be employed. In such an embodiment, an optional sector identifier 1480 may be displayed on the display 1400, indicating the geospatial sector being displayed.

Figure 15A:
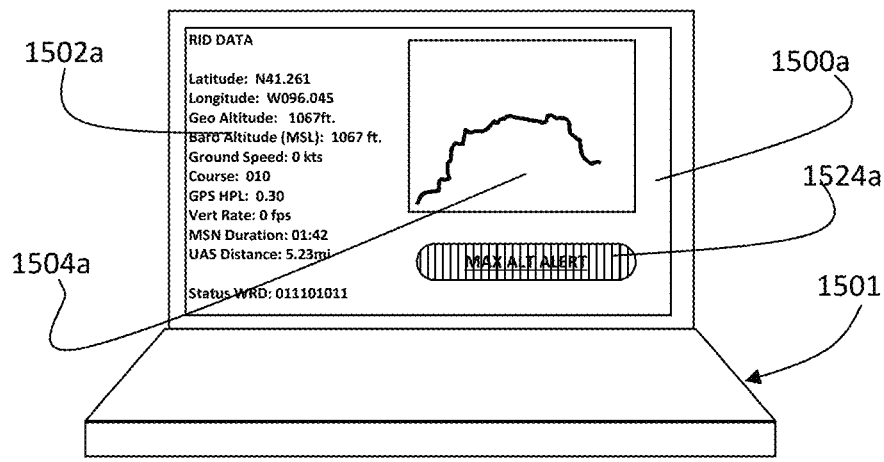
FIGS. 15a-15c illustrate exemplary embodiments of ground station displays associated with the UAS remote pilot which might be used for in-flight monitoring and control of the UAS while operating in the National Airspace System (NAS).
Figure 15B:
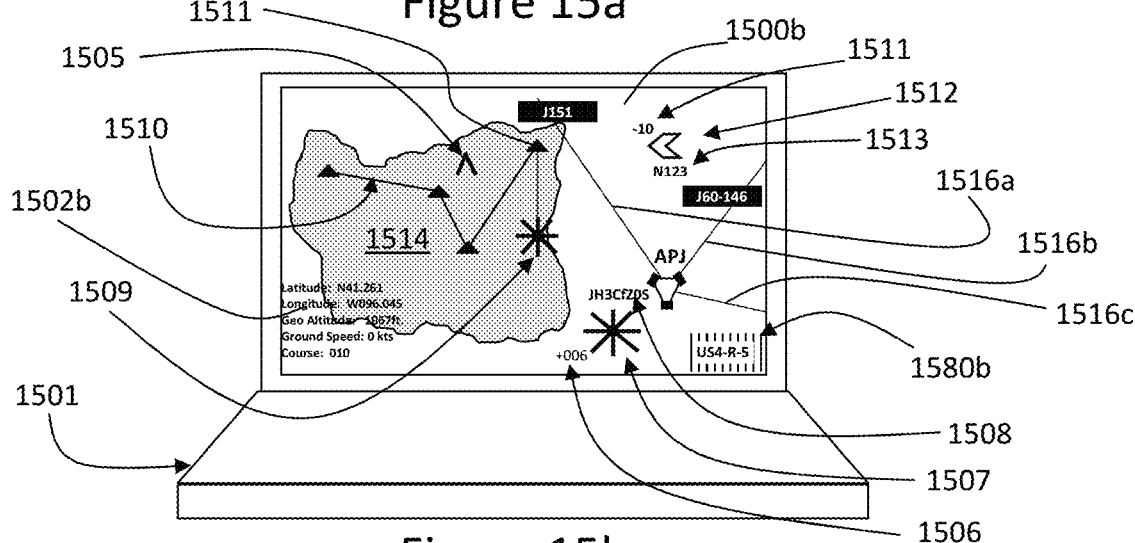
Figure 15C:
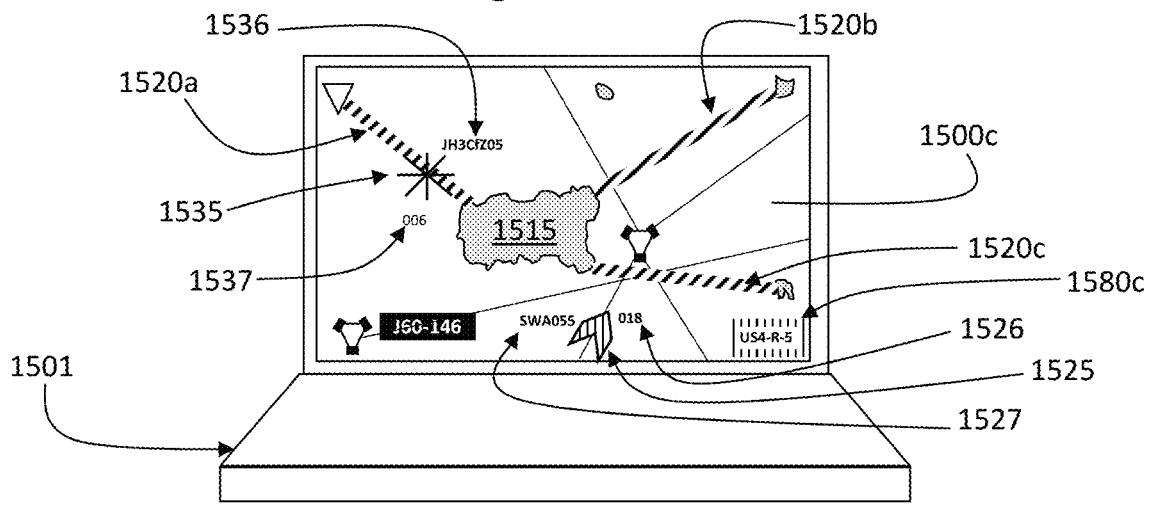

FIGS. 15*a-c* illustrate some possible UAS ground control display formats. The three figures represent generally a Remote ID Data (RIDD) display (FIG. 15*a*), a UAS centric graphical display (FIG. 15*b*), and a geographical centric display (FIG. 15*c*). There are many possible variations on each.

FIG. 15*a* illustrates how an RITS data display might be used by a remote pilot controlling the flight. Recall that the FAA uses the term remote pilot (RP) to identify the person who is the pilot in command of the UAS. This person is responsible for the safe conduct of the mission. In the operation of UAS, it is generally the rule that the remote pilot must maintain visual contact with the UAS. However, waivers are given in certain circumstances for operations Beyond Visual Line of Sight (BVLOS). It is expected that these BVLOS flights will become more commonplace and the distances greater once the Remote ID rules are implemented by the FAA.

The Remote ID Data (RIDD) display in FIG. 15*a* is one tool for maintaining UAS situational awareness. The display is rendered on a computing device 1501 which may be any number of computing devices types such as desktop, laptop, tablet, smartphone or the like.

The display area 1500*a* would contain various Remote ID Data (RIDD) including perhaps both textual 1502*a* and graphical 1504*a* data. Subject matter for possible textual display include but are not limited to flight identification, UAS registration, position (latitude/longitude), position integrity/accuracy, barometric and geometric altitudes, vertical rate, track angle, ground speed, mission duration, and UAS distance from control station, to name a few. A graphical display such as 1504*a* may be available to graphically portray some data. Examples include graphical depiction of position (map), graphical depiction of altitude (altitude v. time), or a novel depiction of position v. altitude in a 3-D graph. Note that various warnings and alerts 1524 may be displayed to alert the remote pilot of situations requiring action. Some examples include position warnings, i.e. horizontal/lateral (distance from pilot exceeds limits), altitude (altitude exceeds limit), speed (UAS speed exceeds FAA limits), status warnings (equip malfunctions), and integrity alerts (insufficient navigational accuracy). Some of these may require piloting action (changing altitude, flying drone closer), and some might require ATC notification (navigational accuracy). In an exemplary embodiment, there would be a selection menu for selecting display items and formats.

It should be noted that the providing of various alerts to the remote pilot such as speed, altitude, course deviations, status warnings, and the like might be useful functions to demonstrate risk mitigation procedures to the FAA when attempting to get a part 107 waiver.

FIG. 15b illustrates a display format centered on the UAS position which might be employed on a UAS control station display. Illustrated in the figure is a portion of the UAS flight plan 1510 showing the UAS 1509 in the center of the display 1500b. For illustration purposes, the UAS 1509 is enroute to waypoint 1511. Shown in the figure are various other air traffic 1512, 1507 ground obstructions 1505 and traffic corridors (airways) 1516a-c.

In the figure, urban areas are indicated such as 1514 with the size proportional to its geographical footprint. Another UAS 1507 is shown in the illustration. In one exemplary embodiment, the size or format of the UAS symbol would be proportional to the weight of the UAS. UAS transmitting Remote ID Data (RIDD) would indicate certain information on the display such as call sign 1508, relative altitude 1506, and the like.

In addition to the UAS 1507, the display map also indicates a manned aircraft operating in the area as indicated by symbol 1512. This aircraft is ADS-B equipped and thus displays its call sign 1513 and relative altitude 1511. It is seen that the symbols for manned and unmanned aircraft are different. As described above, in one exemplary embodiment, placing the cursor over the UAS symbol 1507, 1509 opens a window displaying additional RITS data associated with that UAS (see FIG. 14). For security purposes, personally identifying information (PII) such as the UAS pilot name and address might not be displayed without proper authentication/need to know.

FIG. 15c illustrates a display format centered on a geographic position around a larger metropolitan area 1515. This is similar to the display discussed above in connection with FIG. 14 except that this display is intended for the remote pilot. For example, a remote pilot might wish to scout the traffic in a location other than where he is currently flying. One difference from the ATC display of FIG. 14 is that the remote pilot may not have access to the personally identifying information (PII) of other UAS on the display.

Shown in the figure are some pre-designated commercial drone corridors 1520a—c. These are analogous to the airway system used for manned aircraft. Also shown is a manned aircraft symbol 1525 with call sign 1527 and altitude 1526 indicators. A UAS symbol is shown 1535 along with associated call sign 1536 and altitude labels 1537 transmitted by the RITS. In one exemplary embodiment, the size or format of the symbol would be dependent on the size or weight of the UAS.

As mentioned above and described in more detail below, to facilitate RITS data storage and retrieval for display, a method of geospatial classification of RITS data might be employed. In such an embodiment, an optional sector identifier 1580b, 1580c may be displayed on the displays 1500b and 1500c, respectively, indicating the geospatial sector being displayed.

Figure 16A:
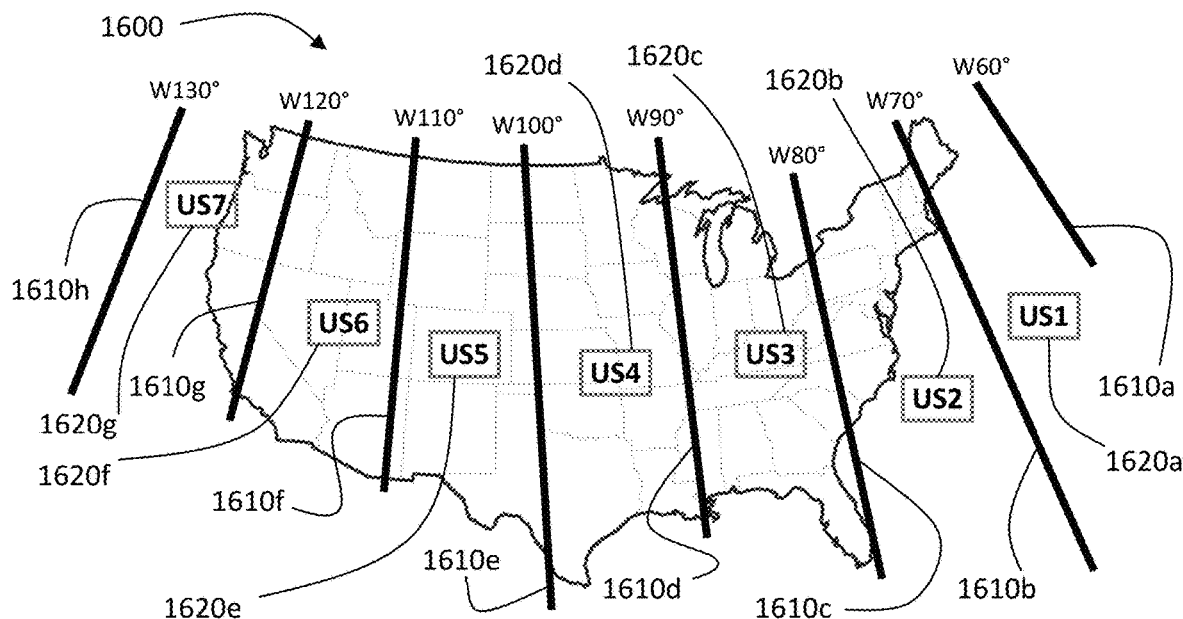
FIGS. 16a-16c illustrate the geographical sectoring method of organizing the Remote ID (RID) data for database storage and display.
Figure 16B:
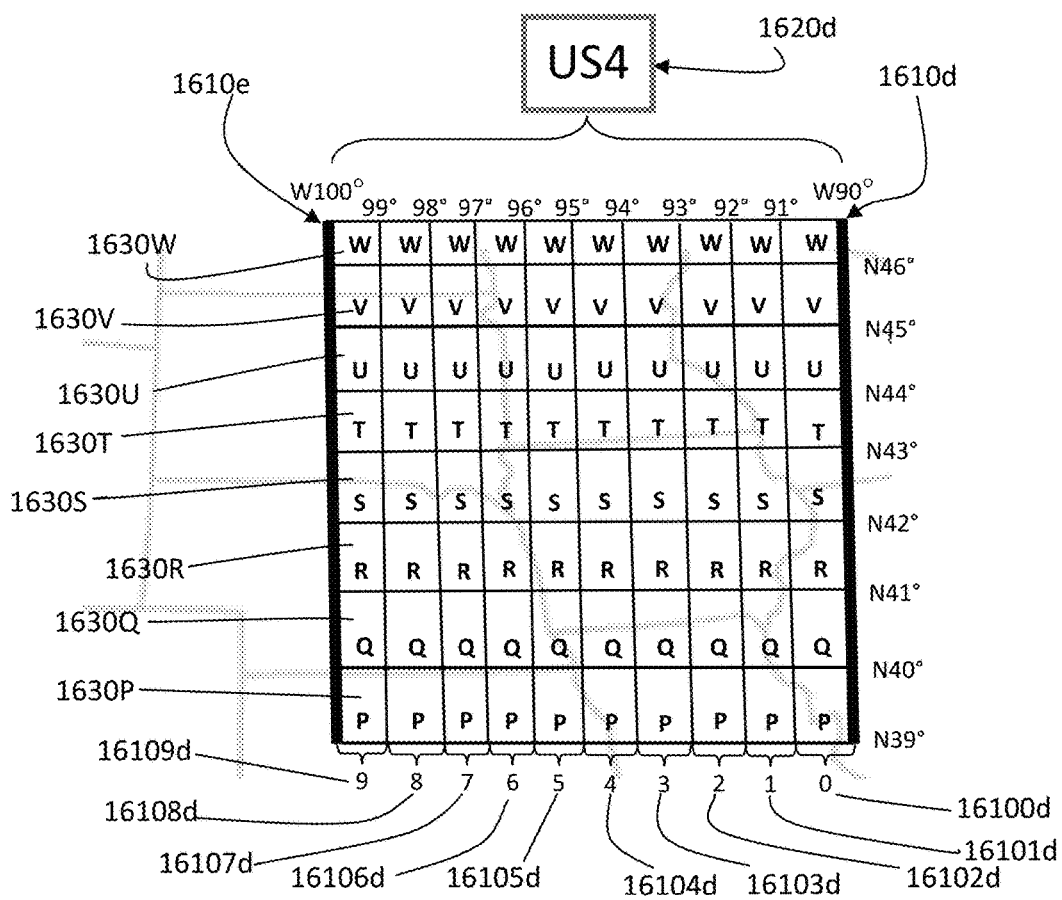
Figure 16C:
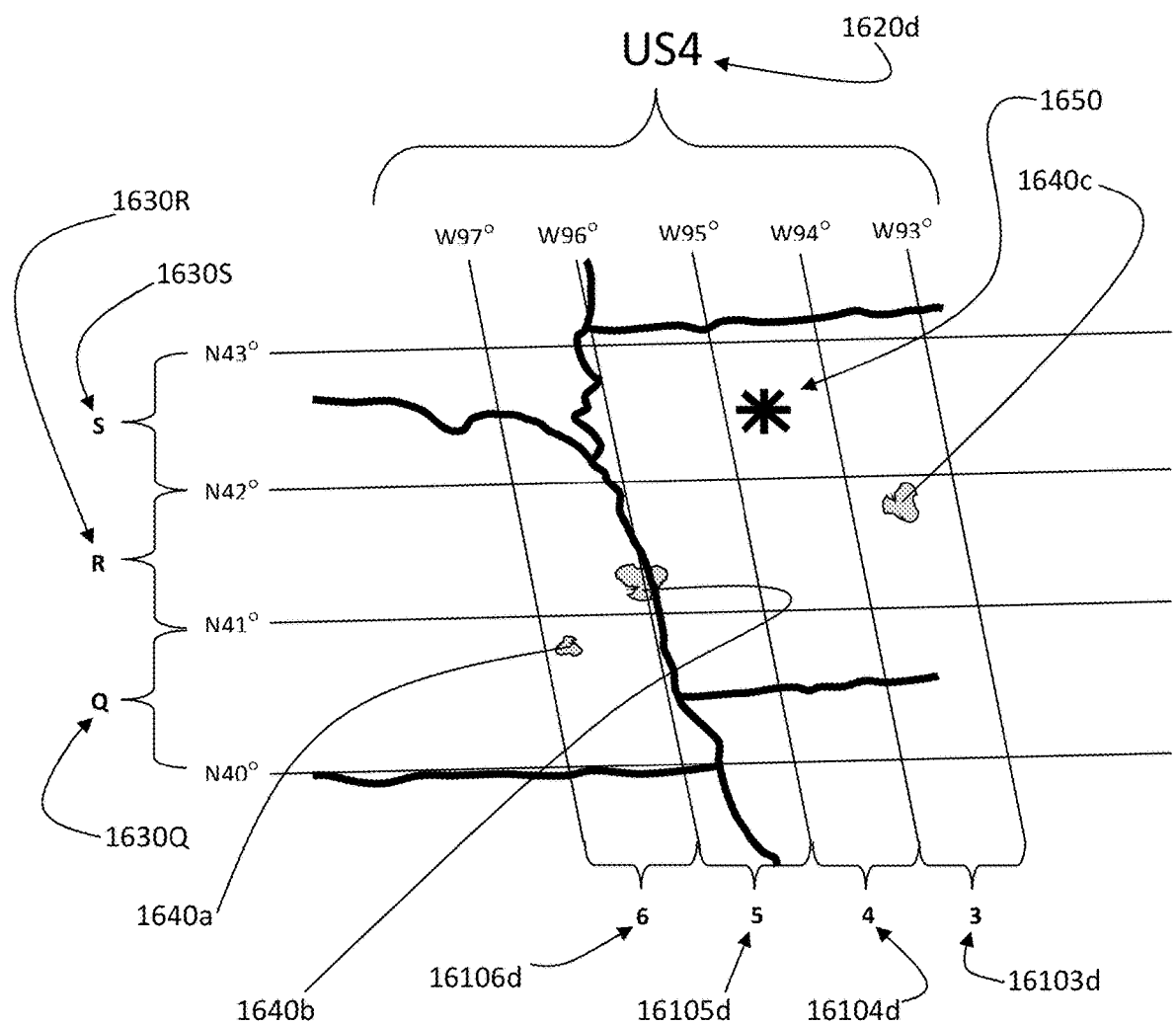

As described above, implementation of the Remote ID tracking requirements will result in Remote ID data spread throughout the entire US. One issue resulting from the acquisition of a potentially large number of geographically diverse UAS data points is how to organize the data in the database so that it may be retrieved efficiently so that the ground displays using the data can build the maps displaying the data with minimal latency. FIGS. 16a-16c present one possible method of organizing the data.

FIGS. 16a-16c illustrate an exemplary method of subdividing the Continental United States (CONUS) into a grid composed of sectors and subsectors organized by one degree latitude and longitude squares. Since the UAS position latitude/longitude (lat/long) is a key component of the RITS data stream, the UAS reports are easily sorted by sector/subsector. Thus, when the database management software receives the RITS data, it can assign a subsector to each UAS target based on its latitude and longitude. For the purposes of this disclosure, this geospatial construct will be referred to as a sector.

The RITS data would then be stored in sector databases and/or a national database organized by sector. When a display of the type described above is being built, the display software can retrieve the data by sector/subsector. For example, in one embodiment, the display center may default to the geographic location (sector) of the facility where the display is located. In this default, the software would search the database for RITS data in the sector/subsector where the display is located. The search/scan may be proportional to the display range. The display operator would of course have the option of changing location and range of the display.

As mentioned, in one embodiment, the subsector size is chosen as 1 degree latitude and 1 degree longitude. This would equate to approximately 60 statute miles in the latitude dimension and 44.5 to 63.1 statute miles in the longitude direction depending on latitude.

Examples of this sector based longitudinal organizational method are shown in FIGS. 16a-16c. FIG. 16a shows an overall map of the continental US (CONUS). In one preferred embodiment, the CONUS is subdivided into seven, 10 degree increments of longitude, creating longitudinal sectors US1-US7. Each of these sectors are then further subdivided into 10, one degree wide longitudinal subsectors, designated 0-9, oriented from East to West. Table 1 illustrates how the entire CONUS can be broken into 70, one degree longitudinal subsectors. By way of illustration, a UAS having a longitudinal position between W60 and W61 degrees would have a longitude sector/subsector designation of $\lambda_S$=US1; $\lambda_{SS}$=0 or adopting the convention $\{\lambda_S, \lambda_{SS}\}$, the longitudinal location would be {US1, 0}.

TABLE 1

| | Longitude Sector ($\lambda_S$) | | | | | | Longitude Subsector |
| --- | --- | --- | --- | --- | --- | --- | --- |
| US1 | US2 | US3 | US4 | US5 | US6 | US7 | ($\lambda_{SS}$) |
| W60°-61° | W70-71 | W80-81 | W90-91 | W100-101 | W110-111 | W120-121 | 0 |
| W61-62 | W71-72 | W81-82 | W91-92 | W101-102 | W111-112 | W122-122 | 1 |
| W62-63 | W72-73 | W82-83 | W92-93 | W102-103 | W112-113 | W122-123 | 2 |
| W63-64 | W73-74 | W83-84 | W93-94 | W103-104 | W113-114 | W123-124 | 3 |
| W64-65 | W74-75 | W84-85 | W94-95 | W104-105 | W114-115 | W124-125 | 4 |
| W65-66 | W75-76 | W85-86 | W95-96 | W105-106 | W115-116 | W125-126 | 5 |
| W66-67 | W76-77 | W86-87 | W96-97 | W106-107 | W116-117 | W126-127 | 6 |

TABLE 1-continued

| | Longitude Sector ($\lambda_S$) | | | | | | | Longitude Subsector ($\lambda_{SS}$) |
|---|---|---|---|---|---|---|---|---|
| US1 | US2 | US3 | US4 | US5 | US6 | US7 | | |
| W67-68 | W77-78 | W87-88 | W97-98 | W107-108 | W117-118 | W127-128 | 7 |
| W68-69 | W78-79 | W88-89 | W98-99 | W108-109 | W118-119 | W128-129 | 8 |
| W69-70 | W79-80 | W89-90 | W99-100 | W109-110 | W119-120 | W129-130 | 9 |

A similar sectioning is done for the latitudinal sectors. It is well known that the longitudinal extent of the CONUS ranges from N24.55° (Key West, FL) to N49.36° (Angle, MN) resulting in an overall extent of ≈25 deg. Thus the longitudinal extent of the US can be broken into 26, one degree latitudinal subsectors as shown in Table 2. As an example, a UAS having a latitudinal position of N24° to N25° would have a latitudinal designation $\varphi_{SS}$ of 'A' or $\{\varphi_{SS}=A\}$.

TABLE 2

| Latitude Window | Latitude Sector ($\varphi_{SS}$) | Latitude Window | Latitude Sector ($\varphi_{SS}$) | Latitude Window | Latitude Sector ($\varphi_{SS}$) | Latitude Window | Latitude Sector ($\varphi_{SS}$) |
|---|---|---|---|---|---|---|---|
| N24°-25° | A | 31-32 | H | 38-39 | O | 45-46 | V |
| 25-26 | B | 32-33 | I | 39-40 | P | 46-47 | W |
| 26-27 | C | 33-34 | J | 40-41 | Q | 47-48 | X |
| 27-28 | D | 34-35 | K | 41-42 | R | 48-49 | Y |
| 28-29 | E | 35-36 | L | 42-43 | S | 49-50 | Z |
| 29-30 | F | 36-37 | M | 43-44 | T | | |
| 30-31 | G | 37-38 | N | 44-45 | U | | |

Once the latitude and longitude sectors are defined, the complete position tag may be constructed. In one preferred embodiment, the position tag form $\lambda_S$, $\lambda_{SS}$, $\varphi_{SS}$ is adopted where the terms $\lambda_S$, $\lambda_{SS}$, and $\varphi_{SS}$ are as defined in Tables 1 and 2 as longitude sector, longitude subsector and latitude sector respectively. Obviously other forms are possible.

Turning then to the figures, the CONUS is subdivided into a series of seven longitudinal sectors US1-US7, shown as the dark lines 1610a-1610h in FIG. 16a. These longitudinal sectors are defined by the 10 degree increments in longitude (W60°-W130°) within which the CONUS 1600 lies. Each of these sectors is labeled from East to West, US1-US7, using reference numerals 1620a-1620g respectively.

FIG. 16b shows an enlarged area of the CONUS (US4) centered on the upper Midwest, illustrating additional detail of the grid system superimposed on a map. The figure is centered between longitude W90° (1610d) and W100° (1610e). As seen in the figure, each 10 degree sector of longitude is further divided into 10 subsectors 16100d-16109d, each being one degree in width (longitude). The longitudinal subsectors are numbered 0-9 from East to West 16100d-16109d. Also seen in the figure, lines of latitude form one degree windows labeled alphabetically 1630P to 1630W {N39°-N40°=1630P; N40°-N41°=1630Q; N41°-N42°=1630R; ... }

FIG. 16c is a further enlargement showing a smaller section of the grid from FIG. 16b. FIG. 16c illustrates how any point in the US can be identified as fitting within one or more grid subsectors. For example urban population area 1640c is located in the subsector between longitude W93° and W94° and latitude N41° and N42°. As illustrated in the figure, this equates to longitude sector US4 ($\lambda_S$=US4), subsector '3' ($\lambda_{SS}$=3) and latitude sector 'R' ($\varphi_{SS}$=R). Thus the grid designation of the area encompassing urban area 1640c is US4-3-R. Similarly, UAS 1650 is located in grid US4-4-S. It should be clear that the UAS grid location is not a precise position; it is merely a means for organizing the multitude of UAS positions into smaller containers for storage, sorting, and retrieval for display. Thus, other UAS in this area could be similarly tagged and grouped in the database together. A ground station interested in traffic in this area could then call up this grid and display geographically proximate traffic. Obviously, the display range would be adjustable by the operator and would not be limited to one subsector. Associating UAS traffic with a subsector provides a method for organizing a large amount of traffic in an easily sortable manner.

As mentioned, this method is for organizing and retrieving the data. When a UAS is displayed, its full actual position is used for placement on the display. Note also that not all regions of interest fall within a single subsector. As seen in the figure, urban area 1640b straddles longitude subsectors 5 and 6. Displays for controllers in this area might default to a display of both subsectors and allow the operator to refine his display area/rang from these.

Figure 17A:
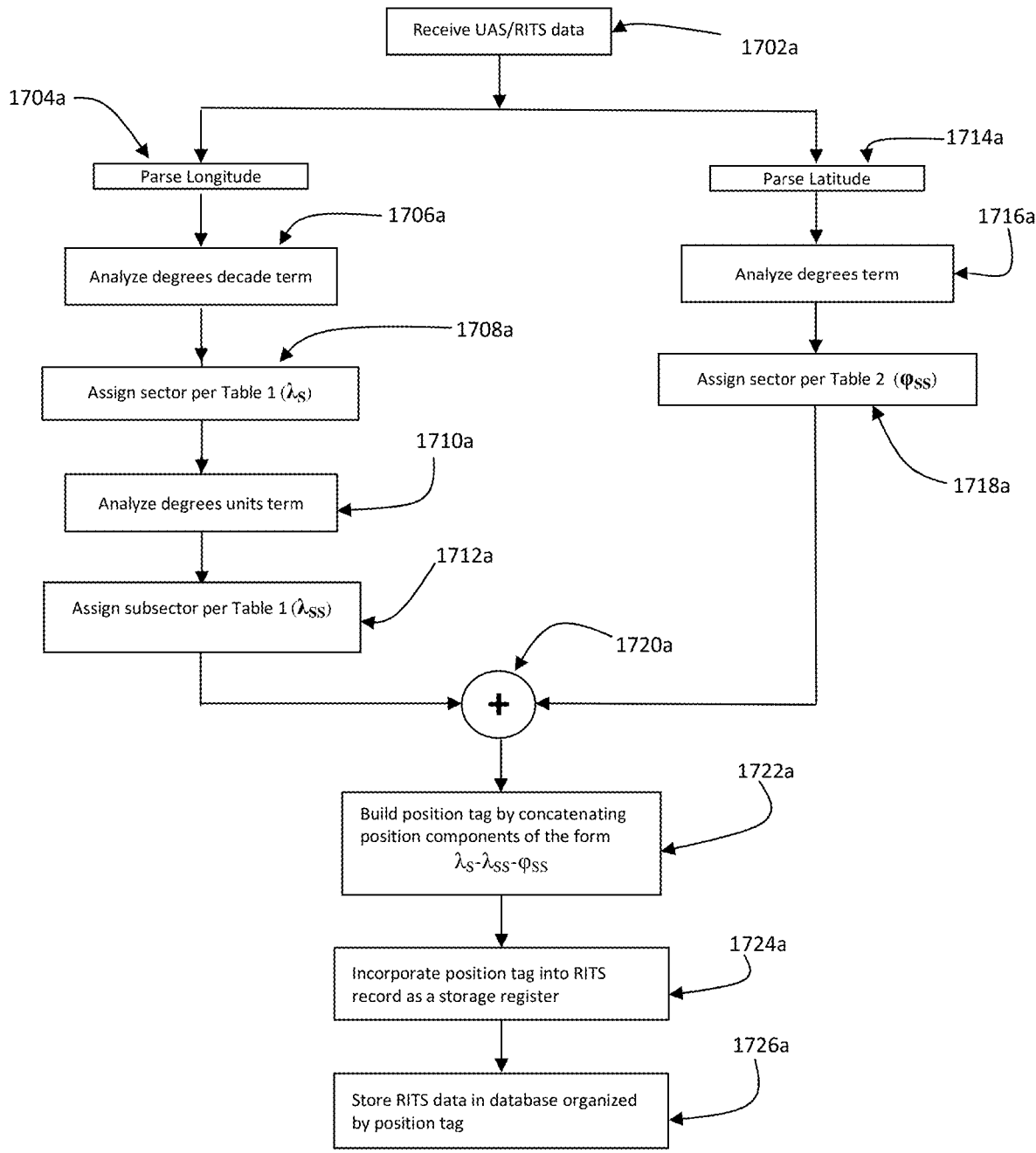
FIGS. 17a-17b illustrate logic flow diagrams of two possible implementations of an analyze, sort, and store routine for processing incoming RITS data, using the geographical sector designation scheme of the invention.

FIG. 17a illustrates a possible logic flow for analyzing and assigning geographic subsectors to RITS data as it comes into the processing center. The received RITS data may then be stored by subsectors for easy retrieval by requesting ground stations as discussed above.

As RITS data comes in 1702a, the ground processing system may parse the latitude 1714a and longitude 1704a of the report. The longitude is parsed two times, once using the 'tens' value 1706a to determine the longitudinal sector ($\lambda_S$) 1708a and then the 'units' value 1710a to determine the longitudinal subsector ($\lambda_{SS}$) 1712a. Mapping of the longitude to the longitudinal sector and subsector is made using the matrix in Table 1. Latitude is parsed once 1714a to determine the degrees value 1716a from which the latitude sector value ($\varphi_{SS}$) 1718a is derived per Table 2.

The processing software then concatenates 1720a the three values to determine the position tag of the form $\lambda_S$-$\lambda_{SS}$-$\varphi_{SS}$ 1722a. The position tag might then be added to the RITS data record as a searchable storage register 1724a and stored in the database 1726a. Again, recall that the position tag is used only for storage and retrieval of data. The actual position is used for display placement.

Figure 17B:
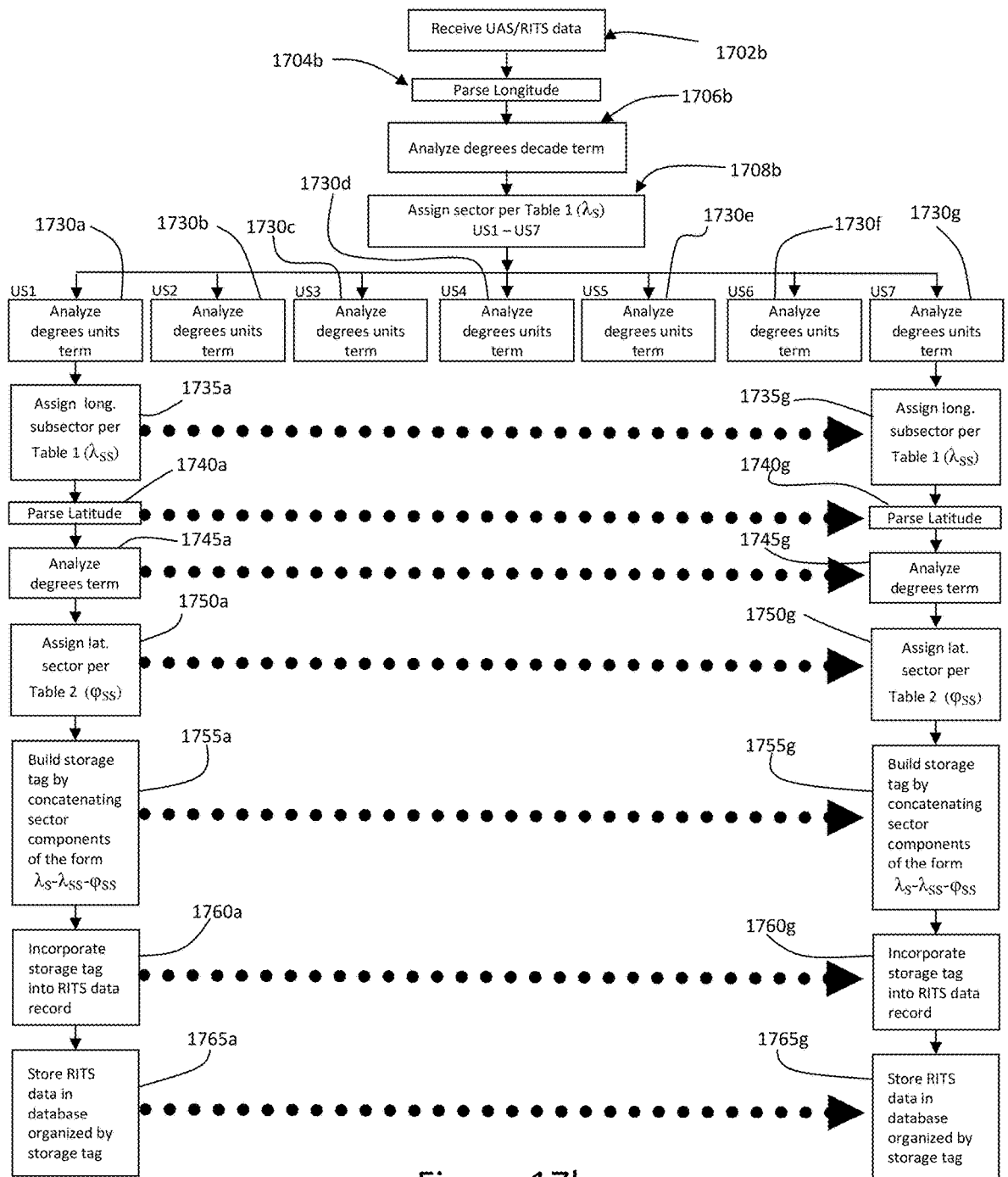
Figure 18:
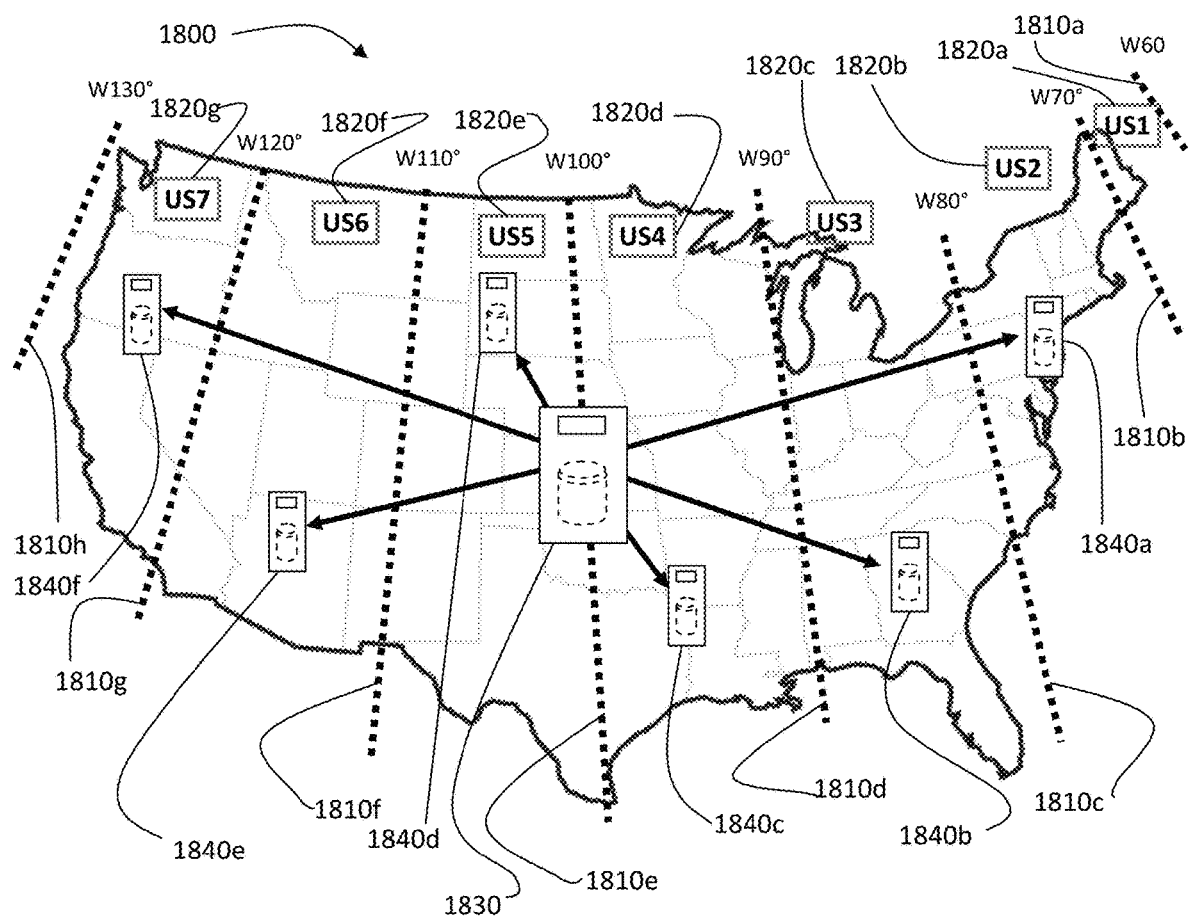
FIG. 18 illustrates one embodiment for geographic distribution of RITS data storage, according to the methods of the invention.

FIG. 17b illustrates a second distributed processing logic flow for analyzing and assigning geographic subsectors to RITS data as it comes into the processing center. The flow illustrated in FIG. 17b is similar to that of FIG. 17a, except that it provides for some parallel processing to speed up data classification and storage. There are both computational and geographic aspects to this method. FIG. 17b illustrates the computational aspects of the method. FIG. 18 illustrates the geographical aspects of the method.

As seen in the figure, an initial processing step of sorting the tens magnitude longitude value 1706b is made to determine the longitudinal sector ($\lambda_S$) 1708b in which the UAS is operating. Based on that result, the RITS data record may then be distributed to one of a plurality of sub-processing centers for further processing 1730a-g. In one preferred embodiment, a separate processing center may be designated for each longitude sector as discussed below. Once the data arrives at the appropriate processing center, the longitude value is further parsed to determine the longitude subsector ($\lambda_{SS}$) 1735a-g and then to determine the latitude sector ($\varphi_{SS}$) 1750a-g. The storage tag is constructed 1755a-g in the manner described above and RITS data record stored 1765a-g in the sector's database for retrieval and display.

The geographic aspects of the distributed processing concept are illustrated in FIG. 18. As seen in FIG. 18, it is envisioned that a central processing center 1830 may initially receive the RITS data where the initial longitudinal analysis is done to determine the longitudinal sector ($\lambda_S$) (US1-US7) (step 1708b, FIG. 17b). Based on that determination, the RITS data record may be forwarded to one of the distributed processing centers 1840a-1840f. At the distributed processing centers, the RITS data may be further processed to determine the longitude subsector ($\lambda_{SS}$) (steps 1735a-g, FIG. 17b) and latitude sector ($\varphi_{SS}$) (steps 1750a-g, FIG. 17b). The RITS data may then be stored (steps 1765a-g, FIG. 17b) at the distributed processing center 1840a-1840f for retrieval by any ground stations requesting it. Note that in some cases it might be unwarranted to assign a separate distributed processing center to a specific sector and the RITS from that sector may be processed/stored in another sector. In one example, as illustrated in the figure, the longitude sector US1 is of an extremely small area with a very minimal UAS traffic. Therefore, it might be desirable to handle that UAS traffic in for example US2 processing center 1840a.

While the CONUS shown in FIG. 18 has been subdivided along 10 degree increments in longitude, it is understood that these sectors may have wildly different UAS traffic densities. Thus, alternative implementations may be considered. For example, the sector definitions could carve out small sectors around busy areas like major cities. Thus, it may be desirable to subdivide the CONUS differently while still following the teachings of this disclosure. Also, Alaska and Hawaii may be considered part of another sector or might be assigned their own.

While a remote real-time UAS Remote ID and tracking system pre-flight programming system and method have been described with reference to various exemplary embodiments and component choices, it will be understood by those skilled in the art that various changes may be made as noted throughout the specification including substitution of various sensor components, methods for executing processor instructions, and the like, including changes in function and arrangement of components or process steps without departing from the scope of the teachings herein. In addition, many modifications may be made to adapt the teachings herein to a particular situation without departing from the scope thereof.

What is claimed is:

1. A method of pre-flight programming a Remote ID Tracking System (RITS) with personality data, the RITS associated with an unmanned aircraft system (UAS) and operative to communicate Remote Identification (RID) data (RIDD) to end users, the transmission of the RID data being inhibited until the pre-flight programmed personality data verification process is complete (verification contingency), the pre-flight personality programming function utilizing a programming device to communicate the personality data to the RITS, the RITS having a non-volatile memory (NVM) for storing the personality data and computer instructions, and a processor for executing the computer instructions, the programming device having an input means/interface module configured to receive personality programming input, and a display configured to display one or more personality data pages, the one or more pages displaying programming data and having command buttons for receiving and executing programming commands, the RITS and programming device having communication modules for establishing a communication link, the method comprising:

initializing the RITS and the programming device, the initialization causing the one or more personality data pages to be displayed on the programming device display, the one or more personality data pages comprising one or more personality data display and entry fields for receiving personality programming entries, and one or more command buttons for receiving programming commands including program and verify commands, entering personality data in the personality data entry fields using the programming device input, commanding the pre-flight personality programming function by selecting the program command button causing the entered personality data to be transferred to the RITS, storing the received personality data in the RITS NVM, initiating the programmed personality data verification process by requesting display of the stored programmed personality data, the verification process including, retrieving from RITS NVM the stored programmed personality data, communicating the stored programmed personality data to the programming device, displaying the stored personality data on the programming device personality data pages, reviewing the displayed stored personality data for accuracy, and commanding verification by selecting the verify command button sending a verification indication to the RITS, and receiving the verification indication at the RITS from the programming device, the received verification indication satisfying the verification contingency, allowing the RITS to release the RID data for transmission.

2. The method of claim 1 wherein the step of storing the personality data in the RITS NVM, further includes storing the personality data in a section of NVM reserved for personality data and referred to as the personality module and wherein the one or more personality data pages include an edit command and wherein the steps of reviewing and verifying the stored programmed personality data further include:

reviewing the displayed stored personality data on the programming device,
correcting any erroneous stored data by selecting the edit command button and entering the corrected data,
commanding a re-program of the edited personality data by selecting the program command button causing the edited personality data to be transmitted to the RITS,
storing the edited personality data in the RITS NVM personality module,
re-initiating the verification sequence by requesting display of the stored edited personality data,
commanding a data verification by selecting the verify command button sending the verification indication to the RITS.

3. The method of claim 1 wherein the identity data component of the personality data includes one or more of the following: UAS registration, pilot ID, mission identifiers, UAS make and model, UAS owner, UAS classification, UAS serial number, flight type and wherein the configuration data component of the personality data includes one or more of the following: operating mode, sensors utilized, communication modules utilized, and RID data (RIDD) parameters to be transmitted, alert conditions.

4. The method of claim 1 wherein the step of executing an initialization of the RITS and programming device includes setting up a WiFi network with the RITS acting as an access point and the programming device as a client and wherein the step of entering personality data on the programmer personality data pages further includes connecting the programming device to the RITS access point and requesting the personality data pages and wherein the RITS transmits one or more html format personality data pages to the programmer device for display.

5. The method of claim 1 wherein the step of entering personality data includes the step of selecting an operating mode from one or more operating mode selection pages, each operating mode having one or more default configuration settings associated therewith, the mapping of operating mode to default configuration settings being referred to as a rule set, the operating mode selection causing configuration settings to be set in accordance with the applicable rule set and wherein the display of the personality data pages are pre-populated with the default configuration settings for the selected operating mode, the one or more default configuration settings associated with the rule set being overridable during the personality programming process and wherein the one or more operating mode selection pages includes a command for modifying the default configuration setting/rule set mapping.

6. The method of claim 1 wherein the one or more personality data entry pages on the programmer display may be dynamically configured based on personality programming selections.

7. The method of claim 1 wherein the RITS further comprises a weight on wheels module for determining whether the UAS is in a ground or air state, and wherein the step of entering personality data is contingent on receiving an indication from the RITS that the UAS is in a ground state.

8. A system for pre-flight programming of a Remote Identification (Remote ID) tracking system (RITS) associated with an unmanned aircraft system (UAS), the pre-flight programming system adapted to program the RITS with personality data, comprising UAS identity and configuration data, necessary for the RITS to perform the function of remotely identifying the UAS operating in the National Airspace System (NAS) by transmitting Remote ID data (RIDD) to end users, the transmission of RIDD being inhibited until verification of the programmed personality data is accomplished (verification contingency), the pre-flight programming system comprising:
a programming device having at least one communication module for communicating with the RITS, an input module configured to receive personality programming input, and a display module configured to display one or more personality programming pages containing personality data,
the RITS associated with the UAS and having,
one or more sensor modules configured for sensing UAS navigational flight data,
one or more communication modules for communicating with the programming device and communicating UAS RIDD to end users,
a non-volatile memory (NVM) for storing first computer software instructions, the NVM including a reserved section of memory for storing the programmed personality data, the reserved section of memory designated the personality module,
a processor module, configured to interface with the one or more sensor modules, the NVM personality module, and the one or more communication modules, the processor module further configured to execute the first computer software instructions stored in the non-volatile memory, the execution of which:
establishes a communication link between the RITS and the programming device using the one or more communication modules,
receives the personality programming data from the programmer device in response to a program command from the programming device,
stores the received personality programming data in the RITS NVM personality module, and
retrieves and communicates the stored personality data to the programming device in response to a read personality data request from the programming device,
the RITS processor module further configured to receive a verification indication from the programming device and store the verification indication in the non-volatile memory, satisfying the verification contingency for RIDD transmission to end users, upon satisfaction of the verification contingency, the RITS first computer software instructions further implementing the steps of:
acquiring UAS navigation data from the one or more RITS sensor modules,
retrieving the identity data from the NVM personality module,
formatting the navigation and identity data into a Remote ID (RID) message, and
transmitting the RID message to end users.

9. The system of claim 8 wherein the RITS includes a card reader for reading data from a portable storage medium, the one or more RITS communication modules including an interface for communicating with the card reader, and wherein the pre-flight personality programming data is stored on a portable memory medium readable by the RITS card reader and wherein the personality module receives the personality data by reading the data contained on the portable storage medium responsive to a program command from the programming device.

10. The system of claim 8 wherein
the one or more RITS and programming communication modules include wireless transceivers for establishing a wireless connection between the RITS and the programming device, and wherein
personality programming pages displayed on the programming device comprise a plurality of personality data entry and display fields and selections for receiving and displaying personality data programming inputs, and one or more command buttons for receiving programming commands including program, verify, and edit commands, the pages adapted to receive personality data entries and selections using the programming device input module and send, via the wireless connection, the entered data/selections to the RITS upon selection of the program command button, the pages further adapted to display the stored programmed personality data upon request to the RITS to retrieve the stored personality data from NVM and communicate it to the programming device, the pages further adapted to receive edits to the displayed stored programmed personality data upon selection of the edit command button, and the pages further adapted to verify the stored programmed personality data and transmit a verification indication to the RITS upon selection of the verify command button.

11. The system of claim 8 wherein the one or more RITS and programmer communication modules include a serial communication module for establishing a serial connection between the RITS and the programming device such that the pre-flight personality programming data may be transferred from the programming device to the RITS via the serial connection.

12. The system of claim 10 wherein the RITS functions as a wireless access point and the programming device functions as a client and wherein the personality programming pages on the programming device are html pages built by the RITS and wherein the program, edit, and verify command buttons are soft 'soft' buttons.

13. The system of claim 8 wherein the RITS further comprises a weight on wheels (WOW) module for determining if the UAS is on the ground (i.e. ground state) and wherein the step of receiving programming data from the programming device further comprises:
  monitoring the WOW module for ground state,
  receiving a programming request from the programming device,
  sending a programming request acknowledgement to the programming device contingent on the WOW being in a ground state, the reception of personality programming data from the programming device to the RITS being contingent on the programming device receiving the programming request acknowledgement from the RITS.

14. The system of claim 8 wherein the programming device further comprises a non-volatile memory for storing second computer software instructions, a processor module for executing the second computer software instructions, the second computer software instructions when executed by the programming device processor, implementing the steps of:
  communicating a programming request to the RITS and receiving a programming request acknowledgement,
  conditionally presenting one or more personality programming pages containing personality data on the programming device, the pages providing program, edit and verify command buttons and entries for personality data, the presentation of the personality programming pages contingent on reception of the programming request acknowledgment from the RITS,
  receiving personality data entries on the one or more personality programming pages and communicating the personality data entries to the RITS in response to selection of the program command,
  initiating a programmed personality data verification process by communicating a read programmed personality data request to the RITS and receiving and displaying, on the programming device, the stored programmed personality data from the RITS responsive to the request, and
  communicating a verification of programmed personality data indication to the RITS in response to a verify command entered on the programming device.

15. A computer instruction code implemented system for pre-flight personality programming of an unmanned aircraft system (UAS) Remote Identification Tracking System (RITS) from a programming device, the RITS wirelessly communicating real-time UAS Remote ID data (RIDD) comprising identity and navigational data to end users, the computer instruction code implemented system comprising,
  a programming device having a non-volatile memory for storing a first computer instruction code set, a processor module for executing the first computer instruction code set, input and display modules for displaying one or more personality data pages and for receiving input of personality programming data, and one or more communication modules for communicating with the RITS,
  the RITS having, a non-volatile memory (NVM) for storing a second computer instruction code set, a reserved section of the NVM referred to as the personality module for storing the personality programming data, a processor module for executing the second computer instruction code set, a weight on wheels (WOW) module for determining whether the UAS is on the ground, one or more sensor modules for sensing UAS navigational flight data, and at least one communication module for communicating with the programming device,
  the first computer instruction code set when executed by the programming device processor, implementing the steps of,
    communicating a programming request to the RITS and receiving a programming request acknowledgement,
    conditionally presenting one or more personality programming Graphical User Interface (GUI) screens on the programming device, the GUI screens providing program, edit and verify command buttons and entries for personality data, the presentation of the personality programming GUI screens contingent on reception of the programming request acknowledgment from the RITS,
    receiving personality data entries on the one or more GUI screens and communicating the personality data entries to the RITS in response to selection of the program command,
    initiating a programmed personality data verification process by communicating a read programmed personality data request to the RITS and receiving and displaying the stored programmed personality data from the RITS responsive to the request,
    communicating a verification of programmed personality data to the RITS in response to a verify command, the second computer instruction set when executed by the RITS processor, implementing the steps of,
  establishing a communication link between the RITS and the programming device,
  monitoring the WOW module for ground state,
  receiving a programming request from the programming device,
  sending a programming request acknowledgement to the programming device contingent on the WOW being in a ground state,
  receiving the personality programming data from the programming device,
  storing the received personality programming data in the non-volatile memory personality module,
  transmitting an indication of completion to the personality module,
  responding to a read personality data request from the programming device by retrieving the stored personality data from the personality module and communicating it to the programming device, and
  receiving a verification of programmed personality data indication from the programming device and setting a verification flag in response thereto, the RITS sensing UAS navigational flight data with the one or more sensor modules, retrieving the verified identity data from the RITS NVM personality module, and communicating the UAS identity and navigational data to end users.

16. The computer instruction code implemented system of claim 15 wherein the step of establishing a communication connection between the RITS and the programming device, includes the step of establishing a wired connection.

17. The computer instruction code implemented system of claim 15 wherein the RITS and programmer communication modules comprise wireless communication modules and wherein the step of establishing a communication connection between the RITS and the programming device, includes the step of establishing a wireless connection.

18. The computer instruction code implemented system of claim 15 wherein the personality data comprises an identity component and a configuration component,
  the identity component includes one or more of the following: UAS FAA registration; UAS owner; mission ID; pilot information; UAS make/model/serial number, and
  wherein the configuration component includes one or more of the following: communication modes; flight data sensors; operating mode; UAS operational alerts; the none or more of the configuration data having default values which may be overridden during the preflight programming process, the configuration data determining the content of the navigation data transmitted from the RITS and what communication modules are used to transmit the data and the personality data determining the content of the identity data transmitted from the RITS to end users.

19. The computer instruction code implemented system of claim 17 wherein the RITS functions as an access point and the programming device functions as a client and wherein the personality data pages on the programming device are html pages built by the RITS and wherein the program, edit, and verify command button as soft GUI buttons.

20. The computer instruction code implemented system of claim 15 wherein the one or more personality data pages include an edit command and wherein the steps of initiating a verification process and receiving a verification indication of the stored programmed personality data further includes:
  reviewing the displayed stored personality data on the programming device,
    correcting any erroneous stored data by selecting the edit command button and entering the corrected data,
    commanding a reprogram of the edited personality data by selecting the program command button causing the edited personality data to be transmitted to the RITS,
  storing the edited personality data in the RITS NVM personality module,
  re-initiating the verification sequence by requesting display of the stored edited personality data, and
  commanding a data verification by selecting the verify command button sending the verification indication to the RITS.

* * * * *